United States Patent
Ogawa

(10) Patent No.: US 7,540,910 B2
(45) Date of Patent: *Jun. 2, 2009

(54) INK COMPOSITION, INK SET AND RECORDING METHOD

(75) Inventor: Manabu Ogawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 291 days.

This patent is subject to a terminal disclaimer.

(21) Appl. No.: 11/526,643

(22) Filed: Sep. 26, 2006

(65) Prior Publication Data

US 2007/0070159 A1    Mar. 29, 2007

(30) Foreign Application Priority Data

Sep. 26, 2005    (JP) ............................ P.2005-278055

(51) Int. Cl.
*C09D 11/02* (2006.01)
*B41J 2/01* (2006.01)

(52) U.S. Cl. .............. 106/31.46; 106/31.48; 106/31.5; 106/31.58; 106/31.59; 106/31.76; 106/31.77; 106/31.78; 106/31.86; 106/31.89; 347/100

(58) Field of Classification Search .............. 106/31.59, 106/31.46, 31.48, 31.5, 31.89, 31.76, 31.77, 106/31.78, 31.58, 31.86; 347/100
See application file for complete search history.

(56) References Cited

U.S. PATENT DOCUMENTS

| | | | | | |
|---|---|---|---|---|---|
| 5,196,056 | A | * | 3/1993 | Prasad ...................... | 106/31.58 |
| 5,395,434 | A | * | 3/1995 | Tochihara et al. ......... | 106/31.59 |
| 5,910,211 | A | * | 6/1999 | Ueda et al. ................ | 106/31.58 |
| 5,985,014 | A | * | 11/1999 | Ueda et al. ................ | 106/31.58 |
| 6,855,195 | B2 | * | 2/2005 | Nishita et al. ............. | 106/31.59 |
| 7,048,789 | B2 | * | 5/2006 | Taguchi et al. ............ | 106/31.59 |
| 7,077,894 | B2 | * | 7/2006 | Taguchi et al. ............ | 106/31.59 |
| 7,311,391 | B2 | * | 12/2007 | Ogawa et al. .............. | 347/100 |
| 2004/0189765 | A1 | * | 9/2004 | Taguchi et al. ............. | 347/100 |
| 2004/0200385 | A1 | * | 10/2004 | Taguchi et al. ............ | 106/31.43 |
| 2005/0081745 | A1 | * | 4/2005 | Ogawa et al. ............. | 106/31.59 |

FOREIGN PATENT DOCUMENTS

| | | | |
|---|---|---|---|
| JP | 05/339529 | * | 12/1993 |
| JP | 2004/035854 | * | 2/2004 |
| JP | 2004/075766 | * | 3/2004 |
| WO | WO 03/066751 | * | 8/2003 |

* cited by examiner

Primary Examiner—Helene Klemanski
(74) Attorney, Agent, or Firm—Sughrue Mion, PLLC

(57) ABSTRACT

An ink composition includes: a coloring material having an azo group bound to a heterocyclic group; an aqueous medium; and at least one of an acetylene diol and an ethylene oxide adduct of the acetylene diol, wherein an average value of an addition molar number of the at least one of the acetylene diol and the ethylene oxide adduct of the acetylene diol is 0 or more and less than 4.

8 Claims, No Drawings

INK COMPOSITION, INK SET AND RECORDING METHOD

BACKGROUND OF THE INVENTION

This is a non-provisional application under 35 U.S.C. § 111(a) which claims priority from Japanese priority document 2005-278055 filed on Sep. 26, 2005, which is incorporated herein by reference.

1. Field of the Invention

The present invention relates to an ink composition. In particular, the invention relates to an ink composition for inkjet recording, an ink set and a recording method.

2. Background Art

In recent years, following the diffusion of computers, inkjet printers are widely utilized for printing on papers, films, cloths, and so on in not only offices but also households.

The inkjet recording method includes a system of applying a pressure by a piezoelectric element and discharging droplets; a system of generating air bubbles in an ink by heat and discharging droplets; a system of using ultrasonic waves; and a system of sucking and discharging droplets by an electrostatic force. As an inkjet composition for such inkjet recording, an aqueous ink, an oil based ink, or a solid (melt type) ink. Of these inks, an aqueous ink is the mainstream in view of manufacturing properties, handling properties, odors, safety, and the like.

For coloring agents which are used for such an ink for inkjet recording, there are such requirements that they have high solubility in a solvent; that they can be subjected to high density recording; that they have good hue; that they have excellent fastness to light, heat, air, water or chemicals; that they have good fixing properties to an image receiving material and hardly cause oozing; that they have good preservability as an ink; that they are non-toxic; that they have a high purity; and that they are cheaply available. However, it is extremely difficult to seek coloring agents which are satisfied with these requirements in high levels.

Various dyes or pigments have already been proposed and actually used for inkjet recording. However, it is the present situation that a coloring agent which is satisfied with all of the forgoing requirements has not been discovered yet. In conventionally well known dyes or pigments to which a color index (C.I.) number is given, it is difficult to make hue and fastness as required for an ink for inkjet recording compatible with each other.

Under these circumstances, for the purpose of improving ozone resistance and light resistance of dyes, the present applicant has proceeded with development of a dye having an azo group on a heterocyclic group.

Such a dye is characterized in that the oxidation potential of the dye is high and that it is possible to design to improve ozone resistance and light resistance due to the promotion of association of a dye molecule.

However, since in preparing an ink, an ethylene oxide chain of a surfactant to be added in the ink and a heterocyclic ring in the dye molecule mutually act each other, an ability of the surfactant is lowered so that a surface tension of the ink cannot be reduced. For that reason, there were involved such problems that wetting of the ink on the surface of image receiving paper is deteriorated; that permeability of the ink is deteriorated; that drying properties of a printed matter are poor; and that deteriorations of image quality such as beading are observed.

That is, additives capable of improving drying properties of an image, controlling deteriorations of image quality such as beading and keeping good ozone resistance and light resistance have been desired.

Now, JP-A-5-339529 (the term "JP-A" as used herein means an "unexamined published Japanese patent application") proposes a method of obtaining an image which is free from oozing at the time of color mixing by using an ink containing acetylene diol and an alkane diol.

JP-A-2004-35854 proposes a method of obtaining of an image which is free from beading, bleeding and feathering by using an ink containing 2,5-dimethyl-2,5-hexanediol and acetylene diol or an ethylene oxide adduct of acetylene diol.

Also, JP-A-2004-75766 proposes a method of obtaining an image which is free from beading, bleeding and feathering by using an ink containing 1-butanol and acetylene diol or an ethylene oxide adduct of acetylene diol.

SUMMARY OF THE INVENTION

An object of the present invention is to provide an ink composition capable of improving drying properties of an image and controlling deteriorations of image quality such as beading without impairing ozone resistance and light resistance, an ink set containing the subject ink composition and a recording method using the same.

The foregoing object of the invention can be attained by the following measures.

(1) An ink composition comprising: a coloring material having an azo group bound to a heterocyclic group; an aqueous medium; and at least one of an acetylene diol and an ethylene oxide adduct of the acetylene diol, wherein an average value of an addition molar number of the at least one of the acetylene diol and the ethylene oxide adduct of the acetylene diol is 0 or more and less than 4.

(2) The ink composition as described in the item (1), wherein a content of the at least one of the acetylene diol and the ethylene oxide adduct of the acetylene diol is from 5 to 50 g/L.

(3) The ink composition as described in the item (1) or (2), wherein the coloring material has a structure in which a heterocyclic group is bound to the both ends of the azo group.

(4) The ink composition according to as described in any one of the items (1) to (3), wherein an oxidation potential of the coloring material is nobler than 1.0 V against a standard calomel electrode (hereinafter simply referred to as "vs SCE").

(5) An ink set comprising an ink composition as described in any one of the items (1) to (4).

(6) A recording method comprising an ink composition as described in any one of the items (1) to (4).

(7) A recording method comprising an ink set as described in the item (5)

(8) The recording method as described in the item (6), which is an inkjet recording method.

(9) The recording method as described in the item (7), which is an inkjet recording method.

According to the invention, in an ink composition containing a coloring material having an azo group bound on a heterocyclic group, an aqueous medium, and acetylene diol and/or an ethylene oxide adduct of acetylene diol, by containing the acetylene diol and/or the ethylene oxide adduct of acetylene diol such that an average value of the addition molar number of ethylene oxide is 0 or more and less than 4, it is possible to improve drying properties of an image and to control deteriorations of image quality such as beading without impairing ozone resistance and light resistance.

It is estimated that the reasons why the invention brings the foregoing advantages reside as follows.

It has become clear that with respect to a coloring material having a heterocyclic group, especially a coloring material having an azo group bound on a heterocyclic group, the heterocyclic group within the molecule of the coloring material and an ethylene oxide chain mutually act in the ink. For that reason, when the ethylene oxide of a surfactant is long (the addition molar number is high), a mutual action with a dye becomes large so that an ability as the surfactant is lowered.

Then, in an ink composition containing acetylene diol and/or an ethylene oxide adduct of acetylene diol, in the case where the ethylene oxide adduct of acetylene diol is added such that an average value of the addition molar number in the acetylene diol and/or the ethylene oxide adduct of acetylene diol is 0 or more and less than 4, since an ethylene oxide chain is not present or its chain length is short, the mutual action with the heterocyclic group within the molecule of the coloring material is small so that an ability of the surfactant is not lowered. Accordingly, it is possible to prepare an ink from which an image having excellent drying properties and having a high image quality such that it is free from beading can be obtained by using a coloring material having excellent ozone resistance and light resistance. Incidentally, the addition molar number of ethylene oxide of acetylene diol is 0.

In consequence, the advantages of the invention are remarkable in the case where the coloring material is a coloring material having an azo group bound on a heterocyclic group.

DETAILED DESCRIPTION OF THE INVENTION

Next, the acetylene diol and/or the ethylene oxide adduct of acetylene diol which is used in the invention will be hereunder described.

The acetylene diol and/or the ethylene oxide adduct of acetylene diol which is used in the invention is represented by the following general formula (1).

General Formula (1)

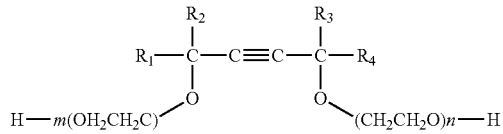

In the general formula (1), $R_1$, $R_2$, $R_3$ and $R_4$ each independently represents H or an alkyl group; and (m+n) is preferably from 0 to 4, more preferably from 0 to 3, and further preferably from 0 to 2.

In the specification of this application, the "alkyl group" as referred to herein means a monovalent saturated hydrocarbon group which is linear, branched or cyclic (which may be monocyclic or polycyclic; and in the case of a polycyclic group, it may be bridging or spiro) or is a combination thereof and is a concept including a cycloalkyl group, a cycloalkylalkyl group, and so on. The carbon atom number of the alkyl group in the general formula (1) is from 8 to 1, and preferably from 4 to 1 for $R_1$ and $R_4$ and from 8 to 1, and preferably from 4 to 1 for $R_2$ and $R_3$, respectively.

Specific examples of the preferred acetylene diol and the ethylene oxide adduct of acetylene diol include the following compounds.

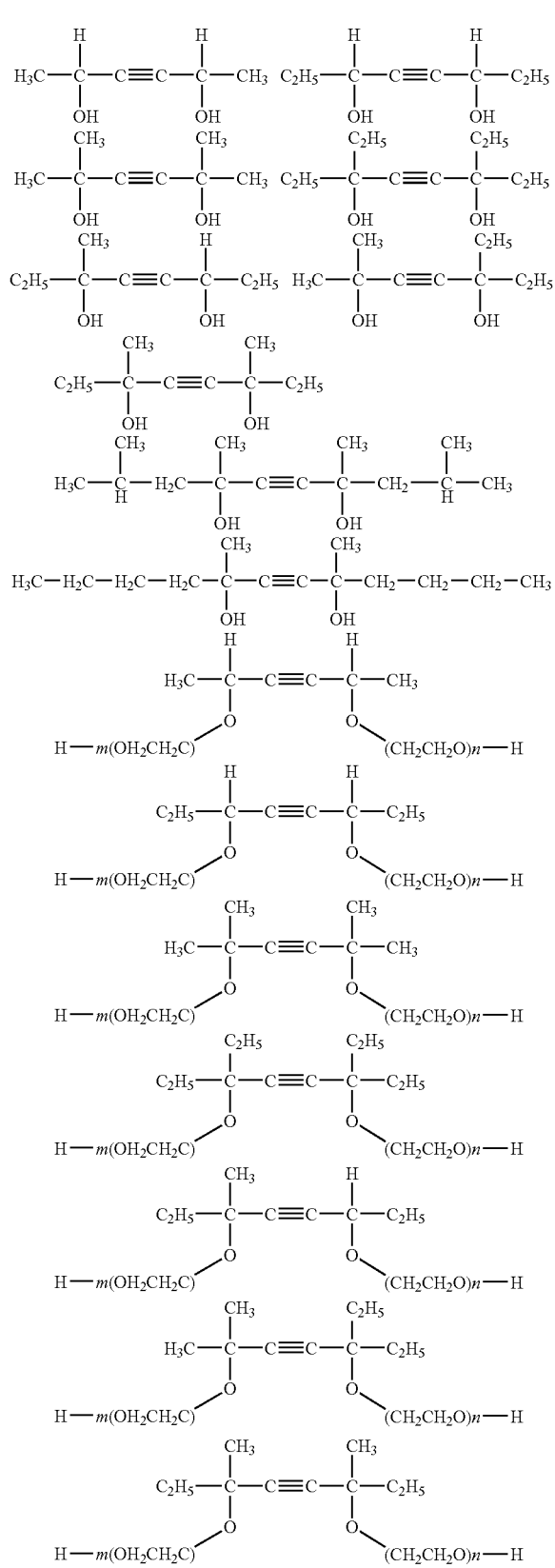

-continued

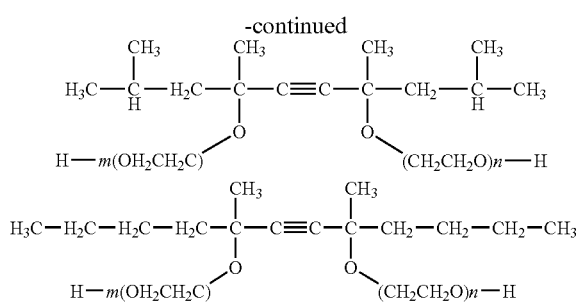

In the foregoing respect formulae, (m+n) is from 0 to 4.

The acetylene diol and/or the ethylene oxide adduct of acetylene diol may be added in the ink composition such that an average value of the addition molar number of ethylene oxide is 0 or more and less than 4, and preferably 0 or more and not more than 2. More preferably, acetylene diol to which ethylene oxide is not added may be added in the ink composition.

By such addition, even when used together with a dye having a heterocyclic group, not only an ability of the surfactant is not lowered, but also drying properties of an image can be improved and deteriorations of image quality such as beading can be controlled.

The "average value of the addition molar number of ethylene oxide in the ethylene oxide adduct of acetylene diol" as referred to herein is a value to show how many moles of a repeating unit of ethylene oxide (—$CH_2$—$CH_2$—O—) are added in average per mole of ethylene oxide of acetylene diol.

It is possible to know the addition molar number of ethylene oxide by a gas chromatographic or liquid chromatographic analysis method.

Furthermore, for example, in the case where products whose addition molar number of ethylene oxide is known are mixed and used, the average value of the addition molar number of ethylene oxide can be determined by computing an average molar value of ethylene oxide in the acetylene diol and/or the ethylene oxide adduct of acetylene diol.

A specific example will be given below. In the case where 10 g (0.044 moles) of a compound represented by the following formula (2), wherein (m+n) is 0 (for example, ACETYLENOL E00, manufactured by Kawaken Fine Chemicals Co., Ltd.) and 10 g (0.015 moles) of a compound represented by the formula (2), wherein (m+n) is 10 (for example, ACETYLENOL E100, manufactured by Kawaken Fine Chemicals Co., Ltd.) are mixed and used, the average value of the addition molar number of ethylene oxide becomes 2.5 moles.

General Formula (2)

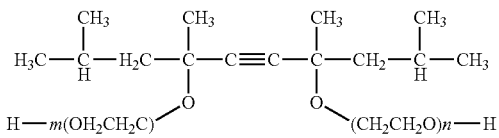

It is desired that the acetylene diol and/or the ethylene oxide adduct of acetylene diol which is used in the invention is preferably contained in a proportion of 5 to 50 g/L, more preferably from 8 to 30 g/L, and further preferably from 10 to 20 g/L in the ink composition. When the content is too low, the function as the surfactant cannot be thoroughly exhibited, and the improvement of drying properties of an image and the control of deteriorations of image quality such as beading become insufficient. On the other hand, when the content is too high, deteriorations in waterproof properties and oozing are observed.

Next, the coloring material having an azo group bound on a heterocyclic group which is used in the ink composition of the invention will be described. Though the subject coloring material can be a dye or a pigment, in general, the dye is preferable because it can be suitably used for aqueous inks. A dye having an azo group bound on a heterocyclic group (hereinafter sometimes referred to as "heterocyclic azo dye") will be hereunder described. Incidentally, in the ink composition of the invention, other dye and/or pigment may be used jointly.

The heterocyclic azo dye is not particularly limited so far as at least one structure having an azo group on a heterocyclic group is present. However, an azo dye having an azo group bound on a carbon atom of a heterocyclic ring is preferable. Furthermore, an azo dye having a structure in which a heterocyclic group is bound to the both ends of an azo group is preferable and represented by the following general formula (A).

A-N=N-B  General Formula (A)

In the formula, A and B each independently represents an optionally substituted heterocyclic group.

Furthermore, it is preferable that an oxidation potential of the heterocyclic azo dye is nobler than 1.0 V (vs SCE).

A value of the oxidation potential (Eox) can be easily measured by those skilled in the art. This method is described in, for example, P. Delahay, *New Instrumental Methods in Electrochemistry* (1954, Interscience Publishers), A. J. Bard, et al., *Electrochemical Methods* (1980, John Wiley & Sons), and Akira FUJISHIMA, et al., *Denki Kagaku Sokutei-ho* (Electrochemical Measurement Methods) (1984, Gihodo Shuppan Co., Ltd.).

Concretely, the oxidation potential is measured as a value against SCE (saturated calomel electrode) using various voltametries (for example, polarography using a dropping mercury electrode), cyclic voltametry, and a method using a rotary disc electrode) with respect to a solution resulting from dissolving from $1\times10^{-2}$ to $1\times10^{-6}$ moles/L of a sample to be tested in a solvent (for example, dimethyl formamide and acetonitrile) containing a supporting electrolyte such as sodium perchlorate and tetrapropylammonium perchlorate. Though this value may possibly be deviated by several tens millivolts due to a liquid junction potential or liquid resistance of the sample solution, it is possible to guarantee reproducibility of the potential by charging a standard sample (for example, hydroquinone).

Incidentally, in the invention, a value (vs SCE) measured in N,N-dimethylformamide containing, as a supporting electrolyte, 0.1 moles/$dm^3$ of tetrapropylammonium perchlorate (dye concentration: 0.001 moles/$dm^3$) by using SCE (saturated calomel electrode) as a reference electrode, a graphite electrode as a working electrode and a platinum electrode as a counter electrode was defined as the oxidation potential of dye.

The Eox value represents easiness of transfer of an electron from the sample to the electrode. The larger that value (the nobler the oxidation potential), the more difficult the transfer of an electron from the sample to the electrode is, in other words, the sample is hardly oxidized. In relation to the structure of a compound, by introducing an electron withdrawing group, the oxidation potential becomes noble, whereas by introducing an electron repelling group, the oxidation potential becomes base. In the invention, for the purpose of lowering reactivity with ozone as an electrophilic agent, it is desired to make the oxidation potential nobler by introducing an electron withdrawing group into a dye skeleton.

Furthermore, as the heterocyclic azo dye, $\epsilon 1/\epsilon 2$ is preferably 1.05 or more, more preferably from 1.1 to 2.0, and especially preferably from 1.12 to 1.5 according to the following evaluation method of association properties.

Evaluation Method of Association Properties of Dye

The association properties of dye can be evaluated in the following manner. A ratio ($\epsilon 1/\epsilon 2$) of a molecular extinction coefficient ($\epsilon 1$) of an absorption spectrum of solution when a dye solution of 0.01 mmoles/L is measured using a cell having an optical path length of 1 cm to a molecular extinction coefficient ($\epsilon 2$) of an absorption spectrum of solution when a dye solution of 20 mmoles/L is measured using a cell having an optical path length of 5 μm is an index of the association properties of dye. When this value is large, the dye is liable to associate. A dye having this value of 1.05 or more exhibits an excellent performance with respect to the ozone resistance and light resistance due to the association of dye.

With respect to the solvent which is used in the foregoing dye solution, if the dye is water-soluble, ultra-pure water having a resistivity value of 18 MΩ·cm or more, such as deionized water, is used; and if the dye is oil-soluble, in the case of forming a uniform solution, an organic solvent in which the dye is soluble is used, or a dispersion or emulsion in ultra-pure water likewise the case of a water-soluble dye is formed and provided for the measurement.

As the heterocyclic azo dye which is used in the invention, a compound represented by the following general formula (Y) and compounds represented by the following general formulae (Bk) and (M) are preferable.

The compound represented by the general formula (Y) is preferably a yellow dye. Furthermore, this dye preferably has at least one of the foregoing characteristics (oxidation potential and association properties) and more preferably has all of these characteristics.

The oxidation potential of this dye is more preferably nobler than 1.1 V (vs SCE), and especially preferably nobler than 1.15 V (vs SCE).

$$(A-N=N-B)_n-L \quad \text{General Formula (Y)}$$

In the formula, A and B each independently represents an optionally substituted heterocyclic group. L represents a hydrogen atom, a simple bond or a divalent connecting group. n represents 1 or 2. When n is 1, L represents a hydrogen atom; and A and B each represents a monovalent heterocyclic group. When n is 2, L represents a simple bond or a divalent connecting group; and one of A and B represents a monovalent heterocyclic group, and the other represents a divalent heterocyclic group. When n is 2, As may be the same or different, and Bs may be the same or different.

In the formula (Y), A and B each independently represents an optionally substituted heterocyclic group. The foregoing heterocyclic group is preferably a heterocyclic ring constituted of a 5-membered ring or a 6-membered ring and may be of a polycyclic structure in which two or more rings are fused or may be an aromatic heterocyclic ring or a non-aromatic heterocyclic ring. As the hetero atom which constitutes the foregoing heterocyclic ring, an N atom, an O atom and an S atom are preferable.

As the heterocyclic ring represented by A, 5-pyrazolone, pyrazole, triazole, oxazolone, isoxazolone, babituric acid, pyridone, pyridine, rhodanine, pyrazolidinedione, pyrazolopyridone, Meldrum's acid, and fused heterocyclic ring in which such a heterocyclic ring is fused with a hydrocarbon aromatic ring or a heterocyclic ring are preferable. Above all, 5-pyrazolone, 5-aminopyrazole, pyridone, 2,6-diaminopyridine, and pyrazoloazoles are preferable; and 5-aminopyrazole, 2-hydroxy-6-pyridone and pyrazolotriazole are especially preferable.

Examples of the heterocyclic ring represented by B include pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, isoxazole, benzoxazole, thiazole, benzothiazole, isothiazole, benzoisothiazole, thiadiazole, benzoisoxazole, pyrrolidine, piperidine, piperazine, imidazolidine, and thiazoline. Above all, pyridine, quinoline, thiophene, benzothiophene, pyrazole, imidazole, benzoimidazole, triazole, oxazole, isoxazole, benzoxazole, thiazole, benzothiazole, isothiazole, benzoisothiazole, thiadiazole, and benzoisoxazole are preferable; quinoline, thiophene, pyrazole, thiazole, benzoxazole, benzoisoxazole, isothiazole, imidazole, benzothiazole, and thiadiazole are more preferable; and pyrazole, benzothiazole, benzoxazole, imidazole, 1,2,4-thiadiazole, and 1,3,4-thiadiazole are especially preferable.

Examples of the substituent which substitutes on A and B include a halogen atom, an allyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or arylsulfonylamino group, a mercapto group, an alkylthio group, an arylthio group, a heterocyclic thio group, a sulfamoyl group, an alkyl- or arylsulfinyl group, an alkyl- or arylsulfonyl group, an acyl group, an aryloxycarbonyl group, an alkoxycarbonyl group, a carbamoyl group, an imide group, a phosphino group, a phosphinyl group, a phosphinyloxy group, a phosphinylamino group, a silyl group, and the following ionic hydrophilic groups.

Examples of the divalent connecting group represented by L include an alkylene group, an arylene group, a heterocyclic residue, —CO—, —SO$_n$— (wherein n represents 0, 1 or 2), —NR— (wherein R represents a hydrogen atom, an alkyl group, or an aryl group), —O—, and divalent groups resulting from combining these connecting groups. In addition, these divalent connecting groups may contain the substituents as enumerated above for the substituent which substitutes on A or B or the following ionic hydrophilic groups.

In the case where the dye of the general formula (Y) is used as a water-soluble dye, it is preferable that the dye contains at least one ionic hydrophilic group in the molecule thereof. Examples of the ionic hydrophilic group include a carboxyl group, a hydroxyl group present on an aromatic ring inclusive of an aromatic heterocyclic ring, a sulfo group, a phosphono group, a sulfonamide group, and a quaternary ammonium group. The ionic hydrophilic group is preferably a carboxyl group, a hydroxyl group present on an aromatic ring inclusive of an aromatic heterocyclic ring, a sulfo group, or a phosphono group. Of these, a carboxyl group, a hydroxyl group present on an aromatic ring inclusive of an aromatic heterocyclic ring, and a sulfo group are preferable. In particular, it is the most preferable that at least one of the ionic hydrophilic groups is a carboxyl group. Furthermore, a hydroxyl group present on an aromatic ring inclusive of an aromatic heterocyclic ring or a sulfonamide group is preferable because it has an action to enhance the storage stability of the dye in the ink.

The carboxyl group, the hydroxyl group present on an aromatic ring inclusive of an aromatic heterocyclic ring, the phosphono group, the sulfonamide group, and the sulfo group may be each in a salt state. Examples of a counter ion capable of forming a salt include an ammonium ion, an alkali metal ion (for example, a lithium ion, a sodium ion, and a potassium ion), and an organic cation (for example, a tetramethylammonium ion, a tetramethylguanidium ion, and a tetramethylphosphonium ion). Of these counter ions, an alkali metal salt is preferable.

Of the dyes represented by the general formula (Y), dyes in which the A-N=N-B moiety is corresponding to the following general formula (Y-A), (Y-B) or (Y-C) are preferable.

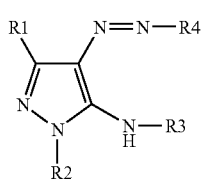

General Formula (Y-A)

In the general formula (Y-A), R1 and R3 each represents a hydrogen atom, a cyano group, an alkyl group, a cycloalkyl group, an aralkyl group, an alkoxy group, an alkylthio group, an arylthio group, an aryl group, or an ionic hydrophilic group; R2 represents a hydrogen atom, an alkyl group, a cycloalkyl group, a aralkyl group, a carbamoyl group, an acyl group, an aryl group, or a heterocyclic group; and R4 represents a heterocyclic group.

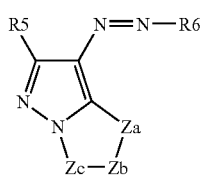

General Formula (Y-B)

In the general formula (Y-B), R5 represents a hydrogen atom, a cyano group, an alkyl group, a cycloalkyl group, an aralkyl group, an alkoxy group, an alkylthio group, an arylthio group, an aryl group, or an ionic hydrophilic group; Za represents —N=, —NH—, or —C(R11)=; Zb and Zc each independently represents —N= or —C(R11)=; R11 represents a hydrogen atom or a non-metal substituent; and R6 represents a heterocyclic group.

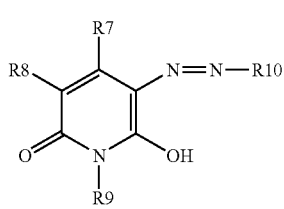

General Formula (Y-C)

In the general formula (Y-C), R7 and R9 each independently represents a hydrogen atom, a cyano group, an alkyl group, a cycloalkyl group, an aralkyl group, an aryl group, an alkylthio group, an arylthio group, an alkoxycarbonyl group, a carbamoyl group, or an ionic hydrophilic group; R8 represents a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxyl group, or an ionic hydrophilic group; and R10 represents a heterocyclic group.

In the foregoing general formulae (Y-A), (Y-B) and (Y-C), the alkyl group represented by R1, R2, R3, R5, R7, R8 and R9 includes a substituted alkyl group and an unsubstituted alkyl group. As the alkyl group, an alkyl group having from 1 to 20 carbon atoms is preferable. Examples of the substituent include a hydroxyl group, an alkoxy group, a cyano group, a halogen atom, and an ionic hydrophilic group. Examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group represented by R1, R2, R3, R5, R7, R8 and R9 includes a substituted cycloalkyl group and an unsubstituted cycloalkyl group. As the cycloalkyl group, a cycloalkyl group having from 5 to 12 carbon atoms is preferable. Examples of the substituent include an ionic hydrophilic group. Examples of the cycloalkyl group include cyclohexyl. The aralkyl group represented by R1, R2, R3, R5, R7, R8 and R9 includes a substituted aralkyl group and an unsubstituted aralkyl group. As the aralkyl group, an aralkyl group having from 7 to 20 carbon atoms is preferable. Examples of the substituent include an ionic hydrophilic group. Examples of the aralkyl group include benzyl and 2-phenethyl.

The aryl group represented by R1, R2, R3, R5, R7 and R9 includes a substituted aryl group and an unsubstituted aryl group. As the aryl group, an aryl group having from 6 to 20 carbon atoms is preferable. Examples of the substituent include a hydroxyl group, an alkyl group, an alkoxy group, a halogen atom, a cyano group, a carbamoyl group, a sulfamoyl group, an alkylamino group, an acylamino group, and an ionic hydrophilic group. Examples of the aryl group include phenyl, p-tolyl, p-methoxyphenyl, o-chlorophenyl, and m-(3-sulfopropylamino)phenyl.

The alkylthio group represented by R1, R2, R3, R5, R7, R8 and R9 includes a substituted alkylthio group and an unsubstituted alkylthio group. As the alkylthio group, an alkylthio group having from 1 to 20 carbon atoms is preferable. Examples of the substituent include an ionic hydrophilic group. Examples of the alkylthio group include methylthio and ethylthio. The arylthio group represented by R1, R2, R3, R5, R7, R8 and R9 includes a substituted arylthio group and an unsubstituted arylthio group. As the arylthio group, an arylthio group having from 6 to 20 carbon atoms is preferable. Examples of the substituent include substituents the same as those in the forgoing aryl group. Examples of the arylthio group include phenylthio and a p-tolylthio.

The heterocyclic group represented by R2 is preferably a 5-membered or 6-membered heterocyclic ring which may be further fused. As the hetero atom which constitutes the heterocyclic ring, N, O and S are preferable. Furthermore, the heterocyclic ring may be an aromatic heterocyclic ring or a non-aromatic heterocyclic ring. The heterocyclic ring may be further substituted. Examples of the substituent include substituents the same as those in the foregoing aryl group. The heterocyclic ring is preferably a 6-membered nitrogen-containing aromatic heterocyclic ring, and especially preferred examples thereof include triazine, pyrimidine, and phthalazine.

Examples of the halogen atom represented by R8 include a fluorine atom, a chlorine atom, and a bromine atom. The alkoxy group represented by R1, R3, R5 and R8 includes a substituted alkoxy group and an unsubstituted alkoxy group. As the alkoxy group, an alkoxy group having from 1 to 20 carbon atoms is preferable. Examples of the substituent include a hydroxyl group and an ionic hydrophilic group. Examples of the alkoxy group include methoxy, ethoxy, isopropoxy, methoxyethoxy, hydroxyethoxy, and 3-carboxypropoxy.

The aryloxy group represented by R8 includes a substituted aryloxy group and an unsubstituted aryloxy group. As the aryloxy group, an aryloxy group having from 6 to 20 carbon atoms is preferable. Examples of the substituent include substituents the same as those in the foregoing aryl group. Examples of the aryloxy group include phenoxy, p-methoxyphenoxy, and o-methoxyphenoxy. The acrylamino group represented by R8 includes a substituted acylamino group and an unsubstituted acylamino group. As the acylamino group, an acylamino group having from 2 to 20 carbon atoms is preferable. Examples of the substituent include substituents the same as those in the foregoing aryl group. Examples of the acylamino group include acetamide, propionamide, benzamide, and 3,5-disulfobenzamide.

The sulfonylamino group represented by R8 includes an alkylsulfonylamino group, an arylsulfonylamino group, and a heterocyclic sulfonylamino group, and each of the alkyl group moiety, the aryl group moiety and the heterocyclic group moiety may have a substituent. Examples of the substituent include substituents the same as those in the foregoing aryl group. As the sulfonylamino group, a sulfonylamino group having from 1 to 20 carbon atoms is preferable. Examples of the sulfonylamino group include methylsulfonylamino and ethylsulfonylamino. The alkoxycarbonylamino group represented by R8 includes a substituted alkoxycarbonylamino group and an unsubstituted alkoxycarbonylamino group. As the alkoxycarbonmylamino group, an alkoxycarbonylamino group having from 2 to 20 carbon atoms is preferable. Examples of the substituent include an ionic hydrophilic group. Examples of the alkoxycarbonylamino group include ethoxycarbonylamino.

The ureido group represented by R8 includes a substituted ureido group and an unsubstituted ureido group. As the ureido group, a ureido group having from 1 to 20 carbon atoms is preferable. Examples of the substituent include an alkyl group and an aryl group. Examples of the ureido group include 3-methylureido, 3,3-dimethylureido, and 3-phenylureido.

The alkoxycarbonyl group represented by R7, R8 and R9 includes a substituted alkoxycarbonyl group and an unsubstituted alkoxycarbonyl group. As the alkoxycarbonyl group, an alkoxycarbonyl group heaving from 2 to 20 carbon atoms is preferable. Examples of the substituent include an ionic hydrophilic group. Examples of he alkoxycarbonyl group include methoxycarbonyl and ethoxycarbonyl.

The carbamoyl group represented by R2, R7, R8 and R9 includes a substituted carbamoyl group and an unsubstituted carbamoyl group. Examples of the substituent include an alkyl group. Examples of the carbamoyl group include a methylcarbamoyl group and a dimethylcarbamoyl group.

The sulfamoyl group represented by R8 includes a substituted sulfamoyl group and an unsubstituted sulfamoyl group. Examples of the substituent include an alkyl group. Examples of the sulfamoyl group include a dimethylsulfamoyl group and a di(2-hydroxyethyl)sulfamoyl group.

The sulfonyl group represented by R8 includes an alkylsulfonyl group, an arylsulfonyl group, and a heterocyclic sulfonyl group, each of which may be further substituted. Examples of the substituent include an ionic hydrophilic group. Examples of the sulfonyl group include methylsulfonyl and phenylsulfonyl.

The acyl group represented by R2 and R8 includes a substituted acyl group and an unsubstituted acyl group. As the acyl group, an acyl group having from 1 to 20 carbon atoms is preferable. Examples of the substituent include an ionic hydrophilic group. Examples of the acyl group include acetyl and benzoyl.

The amino group represented by R8 includes a substituted amino group and an unsubstituted amino group. Examples of the substituent include an alkyl group, an aryl group, and a heterocyclic group. Examples of the amino group include methylamino, diethylamino, anilino, and 2-chloroanilino.

The heterocyclic group represented by R4, R6 and R10 is a substituent the same as the optionally substituted substituent represented by B of the general formula (Y), and its preferred examples, more preferred examples and especially preferred examples are also the same as described previously. Examples of the substituent include an ionic hydrophilic group, an alkyl group having from 1 to 12 carbon atoms, an aryl group, an alkyl- or arylthio group, a halogen atom, a cyano group, a sulfamoyl group, a sulfonamino group, a carbamoyl group, and an acylamino group. Each of the alkyl group and the aryl group may be further substituted.

In the foregoing general formula (Y-B), Za represents —N═, —NH—, or —C(R11)═; Zb and Zc each independently represents —N═ or —C(R11)═; and R11 represents a hydrogen atom or a non-metal substituent. As the non-metal substituent represented by R11, a cyano group, a cycloalkyl group, an aralkyl group, an aryl group, an alkylthio group, an arylthio group, and an ionic hydrophilic group are preferable. Each of the substituents is synonymous with each of the substituents represented by R1, and preferred examples thereof are also the same. Examples of the skeleton of the heterocyclic ring constituted of two 5-membered rings, which is included in the foregoing general formula (Y-B), are given below.

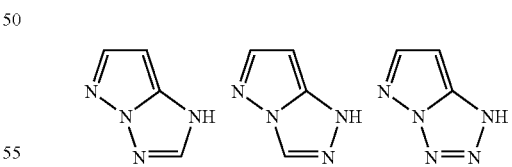

In the case where each of the substituents as described previously may be further substituted, examples of the substituent include the foregoing substituents which may be substituted on the heterocyclic ring A or B of the general formula (Y).

Of the general formulae (Y-A), (Y-B) and (Y-C), the general formula (Y-A) is preferable. Above all, compounds represented by the following general formula (Y-A1) are especially preferable.

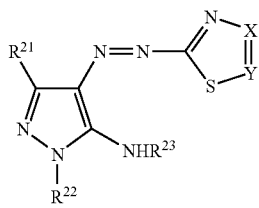

General Formula (Y-A1)

In the general formula (Y-A1), $R^{21}$ and $R^{23}$ each represents a hydrogen atom, an alkyl group, a cycloalkyl group, an aralkyl group, an alkoxy group, or an aryl group. $R^{22}$ represents a hydrogen atom, an aryl group, or a heterocyclic group. One of X and Y represents a nitrogen atom, and the other represents —$CR^{24}$. $R^{24}$ represents a hydrogen atom, a halogen atom, a cyano group, an alkyl group, an alkylthio group, an alkylsulfonyl group, an alkylsulfinyl group, an alkyloxycarbonyl group, a carbamoyl group, an alkoxy group, an aryl group, an arylthio group, an arylsulfonyl group, an arylsulfinyl group, an aryloxy group, or an acylamino group. Of these, a hydrogen atom, an alkyl group, an alkyl- or arylthio group, and an aryl group are preferable; and a hydrogen atom, an alkylthio group, and an aryl group are especially preferable. Each of the substituents may be further substituted.

Preferred examples of the dye which is used in the invention include dyes described in Japanese Patent Application Nos. 2004-30288 and 2003-286844, JP-A-2003-277662, JP-A-2003-277661, JP-A-2003-128953, and JP-A-2003-41160. Specific examples of the especially preferred dye will be hereunder given in a free state. However, it should not be construed that the dye which is used in the invention is limited thereto, and the ionic hydrophilic group may be in a slat state. Examples of the counter ion capable of forming a salt include an ammonium ion, an alkali metal ion (for example, a lithium ion, a sodium ion, and a potassium ion) and an organic cation (for example, a tetramethylammonium ion, a tetramethylguanidinium ion, and a tetramethylphosphonium ion). Of the counter ions, an alkali metal salt is preferable.

| Dye | L |
|---|---|
| 1 | —SCH$_2$CH$_2$S— |
| 2 | —SO$_2$CH$_2$CH$_2$SO$_2$— |
| 3 | —SCH$_2$CH$_2$CH$_2$S— |
| 4 | —SCH$_2$CHS—<br>          |<br>          CH$_3$ |
| 5 | —SCH$_2$CH$_2$OCH$_2$CH$_2$S— |
| 6 | —SCH$_2$CHCH$_2$S—<br>          |<br>          CH |
| 7 |           CH$_2$OH<br>          |<br>—SCH$_2$CHS— |
| 8 |           CO$_2$H<br>          |<br>—SCH$_2$CHS— |
| 9 | —SCH$_2$—(m-C$_6$H$_4$)—CH$_2$S— |
| 10 | benzene ring with HO$_2$C, CO$_2$H, —S, S— substituents |
| 11 | —S—(pyridazine)—S— |
| 12 | (m-substituted benzene) |

-continued
| | 13 |  | |
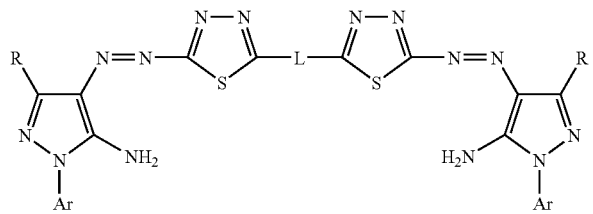
| Dye | Ar | L | R |
| --- | --- | --- | --- |
| 14 | 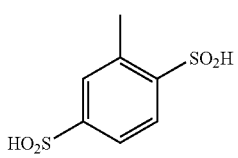 | —SCH$_2$CH$_2$CH$_2$S— | t-C$_4$H$_9$— |
| 15 |  | —SCH$_2$CH$_2$CH$_2$S— | t-C$_4$H$_9$— |
| 16 | 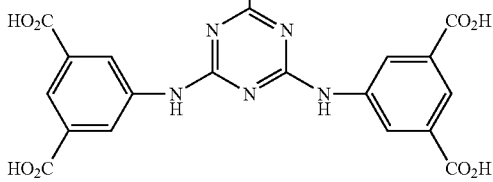 | —SCH$_2$CH$_2$CH$_2$S— | t-C$_4$H$_9$— |
| 17 | 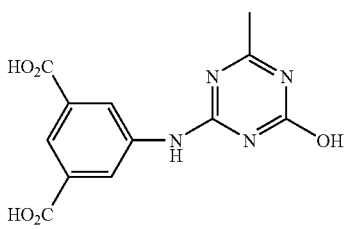 | —SCH$_2$CH$_2$S— | t-C$_4$H$_9$— |
| 18 | 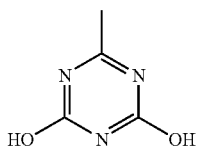 | —SCH$_2$CH$_2$S— | 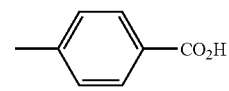 |
| 19 | 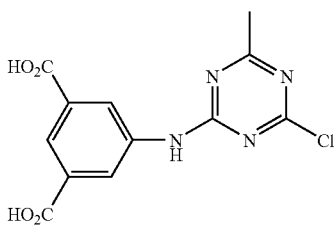 | —SCH$_2$CH$_2$S— | t-C$_4$H$_9$— |

-continued
| | | | |
|---|---|---|---|
| 20 | 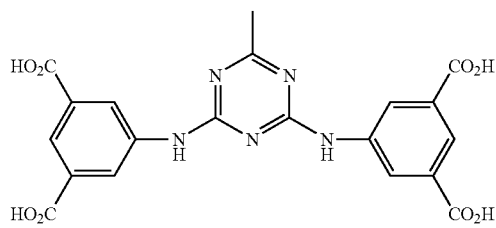 | 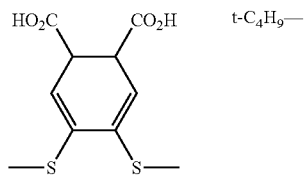 | t-C₄H₉— |
| 21 | 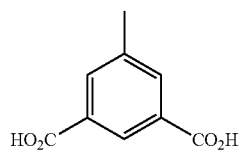 |  —SCH₂CH₂CH₂S— | Ph |
| 22 | 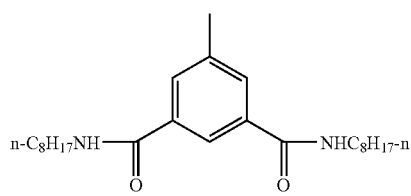 |  —SCH₂CH₂CH₂S— | t-C₄H₉— |
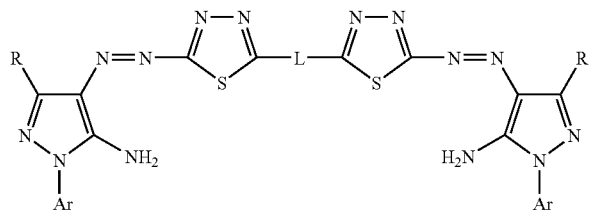
| Dye | Ar | L | R |
|---|---|---|---|
| 23 | 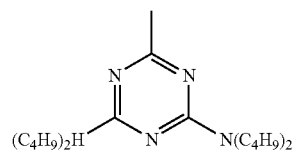 | 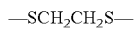 —SCH₂CH₂S— | t-C₄H₉— |
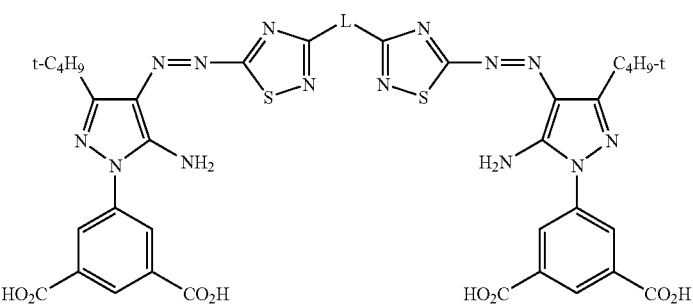
| Dye | L |
|---|---|
| 24 |  —SCH₂CH₂CH₂S— |
| 25 | 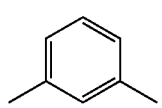 |

-continued

[Structure: bis-pyrazole azo dye with R, Ar, L substituents, NH₂ groups]

| Dye | Ar | L | R |
|---|---|---|---|
| 26 | 5-methyl-1,3,4-thiadiazol-2-yl-S- linked to 3,4-dicarboxyphenyl (CO₂H, CO₂H) | -C₆H₄-CONH-(2-SO₃H-biphenyl-2'-SO₃H)-NHCO-C₆H₄- | t-C₄H₉— |
| 27 | 5-methyl-1,3,4-thiadiazol-2-yl-SCH₂CO₂H | -C₆H₄-CONH-(2-SO₃H-biphenyl-2'-SO₃H)-NHCO-C₆H₄- | t-C₄H₉— |
| 28 | 5-methyl-1,3,4-thiadiazol-2-yl | 2,2'-disulfo-4,4'-biphenyl with additional SO₃H | t-C₄H₉— |

[Structure: bis-pyrazole azo dye with R, Ar, L substituents, NH₂ groups]

| Dye | Ar | L | R |
|---|---|---|---|
| 29 | 5-methyl-1,3,4-thiadiazol-2-yl-SCH₃ | -C₆H₄-CONH-(2-SO₃H-biphenyl-2'-SO₃H)-NHCO-C₆H₄- | t-C₄H₉— |
| 30 | 5-methyl-1,3,4-thiadiazol-2-yl-SC₆H₁₃-n | 4,4'-biphenylene | t-C₄H₉— |
| 31 | 5-methyl-1,3,4-thiadiazol-2-yl-S- linked to 3,4-dicarboxyphenyl | bis-triazinyl linker with 3,5-dicarboxyphenylamino groups and phenylene bridge | t-C₄H₉— |
| 32 | 5-methyl-1,3,4-thiadiazol-2-yl | bis-triazinyl linker -NHC₂H₄NH- with N(CH₂CO₂H)₂ groups | t-C₄H₉— |

-continued

| Dye | Ar | L | R |
|---|---|---|---|
| 33 | 5-methyl-1,3,4-thiadiazol-2-yl | bis-triazine linker with two 3,5-dicarboxyphenylamino groups and —NHC₂H₄NH— bridge, methyl substituents on triazines | t-C₄H₉— |
| 34 | 2-(methylthio)-5-methyl-1,3,4-thiadiazol-2-yl | bis-triazine linker with two 3,5-dicarboxyphenylamino end groups bridged through a 2,5-dicarboxy-1,4-phenylenediamino unit, methyl substituents on triazines | t-C₄H₉— |
| 35 | 5-methyl-1,3,4-thiadiazol-2-yl | bis-triazine linker with terminal —N(C₄H₉)₂ groups and —NHC₂H₄NH— bridge, methyl substituents on triazines | t-C₄H₉— |

| Dye | Ar | R1 | R2 |
|---|---|---|---|
| 36 | 5-methyl-1,3,4-thiadiazol-2-yl | t-C₄H₉— | —NH—(3,5-dicarboxyphenyl) |
| 37 | 2-[(5-methyl-1,3,4-thiadiazol-2-yl)thio]-4,5-dicarboxyphenyl (3,4-dicarboxyphenylthio-substituted thiadiazole) | t-C₄H₉— | —OH |

-continued
| | | | |
|---|---|---|---|
| 38 | 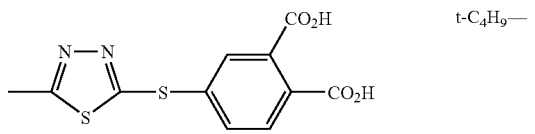 | t-C$_4$H$_9$— | —SO$_3$H |
| 39 | 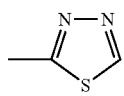 | Ph | —NHC$_{12}$H$_{25}$-n |
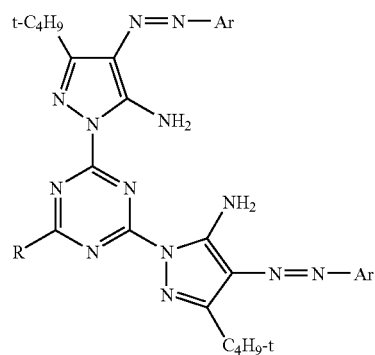
| Dye | Ar | | R |
|---|---|---|---|
| 40 | 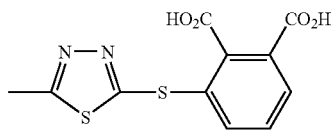 | | —OH |
| 41 | 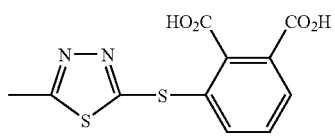 | | —SH |
| 42 | 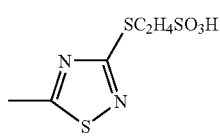 | | 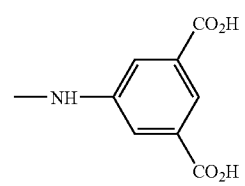 |

-continued
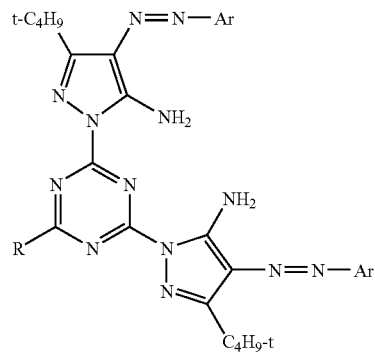
| Dye | Ar | R |
|---|---|---|
| 43 | [5-methyl-1,3,4-thiadiazol-2-yl-S-phenyl with 2 CO₂H groups] | [—NH-naphthyl with 2 SO₃H groups] |
| 44 | [2-methyl-1-(CH₂CO₂H)-imidazole with 2 CN groups] | —NHC₂H₄SO₃H |
| 45 | [5-methyl-1,3,4-thiadiazol-2-yl-SCH₂CO₂H] | [—NH-naphthyl with 2 SO₃H groups] |
| 46 | [5-methyl-1,3,4-thiadiazol-2-yl-SCH(CO₂H)CH₂CO₂H] | —S(CH₂)₃SO₃H |
| 47 | [5-methyl-3-phenyl-1,2,4-thiadiazol-2-yl] | —N(CH₂CHC₄H₉-n)₂ with C₂H₅ |
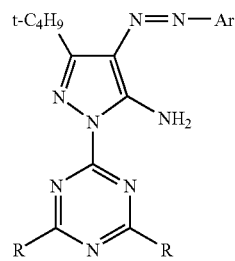
| Dye | Ar | R |
|---|---|---|
| 48 | [5-methyl-1,3,4-thiadiazol-2-yl] | —NHC₂H₄SO₃H |

-continued
| | | |
|---|---|---|
| 49 | 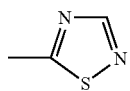 | 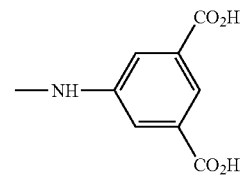 |
| 50 | 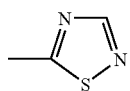 | 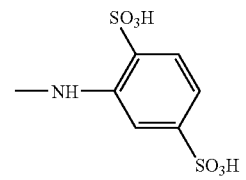 |
| 51 | 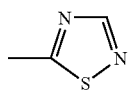 | 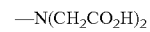 —N(CH$_2$CO$_2$H)$_2$ |
| 52 | 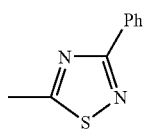 | 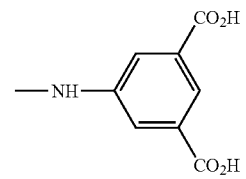 |
| 53 | 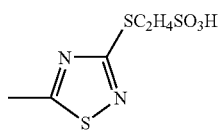 |  —OH |
| 54 |  | 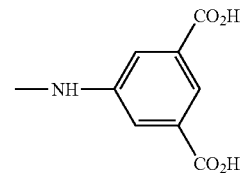 |
| 55 | 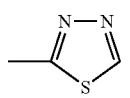 | 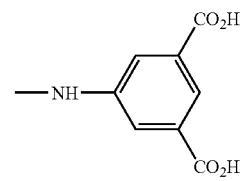 |
| 56 | 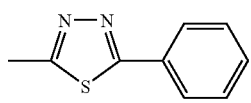 | 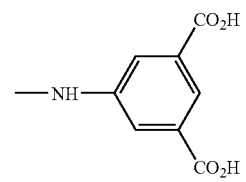 |
| 57 | 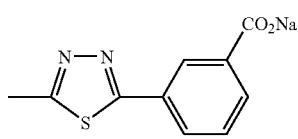 | 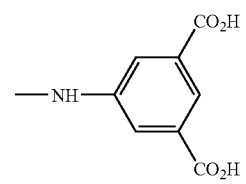 |

-continued
| | | |
|---|---|---|
| 58 | 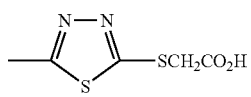 | 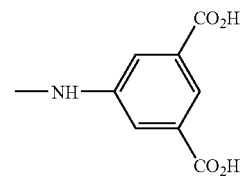 |
| 59 | 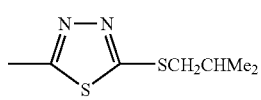 | 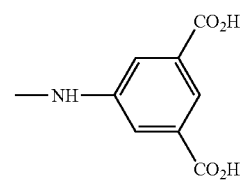 |
| 60 | 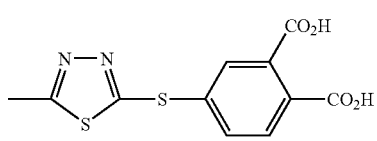 | 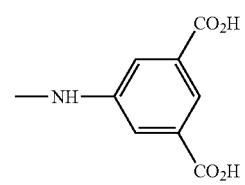 |
| 61 | 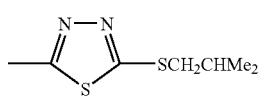 | 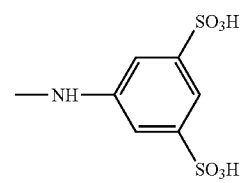 |
| 62 | 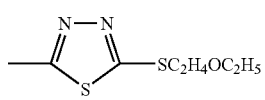 | 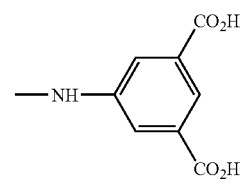 |
| 63 | 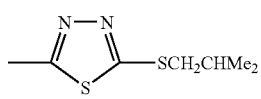 | —NHC$_8$H$_{17}$-n |
| 64 | 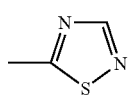 | —N(CH$_2$CHC$_4$H$_9$-n)$_2$<br>\|<br>C$_2$H$_5$ |
| 65 | 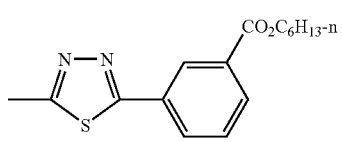 | —NHC$_6$H$_{13}$-n |

-continued
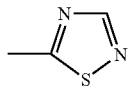
| Dye | Ar | R1 | R2 |
|---|---|---|---|
| 66 | 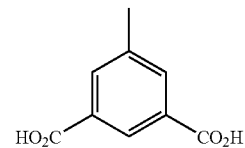 | t-C$_4$H$_9$— | 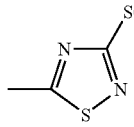 |
| 67 | 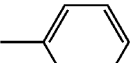 | 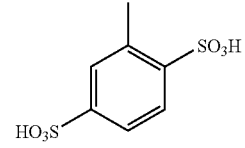 | 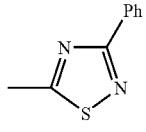 |
| 68 | 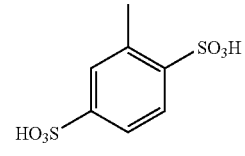 | t-C$_4$H$_9$— | 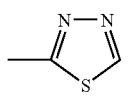 |
| 69 | 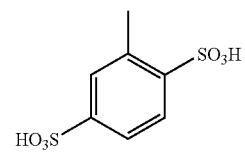 | t-C$_4$H$_9$— | 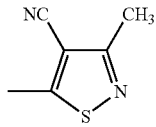 |
| 70 | 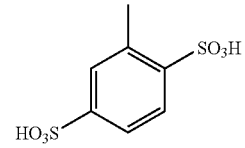 | t-C$_4$H$_9$— | 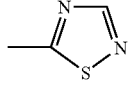 |
| 71 | 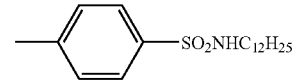 | t-C$_4$H$_9$— | 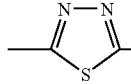 |
| 72 | 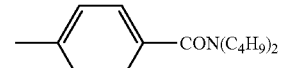 | t-C$_4$H$_9$— | 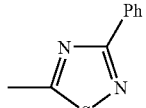 |
| 73 | 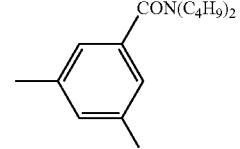 | t-C$_4$H$_9$— |  |

-continued
| | | | |
|---|---|---|---|
| 74 | 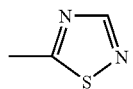 | t-C₄H₉— | 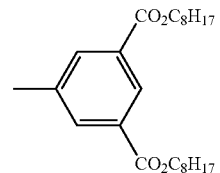 |
| 75 | | | 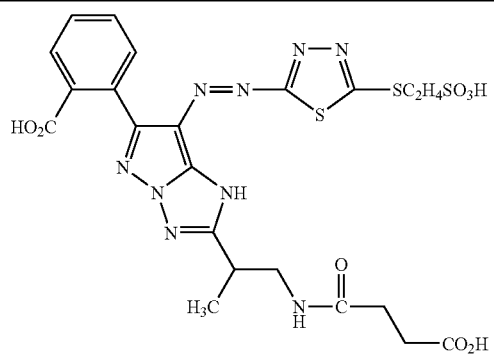 |
| 76 | | | 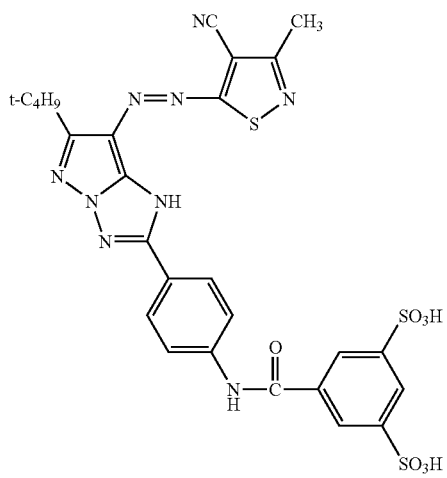 |
| 77 | | | 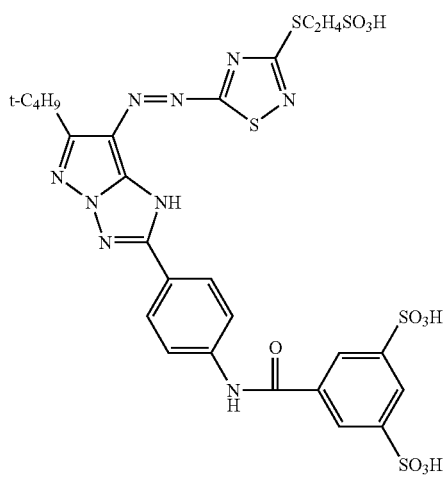 |

-continued
78
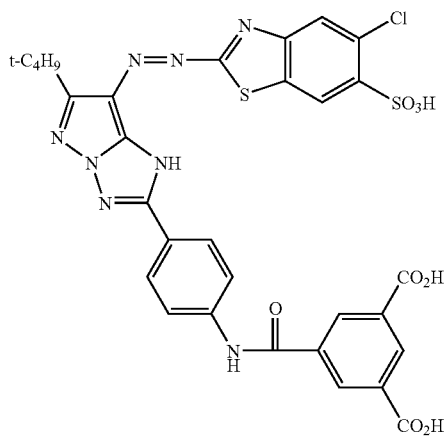
79
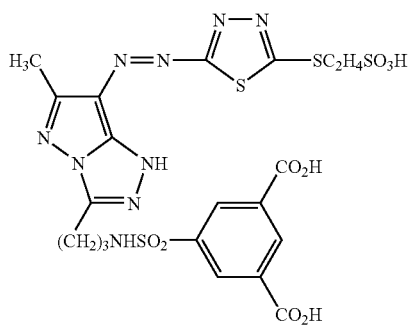
80
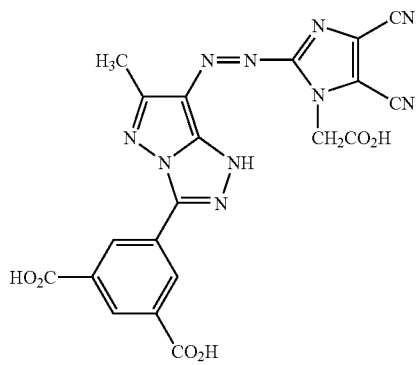
81
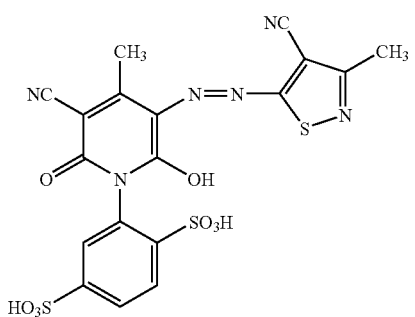

-continued

82

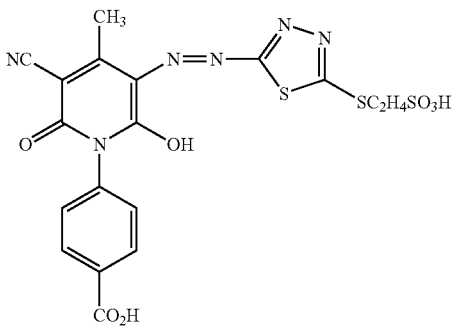

83

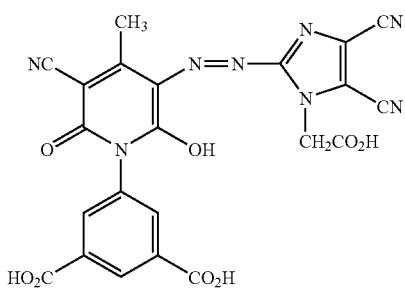

84

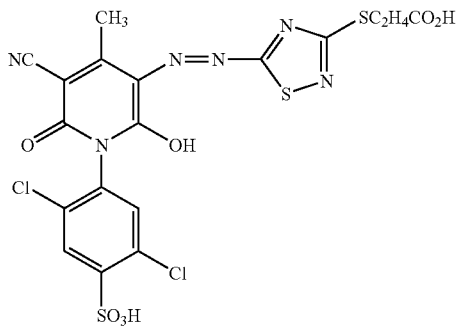

The compound represented by the general formula (Bk) will be hereunder described. The compound represented by the general formula (Bk) is preferably a black dye. Furthermore, this dye preferably has at least one of the foregoing characteristics (oxidation potential and association properties) and more preferably has all of these characteristics. The oxidation potential of this dye is more preferably nobler than 1.1 V (vs SCE), and especially preferably nobler than 1.15 V (vs SCE).

$$A_1-N=N-A_2-N=N-A_3 \quad \text{General Formula (Bk)}$$

In the formula, $A_1$, $A_2$ and $A_3$ each independently represents an optionally substituted aromatic group or an optionally substituted heterocyclic group (provided that at least one of $A_1$, $A_2$ and $A_3$ represents a heterocyclic group). $A_1$ and $A_3$ are each a monovalent group, and $A_2$ is a divalent group.

The azo dye represented by the general formula (Bk) is especially preferably a dye represented by the following general formula (Bk-a).

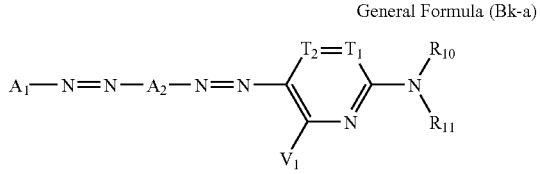

General Formula (Bk-a)

In the foregoing general formula (Bk-a), $T_1$ and $T_2$ each represents $=CR_{12}-$ or $-CR_{13}=$; or either one of them represents a nitrogen atom, and the other represents $=CR_{12}-$ or $-CR_{13}=$.

$V_1$, $R_{12}$ and $R_{13}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (inclusive of an alkylamino group, an arylamino group, and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group, or a sulfo group; and each of these groups may be further substituted.

$R_{10}$ and $R_{11}$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, or a sulfamoyl group; and each of these groups may be further substituted.

Furthermore, $R_{12}$ and $R_{10}$, or $R_{10}$ and $R_{11}$ may be taken together to form a 5-membered or 6-membered ring.

$A_1$ and $A_2$ are synonymous with those in the general formula (Bk).

The azo dye represented by the general formula (Bk-a) is more preferably a dye represented by the following general formula (Bk-b-1) or (Bk-b-2).

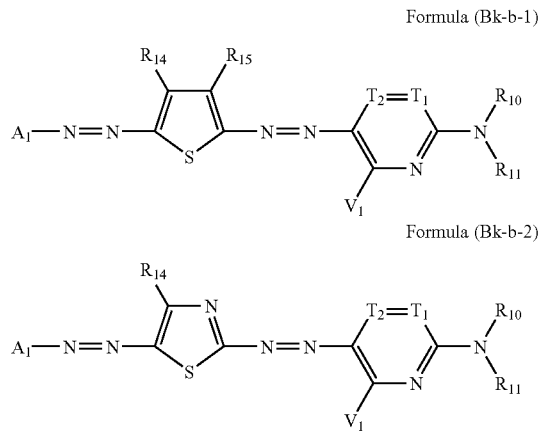

Formula (Bk-b-1)

Formula (Bk-b-2)

In the foregoing general formula (Bk-b-1) and general formula (Bk-b-2), $R_{14}$ and $R_{15}$ are synonymous with $R_{12}$ in the general formula (Bk-a). $A_1$, $R_{10}$, $R_{11}$, $T_1$, $T_2$ and $V_1$ are synonymous with those in the general formula (Bk-a).

The terminologies (substituents) which are used in the descriptions of the general formula (Bk), the general formula (Bk-a), the general formula (Bk-b-1) and the general formula (Bk-b-2) (when the general formula (Bk-b-1) and the general formula (Bk-b-2) are shown in summary, they will be hereinafter referred to "general formula (Bk-b)") will be hereunder described. These terminologies are common in the description of the general formula (Bk-c) as described later.

Examples of the halogen atom include a fluorine atom, a chlorine atom, and a bromine atom.

The aliphatic group means an alkyl group, a substituted alkyl group, an alkenyl group, a substituted alkenyl group, an alkynyl group, a substituted alkynyl group, an aralkyl group, or a substituted aralkyl group. The aliphatic group may be branched or may form a ring. The aliphatic group preferably has from 1 to 20 carbon atoms, and more preferably from 1 to 16 carbon atoms. The aryl moiety of the aralkyl group or the substituted aralkyl group is preferably phenyl or naphthyl, and especially preferably phenyl. Examples of the aliphatic group include methyl, ethyl, butyl, isopropyl, t-butyl, hydroxyethyl, methoxyethyl, cyanoethyl, trifluoromethyl, 3-sulfopropyl, 4-sulfobutyl, a cyclohexyl group, a benzyl group, a 2-phenethyl group, a vinyl group, and an allyl group.

A monovalent aromatic group means an aryl group or a substituted aryl group. The aryl group is preferably phenyl or naphthyl, and especially preferably phenyl. The monovalent aromatic group preferably has from 6 to 20 carbon atoms, and more preferably from 6 to 16 carbon atoms. Examples of the monovalent aromatic group include phenyl, p-tolyl, p-methoxyphenyl, o-chlorophenyl, and m-(3-sulfopropylamino) phenyl. A divalent aromatic group is a group resulting from converting such a monovalent aromatic group so as to have a valence of two. Examples thereof include phenylene, p-tolylene, p-methoxyphenylene, o-chlorophenylene, m-(3-sulfopropylamino)phenylene, and naphthylene.

The heterocyclic group includes a substituted heterocyclic group and an unsubstituted heterocyclic group. The heterocyclic ring may be fused with an aliphatic ring, an aromatic ring or other heterocyclic ring. As the heterocyclic ring, a 5-membered or 6-membered heterocyclic ring is preferable, and examples of the hetero atom of the heterocyclic ring include N, O, and S. Examples of the substituent include an aliphatic group, a halogen atom, an alkyl or arylsulfonyl group, an acyl group, an acylamino group, a sulfamoyl group, a carbamoyl group, and an ionic hydrophilic group. Examples of the monovalent heterocyclic group include a 2-pyridyl group, a 2-thienyl group, a 2-thiazolyl group, a 2-benzothiazolyl group, a 2-benzoxazolyl group, and a 2-furyl group. The divalent heterocyclic group is a group resulting from eliminating a hydrogen atom in the monovalent heterocyclic ring, thereby converting it a bond.

The carbamoyl group includes a substituted carbamoyl group and an unsubstituted carbamoyl group. Examples of the substituent include an alkyl group. Examples of the carbamoyl group include a methylcarbamoyl group and a dimethylcarbamoyl group.

The alkoxycarbonyl group includes a substituted alkoxycarbonyl group and an unsubstituted alkoxycarbonyl group. As the alkoxycarbonyl group, an alkoxycarbonyl group having from 2 to 20 carbon atoms is preferable. Examples of the substituent include an ionic hydrophilic group. Examples of the alkoxycarbonyl group include a methoxycarbonyl group and an ethoxycarbonyl group.

The aryloxycarbonyl group includes a substituted aryloxycarbonyl group and an unsubstituted aryloxycarbonyl group. As the aryloxycarbonyl group, an aryloxycarbonyl group having from 7 to 20 carbon atoms is preferable. Examples of the substituent include an ionic hydrophilic group. Examples of the aryloxycarbonyl group include a phenoxycarbonyl group.

The heterocyclic oxycarbonyl group includes a substituted heterocyclic oxycarbonyl group and an unsubstituted heterocyclic oxycarbonyl group. As the heterocyclic oxycarbonyl group, a heterocyclic oxycarbonyl group having from 2 to 20 carbon atoms is preferable. Examples of the substituent include an ionic hydrophilic group. Examples of the heterocyclic oxycarbonyl group include a 2-pyridyloxycarbonyl group.

The acyl group includes a substituted acyl group and an unsubstituted acyl group. As the acyl group, an acyl group having from 1 to 20 carbon atoms is preferable. Examples of the substituent include an ionic hydrophilic group. Examples of the acyl group include an acetyl group and a benzoyl group.

The alkoxy group includes a substituted alkoxy group and an unsubstituted alkoxy group. As the alkoxy group, an alkoxy group having from 1 to 20 carbon atoms is preferable. Examples of the substituent include an alkoxy group, a hydroxyl group, and an ionic hydrophilic group. Examples of the alkoxy group include a methoxy group, an ethoxy group, an isopropoxy group, a methoxyethoxy group, a hydroxyethoxy group, and a 3-carboxypropoxy group.

The aryloxy group includes a substituted aryloxy group and an unsubstituted aryloxy group. As the aryloxy group, an aryloxy group having from 6 to 20 carbon atoms is preferable. Examples of the substituent include an alkoxy group and an ionic hydrophilic group. Examples of the aryloxy group include a phenoxy group, a p-methoxyphenoxy group, and an o-methoxyphenoxy group.

The heterocyclic oxy group includes a substituted heterocyclic oxy group and an unsubstituted heterocyclic oxy group. As the heterocyclic oxy group, a heterocyclic oxy group having from 2 to 20 carbon atoms is preferable. Examples of the substituent include an alkyl group, an alkoxy group, and an ionic hydrophilic group. Examples of the heterocyclic oxy group include a 3-pyridyloxy group and a 3-thienyloxy group.

As the silyloxy group, a silyloxy group on which an aliphatic group or an aromatic group having from 1 to 20 carbon atoms is substituted is preferable. Examples of the silyloxy group include trimethylsilyloxy and diphenylmethylsilyloxy.

The acyloxy group includes a substituted acyloxy group and an unsubstituted acyloxy group. As the acyloxy group, an acyloxy group having from 1 to 20 carbon atoms is preferable. Examples of the substituent include an ionic hydrophilic group. Examples of the acyloxy group include an acetoxy group and a benzoyloxy group.

The carbamoyloxy group includes a substituted carbamoyloxy group and an unsubstituted carbamoyloxy group. Examples of the substituent include an alkyl group. Examples of the carbamoyloxy group include an N-methylcarbamoyloxy group.

The alkoxycarbonyloxy group includes a substituted alkoxycarbonyloxy group and an unsubstituted alkoxycarbonyloxy group. As the alkoxycarbonyloxy group, an alkoxycarbonyloxy group having from 2 to 20 carbon atoms is preferable. Examples of the alkoxycarbonyloxy group include a methoxycarbonyloxy group and an isopropoxycarbonyloxy group.

The aryloxycarbonyloxy group includes a substituted aryloxycarbonyloxy group and a substituted aryloxycarbonyloxy group. As the aryloxycarbonyloxy group, an aryloxycarbonyloxy group having from 7 to 20 carbon atoms is preferable. Examples of the aryloxycabonyloxy group include a phenoxycarbonyloxy group.

The amino group includes an amino group which is substituted with an alkyl group, an aryl group or a heterocyclic group, and the alkyl group, the aryl group or the heterocyclic group may be further substituted. As the alkylamino group, an alkylamino group having from 1 to 20 carbon atoms is preferable. Examples of the substituent include an ionic hydrophilic group. Examples of the alkylamino group include a methylamino group and a diethylamino group.

The arylamino group includes a substituted arylamino group and an unsubstituted arylamino group. As the arylamino group, an arylamino group having from 6 to 20 carbon atoms is preferable. Examples of the substituent include a halogen atom and an ionic hydrophilic group. Examples of the arylamino group include an anilino group and a 2-chlorophenylamino group.

The heterocyclic amino group includes a substituted amino group and an unsubstituted amino group. As the heterocyclic amino group, a heterocyclic amino group having from 2 to 20 carbon atoms is preferable. Examples of the substituent include an alkyl group, a halogen atom, and an ionic hydrophilic group.

The acylamino group includes a substituted acylamino group and an unsubstituted acylamino group. As the acylamino group, an acylamino group having from 2 to 20 carbon atoms is preferable. Examples of the substituent include an ionic hydrophilic group. Examples of the acylamino group include an acetylamino group, a propionylamino group, a benzoylamino group, an N-phenylacetylamino group, and a 3,5-disulfobenzoylamino group.

The ureido group includes a substituted ureido group and an unsubstituted ureido group. As the ureido group, a ureido group having from 1 to 20 carbon atoms is preferable. Examples of the substituent include an alkyl group and an aryl group. Examples of the ureido group include a 3-methylureido group, a 3,3-dimethylureido group, and a 3-phenylureido group.

The sulfamoylamino group includes a substituted sulfamoylamino group and an unsubstituted sulfamoylamino group. Examples of the substituent include an alkyl group. Examples of the sulfamoylamino group include an N,N-dipropylsulfamoylamino group.

The alkoxycarbonylamino group includes a substituted alkoxycarbonylamino group and an unsubstituted alkoxycarbonylamino group. As the alkoxycarbonylamino group, an alkoxycarbonylamino group having from 2 to 20 carbon atoms is preferable. Examples of the substituent include an ionic hydrophilic group. Examples of the alkoxycarbonylamino group include an ethoxycarbonylamino group.

The aryloxycarbonylamino group includes a substituted aryloxycarbonylamino group and an unsubstituted aryloxycarbonyl group. As the aryloxycarbonylamino group, an aryloxycarbonylamino group having from 7 to 20 carbon atoms is preferable. Examples of the substituent include an ionic hydrophilic group. Examples of the aryloxycarbonylamino group include a phenoxycarbonylamino group.

The alkyl- or arylsulfonylamino group includes a substituted alkyl- or arylsulfonylamino group or an unsubstituted alkyl- or arylsulfonylamino group. As the sulfonylamino group, a sulfonylamino group having from 1 to 20 carbon atoms is preferable. Examples of the substituent include an ionic hydrophilic group Examples of the sulfonylamino group include a methylsulfonylamino group, an N-phenylmethylsulfonylamino group, a phenylsulfonylamino group, and a 3-carboxyphenylsulfonylamino group.

The heterocyclic sulfonylamino group includes a substituted heterocyclic sulfonylamino group and an unsubstituted heterocyclic sulfonylamino group. As the heterocyclic sulfonylamino group, a heterocyclic sulfonylamino group having from 1 to 12 carbon atoms is preferable. Examples of the substituent include an ionic hydrophilic group. Examples of the heterocyclic sulfonylamino group include a 2-thiophenesulfonylamino group and a 3-pyridinesulfonylamino group.

The heterocyclic sulfonyl group includes a substituted heterocyclic sulfonyl group and an unsubstituted heterocyclic sulfonyl group. As the heterocyclic sulfonyl group, a heterocyclic sulfonyl group having from 1 to 20 carbon atoms is preferable. Examples of the substituent include an ionic hydrophilic group Examples of the heterocyclic sulfonyl group include a 2-thiophenesulfonyl group and a 3-pyridinesulfonyl group.

The heterocyclic sulfinyl group includes a substituted heterocyclic sulfinyl group and an unsubstituted heterocyclic sulfinyl group. As the heterocyclic sulfinyl group, a heterocyclic sulfinyl group having from 1 to 20 carbon atoms is preferable. Examples of the substituent include an ionic hydrophilic group. Examples of the heterocyclic sulfinyl group include a 4-pyridinesulfinyl group.

The alkyl-, aryl- or heterocyclic thio group includes a substituted alkyl-, aryl- or heterocyclic thio group and an unsubstituted alkyl-, aryl- or heterocyclic thio group. As the alkyl-, aryl- or heterocyclic thio group, an alkyl-, aryl- or heterocyclic thio group having from 1 to 20 carbon atoms is preferable. Examples of the substituent include an ionic hydrophilic group. Examples of the alkyl-, aryl- or heterocyclic thio group include a methylthio group, a phenylthio group, and a 2-pyridylthio group.

The alkyl- or arylsulfonyl group includes a substituted alkyl- or arylsulfonyl group and an unsubstituted alkyl- or arylsulfonyl group. Examples of the alkyl- or arylsulfonyl group include a methylsulfonyl group and a phenylsulfonyl group.

The alkyl- or arylsulfinyl group includes a substituted alkyl- or arylsulfinyl group and an unsubstituted alkyl- or arylsulfinyl group. Examples of the alkyl- or arylsulfinyl group include a methylsulfinyl group and a phenylsulfinyl group.

The sulfamoyl group includes a substituted sulfamoyl group and an unsubstituted sulfamoyl group. Examples of the substituent include an alkyl group. Examples of the sulfamoyl group include a dimethylsulfamoyl group and a di(2-hydroxyethyl)sulfamoyl group.

Next, the general formulae (Bk), (Bk-a) and (Bk-b) will be further described.

In the following description, with respect to the groups and substituents, those as already described are applied.

In the general formula (Bk), $A_1$, $A_2$ and $A_3$ each independently represents an optionally substituted aromatic group ($A_1$ and $A_3$ each represents a monovalent aromatic group such as an aryl group; and $A_2$ represents a divalent aromatic group such as an arylene group) or an optionally substituted heterocyclic group ($A_1$ and $A_3$ each represents a monovalent heterocyclic group; and $A_2$ represents a divalent heterocyclic group). Examples of the aromatic ring include a benzene ring and a naphthalene ring; and examples of the hetero atom of the heterocyclic ring include N, O, and S. The heterocyclic ring may be fused with an aliphatic ring, an aromatic ring or other heterocyclic ring.

The substituent may be an aryl azo group or a heterocyclic azo group. Accordingly, the dye represented by the general formula (Bk) includes tris azo dyes and tetrakis azo dyes.

Furthermore, at least two of $A_1$, $A_2$ and $A_3$ are preferably a heterocyclic group.

Preferred examples of the heterocyclic group for $A_3$ include an aromatic nitrogen-containing 6-membered heterocyclic group. In the case where $A_3$ is an aromatic nitrogen-containing 6-membered heterocyclic group represented by the following general formula (P) is especially preferable; and in this case, the general formula (Bk) is corresponding to the general formula (Bk-a).

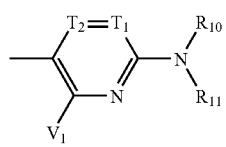

General Formula (P)

In the general formula (P), $T_1$ and $T_2$ each represents =$CR_{12}$— or —$CR_{13}$=; or either one of them represents a nitrogen atom, and the other represents =$CR_{12}$— or —$CR_{13}$=. It is preferable that each of $T_1$ and $T_2$ represents =$CR_{12}$— or —$CR_{13}$=.

$R_{10}$ and $R_{11}$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, or a sulfamoyl group; and each of these groups may be further substituted. The substituent represented by $R_{10}$ and $R_{11}$ is preferably a hydrogen atom, an aliphatic group, an aromatic group, a heterocyclic group, an acyl group, or an alkyl- or arylsulfonyl group; more preferably a hydrogen atom, an aromatic group, a heterocyclic group, an acyl group, or an alkyl- or arylsulfonyl group; and most preferably a hydrogen atom, an aryl group, or a heterocyclic group. Each of these groups may be further substituted.

$V_1$, $R_{12}$ and $R_{13}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (inclusive of an alkylamino group, an arylamino group, and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group, or a sulfo group; and each of these groups may be further substituted.

The substituent represented by $V_1$ is preferably a hydrogen atom, a halogen atom, an aliphatic group, an aromatic group, a hydroxyl group, an alkoxy group, an aryloxy group, an acyloxy group, a heterocyclic oxy group, an amino group (inclusive of an alkylamino group, an arylamino group, and a heterocyclic amino group), an acylamino group, a ureido group, a sulfamoylamino group, an alkoxycarbonylamino group, an aryloxycarbonylamino group, an alkyl- or arylthio group, or a heterocyclic thio group; and more preferably a hydrogen atom, a halogen atom, an alkyl group, a hydroxyl group, an alkoxy group, an aryloxy group, an acyloxy group, an amino group (inclusive of an alkylamino group, an arylamino group, and a heterocyclic amino group), or an acylamino group. Of these, a hydrogen atom, an arylamino group, and an acylamino group are the most preferable. Each of these groups may be further substituted.

Preferred examples of the substituent represented by $R_{12}$ and $R_{13}$ include a hydrogen atom, an alkyl group, an aryl group, a heterocyclic group, a halogen atom, an alkoxycarbonyl group, a carboxyl group, a carbamoyl group, a hydroxyl group, an alkoxy group, and a cyano group. Each of these groups may be further substituted. $R_{12}$ and $R_{10}$, or $R_{10}$ and $R_{11}$ may be taken together to form a 5-membered or 6-membered ring. In the case where each of the substituents represented by $A_1$, $R_{12}$, $R_{13}$, $R_{10}$, $R_{11}$ and $V_1$ is further substituted, examples of the substituent include the substituents as enumerated above for $V_1$, $R_{10}$ and $R_{11}$. Furthermore, it is preferable that an ionic hydrophilic group is further presented as a substituent at any position on $A_1$, $R_8$, $R_9$, $R_{10}$, $R_{11}$ and $V_1$.

The ionic hydrophilic group as a substituent includes a sulfo group, a carboxyl group, a phosphono group, and a quaternary ammonium group. The ionic hydrophilic group is preferably a carboxyl group, a phosphono group, or a sulfo group, and especially preferably a carboxyl group or a sulfo group. The carboxyl group, the phosphono group, and the sulfo group may be each in a salt state. Examples of a counter ion capable of forming a salt include an ammonium ion, an alkali metal ion (for example, a lithium ion, a sodium ion, and a potassium ion), and an organic cation (for example, a tetramethylammonium ion, a tetramethylguanidium ion, and a tetramethylphosphonium ion). Of these counter ions, a lithium ion is preferable.

Preferred examples of the heterocyclic ring represented by $A_2$ include a thiophene ring, a thiazole ring, an imidazole ring, a benzothiazole ring, and a thienothiazole ring. Each of the heterocyclic rings may be further substituted. Above all, a thiophene ring, a thiazole ring, an imidazole ring, a benzothiazole ring, and a thienothiazole ring represented by the following general formula (a) to (e) are preferable. Incidentally, when $A_2$ is a thiophene ring represented by the general formula (a) and $A_3$ is a structure represented by the foregoing general formula (P), the general formula (Bk) is corresponding to the general formula (Bk-b-1); and when $A_2$ is a thiazole ring represented by the general formula (b) and $A_3$ is a structure represented by the foregoing general formula (P), the general formula (Bk) is corresponding to the general formula (Bk-b-2).

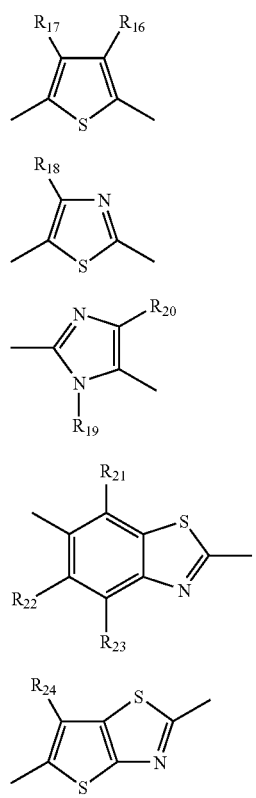

In the general formulae (a) to (e), $R_{16}$ to $R_{24}$ each represents a substituent synonymous with that of $V_1$, $R_{12}$ and $R_{13}$ in the general formula (P).

Of the dyes represented by the general formula (Bk-b), dyes having a structure represented by the following general formula (Bk-c-1) or (Bk-c-2) are especially preferable (when the general formula (Bk-c-1) and the general formula (Bk-c-2) are shown in summary, they will be hereinafter refereed to "general formula (Bk-c)").

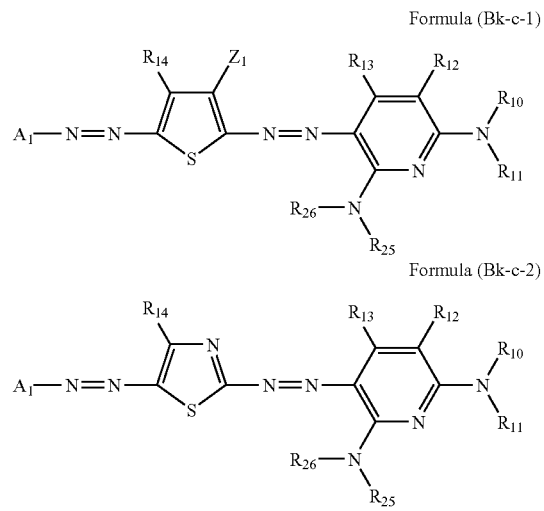

Formula (Bk-c-1)

Formula (Bk-c-2)

In the formulae, $Z_1$ represents an electron withdrawing group having a Hammett's substituent constant σp value of 0.20 or more. $Z_1$ preferably represents an electron withdrawing group having a Hammett's substituent constant σp value of 0.30 or more, more preferably an electron withdrawing group having a Hammett's substituent constant σp value of 0.45 or more, and especially preferably an electron withdrawing group having a Hammett's substituent constant σp value of 0.60 or more. It is desired that the Hammett's substituent constant σp value does not exceed 1.0.

Specific examples of the electron withdrawing group having a Hammett's substituent constant σp value of 0.60 or more include a cyano group, a nitro group, an alkylsulfonyl group (for example, a methanesulfonyl group), and an arylsulfonyl group (for example, a benzenesulfonyl group).

Examples of the electron withdrawing group having a Hammett's substituent constant σp value of 0.45 or more include, in addition to the foregoing groups, an acyl group (for example, an acetyl group), an alkoxycarbonyl group (for example, a dodecyloxycarbonyl group), an aryloxycarbonyl group (for example, m-chlorophenoxycarbonyl), an alkylsulfinyl group (for example, n-propylsulfinyl), an arylsulfinyl group (for example, phenylsulfinyl), a sulfamoyl group (for example, N-ethylsulfamoyl and N,N-dimethylsulfamoyl), and a halogenated alkyl group (for example, trifluoromethyl).

Examples of the electron withdrawing group having a Hammett's substituent constant σp value of 0.30 or more include, in addition to the foregoing groups, an acyloxy group (for example, acetoxy), a carbamoyl group (for example, N-ethylcarbamoyl and N,N-dibutylcarbamoyl), a halogenated alkoxy group (for example, trifluoromethyloxy), a halogenated aryloxy group (for example, pentafluorophenyloxy), a sulfonyloxy group (for example, a methylsulfonyloxy group), a halogenated alkylthio group (for example, difluoromethylthio), an aryl group substituted with two or more electron withdrawing groups having a σp value of 0.15 or more (for example, 2,4-dinitrophenyl and pentachlorophenyl), and a heterocyclic ring (for example, 2-benzoxazolyl, 2-benzothiazolyl, and 1-phenyl-2-benzimidazolyl).

Specific examples of the electron withdrawing group having a Hammett's substituent constant σp value of 0.20 or more include, in addition to the foregoing groups, a halogen atom.

As $Z_1$, an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, and a halogenated alkyl group having from 1 to 20 carbon atoms are preferable. Of these, a cyano group, an alkylsulfonyl group having from 1 to 20 carbon atoms, and an arylsulfonyl group having from 6 to 20 carbon atoms are especially preferable; and a cyano group is the most preferable.

Incidentally, the Hammett's substituent constant σp value which is used in this specification is synonymous with that as described in paragraphs [0059] to [0060] of $R_{10}$, $R_{11}$, $R_{12}$, $R_{13}$ and $R_{14}$ in the general formula (Bk-c) are synonymous with those in the general formula (Bk-b). $R_{25}$ and $R_{26}$ each independently represents a hydrogen atom, an aliphatic group, an aromatic group, a heterocyclic group, an acyl group, an alkoxycarbonyl groups an aryloxycarbonyl group, a carbamoyl group, an alkyl- or arylsulfonyl group, or a sulfamoyl group. Above all, a hydrogen atom, an aromatic group, a heterocyclic group, an acyl group, and an alkyl- or arylsulfonyl group are preferable; and a hydrogen atom, an aromatic group, and a heterocyclic group are the most preferable.

Each of the groups described for the general formula (Bk-c) may be further substituted. In the case where each of these groups is further substituted, examples of the substituent include the substituents described for the general formula (Bk-a) and the groups and the ionic hydrophilic groups as enumerated for $V_1$, $R_{10}$ and $R_{11}$.

In addition, with respect to the azo dye represented by the general formula (Bk), in order to ensure the storage stability in an aqueous solution or an ink, an azo dye having a conjugated π electron on an aromatic ring group which is not directly bound to the azo group is preferable. An aromatic ring group which is directly bound to the azo group refers to the whole of the aromatic ring group which is bound to the azo group, whereas an aromatic ring group which is not directly bound to the azo group means an aromatic ring group which is not directly bound to the azo group and which is present as a substituent on a chromophore constituting the azo dye. For example, in the case where a naphthalene ring group is directly bound to the azo group, it is considered that the whole of the naphthalene ring group is an aromatic ring group which is directly bound to the azo group. In the case where a biphenyl group is bound to the azo group, a phenyl group which is directly bound to the azo group is an aromatic ring group which is directly bound and the other phenyl group is an aromatic ring group which is not directly bound. The "aromatic ring group" as referred to herein means an aromatic group or an aromatic heterocyclic group. The "aromatic heterocyclic group" as referred to herein means a substituent containing a hetero atom and exhibiting aromaticity. When such an aromatic ring group is contained as the substituent, the foregoing dye exhibits preferred association properties so that it is able to improve the storage stability. Incidentally, with respect to the substitution position of the aromatic ring group, in the general formula (Bk-c), $R_{10}$, $R_{11}$, $R_{12}$, $R_{13}$, $R_{14}$, $R_{25}$ and $R_{26}$ are preferable; and $R_{10}$, $R_{11}$, $R_{14}$, $R_{25}$ and $R_{26}$ are especially preferable.

$A_1$ may be either an aromatic group or a heterocyclic group. It is preferably a benzene ring, a naphthalene ring, a pyridine ring, an imidazole ring, a pyrazole ring, a thiazole ring, an isothiazole ring, a thiadiazole ring, a benzothiazole ring, or a benzoisothiazole ring; more preferably a benzene ring, a naphthalene ring, a pyridine ring, a pyrazole ring, an imidazole ring, an isothiazole ring, or a benzothiazole ring; and most preferably a benzene ring or a naphthalene ring.

With respect an especially preferred combination of substituents as the azo dye reprsented by the general formula (Bk-a) of the invention, $R_{10}$ and $R_{11}$ are each preferably a hydrogen atom, an alkyl group, an aryl group, a heterocyclic group, a sulfonyl group, or an acyl group; more preferably a hydrogen atom, an aryl group, a heterocyclic group, or a sulfonyl group; and most preferably a hydrogen atom, an aryl group, or a heterocyclic group. However, $R_{10}$ and $R_{11}$ do not represent a hydrogen atom at the same time.

$V_1$ is preferably a hydrogen atom, a halogen atom, an alkyl group, a hydroxyl group, an amino group, or an acylamino group; more preferably a hydrogen atom, a halogen atom, an amino group, or an acylamino group; and most preferably a hydrogen atom, an amino group, or an acylamino group.

$T_1$ and $T_2$ each represents =$CR_{12}$— or —$CR_{13}$=. $R_{12}$ and $R_{13}$ are each preferably a hydrogen atom, an alkyl group, a halogen atom, a cyano group, a carbamoyl group, a carboxyl group, a hydroxyl group, an alkoxy group, or an alkoxycarbonyl group; and more preferably a hydrogen atom, an alkyl group, a carboxyl group, a cyano group, or a carbamoyl group.

Incidentally, with respect to a preferred combination of substituents as the azo dye represented by the general formula (Bk), compounds in which at least one of the various substituents is the foregoing preferred group are preferable; compounds in which many of the various substituents are the foregoing preferred groups are more preferable; and compounds in which all of the substituents are the foregoing preferred groups are the most preferable.

Furthermore, in order that the azo dye represented by the general formula (Bk) may have preferred hue, fastness and storage stability, what the following physical properties are satisfied is preferable and effective for controlling the bronze gloss.

Physical Property 1:

When a maximum absorption wavelength of the absorption spectrum in DMF is defined as λmax (DMF), 680 nm≧λmax (DMF)≧570 nm.

Physical Property 2:

When a maximum absorption wavelength of the absorption spectrum in water is defined as λmax (water), |λmax (DMF)–λmax (water)|≧30 nm.

Physical Property 3:

When a molar absorbance coefficient in DMF is defined as ε (DMF) and a molar absorbance coefficient in water is defined as ε (water), ε (water)/ε (DMF)≦0.9.

Physical Property 4:

When in the absorption spectrum as measured in water, an absorbance at a maximum absorption wavelength of an associate is defined as Abs (associate) and an absorbance at a maximum absorption wavelength of a monomer as measured in DMF is defined as Abs (monomer), Abs (monomer)/Abs (associate)≦0.75.

Specific examples of the azo dyes represented by the foregoing general formula (Bk) will be given below, but it should not be construed that the invention is limited thereto. Furthermore, the carboxyl group, the phosphono group and the sulfo group in the following specific examples may be in a salt state. Examples of a counter ion capable of forming a salt include an ammonium ion, an alkali metal ion (for example, a lithium ion, a sodium ion, and a potassium ion), and an organic cation (for example, a tetramethylammonium ion, a tetramethylguanidium ion, and a tetramethylphosphonium ion). Above all, the case where the counter ion is an ammonium ion, an organic cation, or a lithium ion is preferable; and the case where the counter ion is a lithium ion is the most preferable.
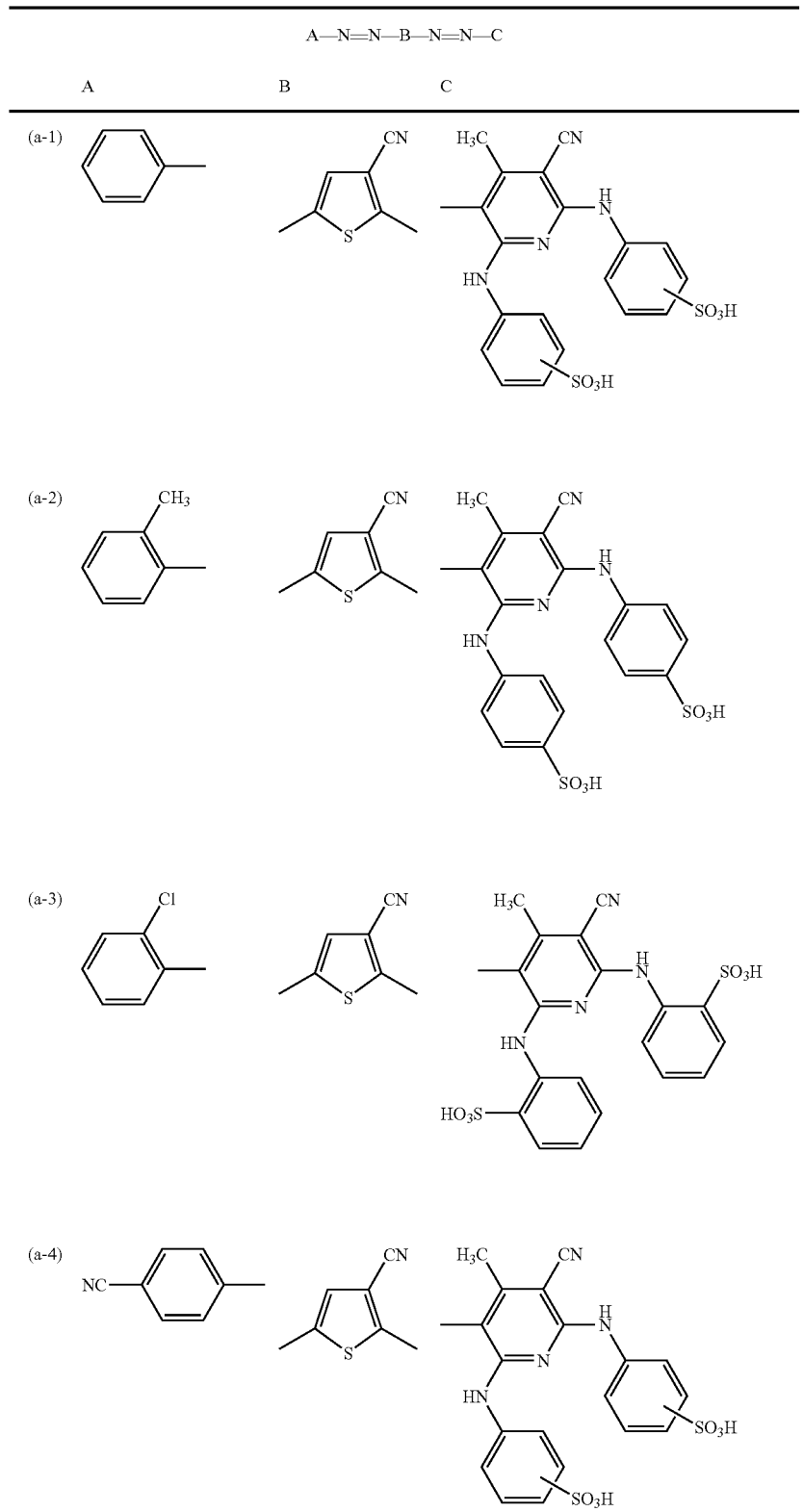

-continued
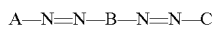
| A | B | C |
|---|---|---|
(a-5) 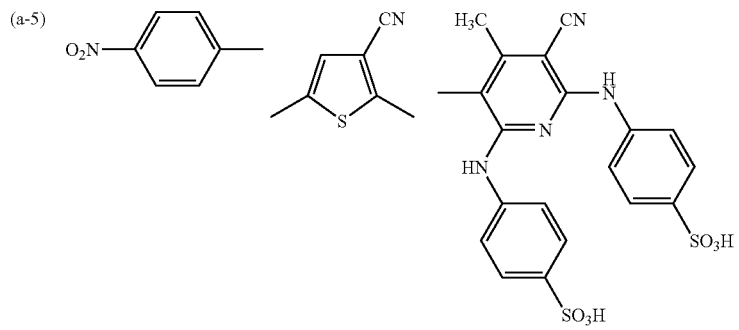
(a-6) 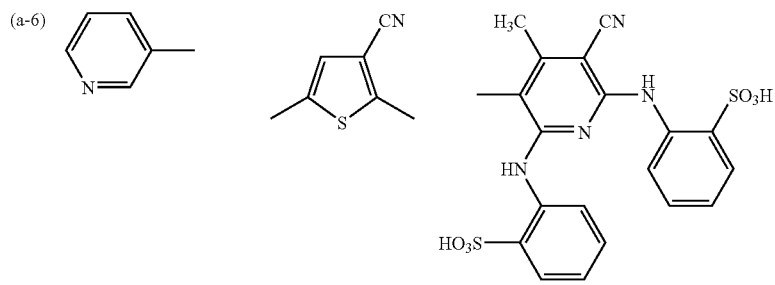
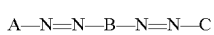
| A | B | C |
|---|---|---|
(b-1) 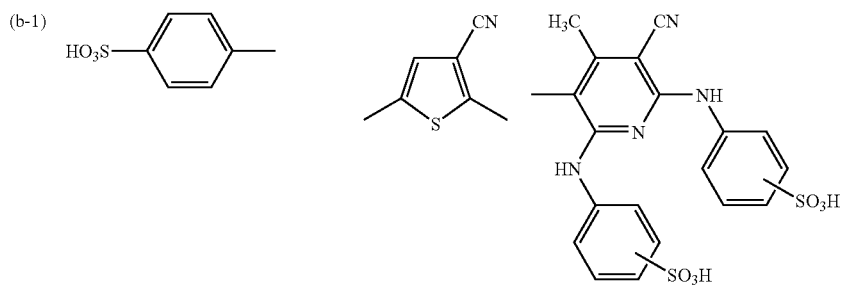
(b-2) 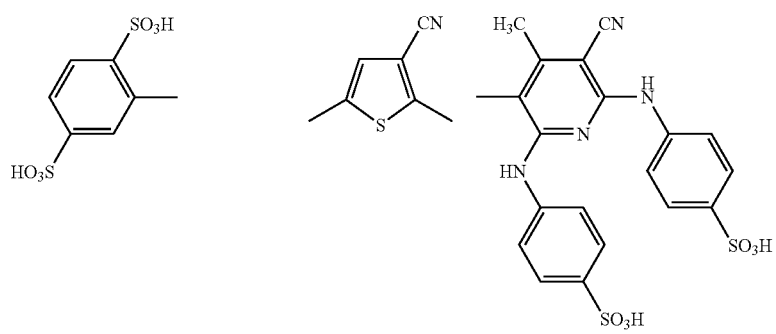

-continued
A—N=N—B—N=N—C
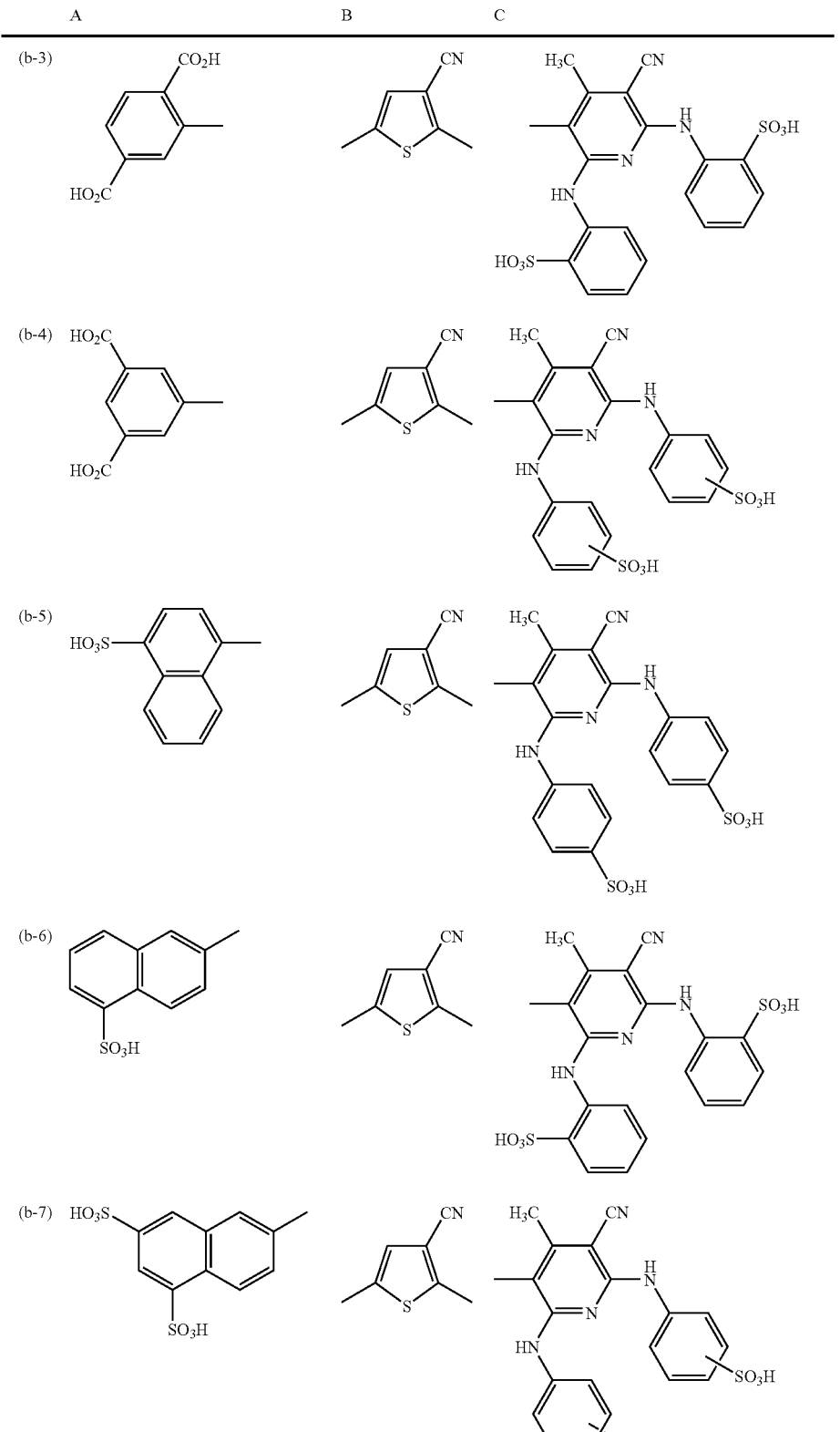

| | A—N=N—B—N=N—C | | |
|---|---|---|---|
| | A | B | C |
| (c-1) | 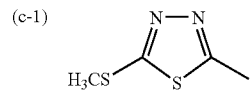 | 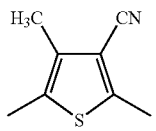 | 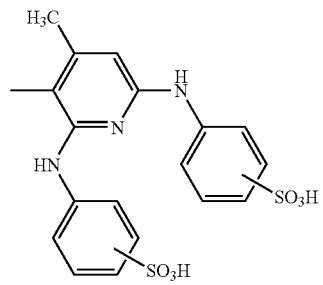 |
| (c-2) | 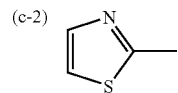 | 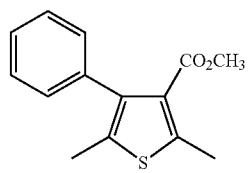 | 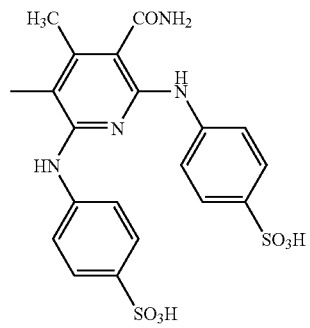 |
| (c-3) | 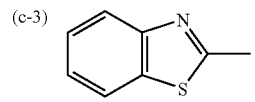 | 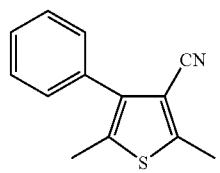 | 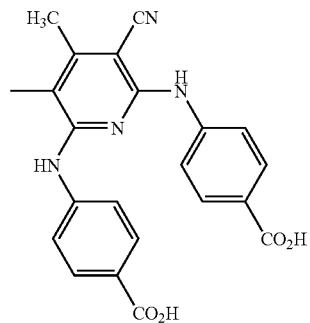 |
| (c-4) | 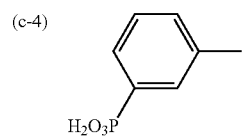 | 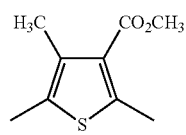 | 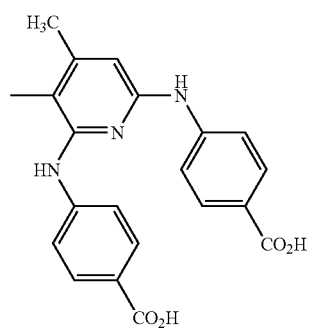 |

-continued
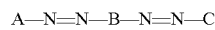
| | A | B | C |
|---|---|---|---|
| (c-5) | 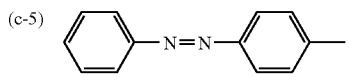 | 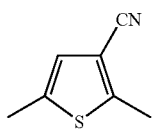 | 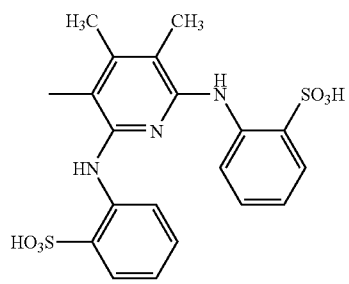 |
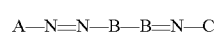
| | A | B | C |
|---|---|---|---|
| (d-1) | 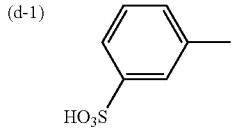 | 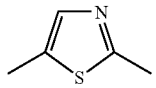 | 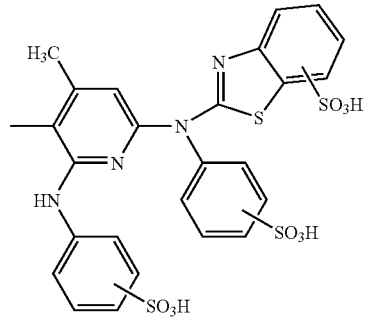 |
| (d-2) | 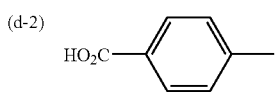 | 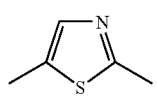 | 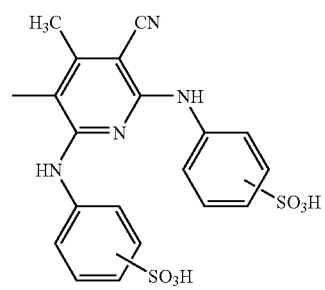 |
| (d-3) | 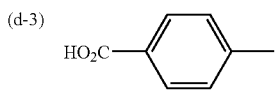 | 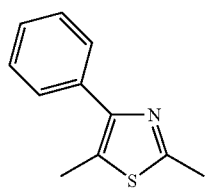 | 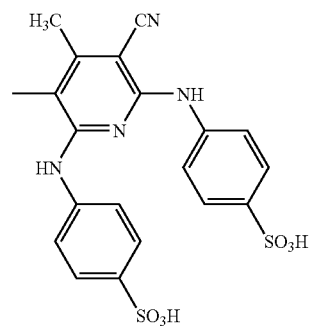 |

-continued
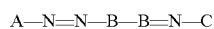
| | A | B | C |
|---|---|---|---|
| (d-4) | 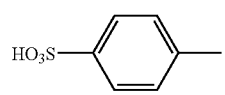 | 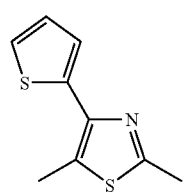 | 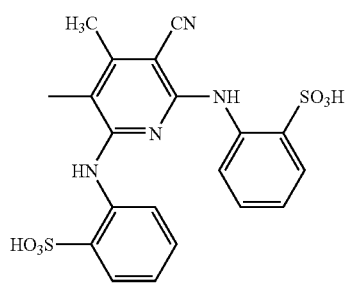 |
| (d-5) | 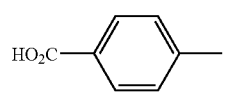 | 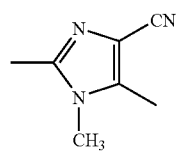 | 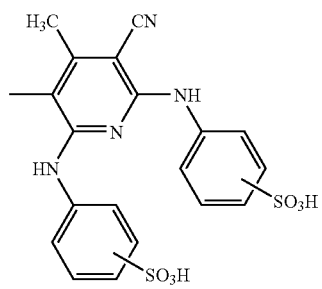 |
| (d-6) | 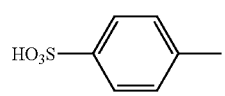 | 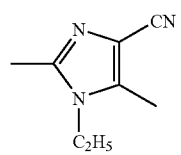 | 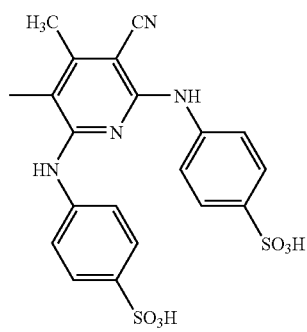 |
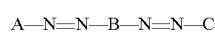
| | A | B | C |
|---|---|---|---|
| (e-1) | 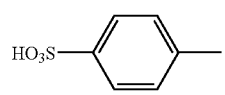 | 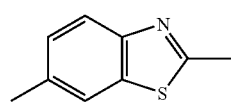 | 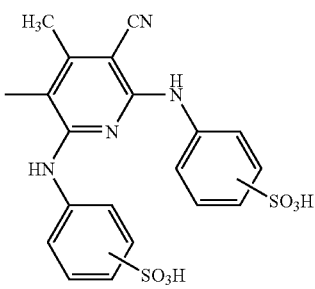 |

-continued
A—N=N—B—N=N—C
| | A | B | C |
|---|---|---|---|
| (e-2) | 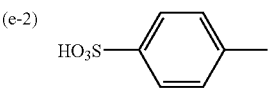 | 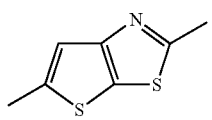 | 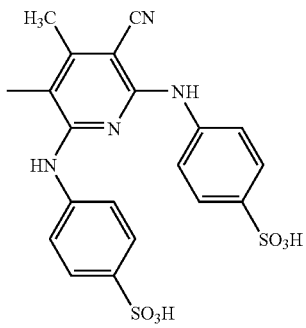 |
A—N=N—B—N=N—C
| | A | B | C |
|---|---|---|---|
| (f-1) | 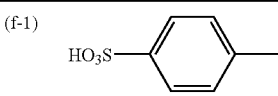 | 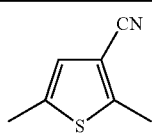 | 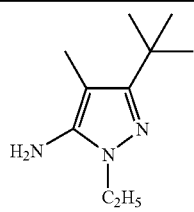 |
| (f-2) | 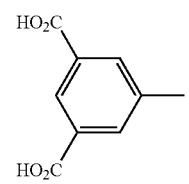 | 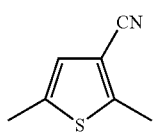 | 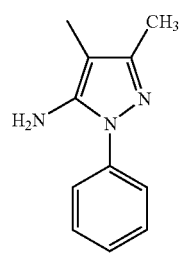 |
| (f-3) | 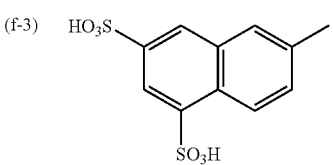 | 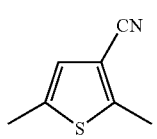 | 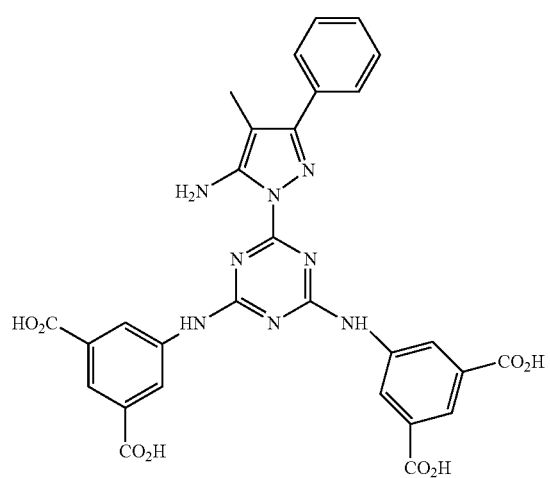 |

-continued
A—N=N—B—N=N—C
| | A | B | C |
|---|---|---|---|
| (f-4) | 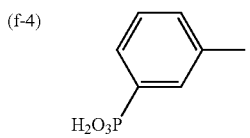 | 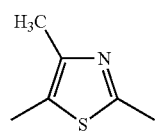 | 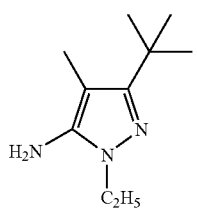 |
A—N=N—B—N=N—C
| | A | B | C |
|---|---|---|---|
| (g-1) | 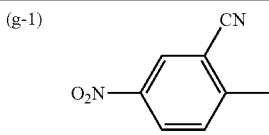 | 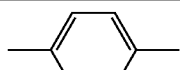 | 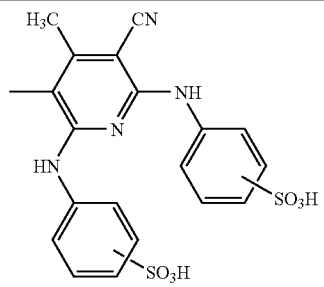 |
| (g-2) | 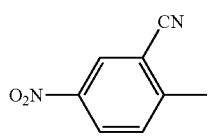 | 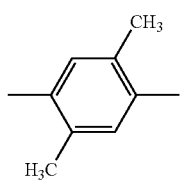 | 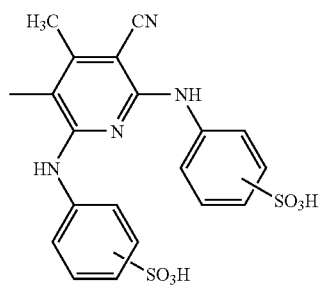 |
| (g-3) | 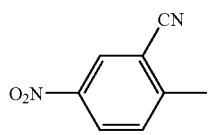 | 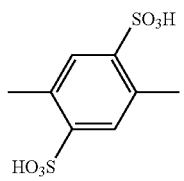 | 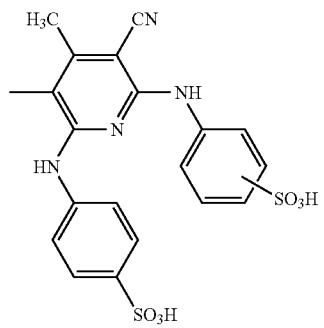 |

-continued
| | A—N=N—B—N=N—C | | |
|---|---|---|---|
| | A | B | C |
| (g-4) | 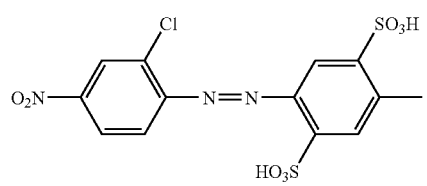 | 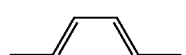 | 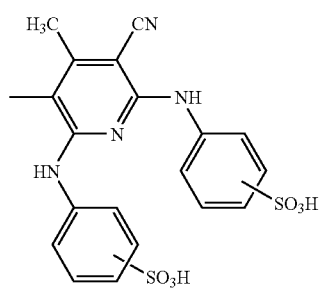 |
| (g-5) | 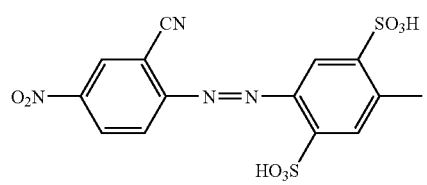 | 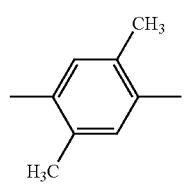 | 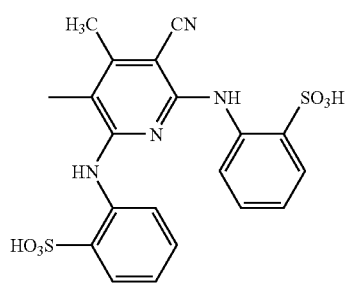 |
| (g-6) | 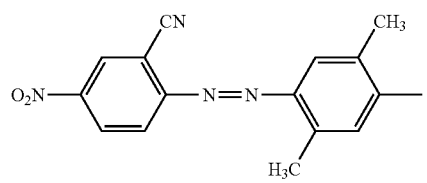 | 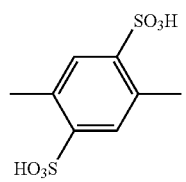 | 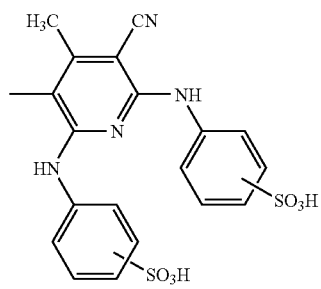 |
| | A—N=N—B—N=N—C | | |
|---|---|---|---|
| | A | B | C |
| (h-1) | 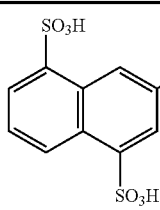 | 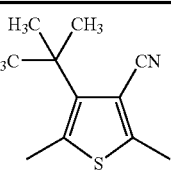 | 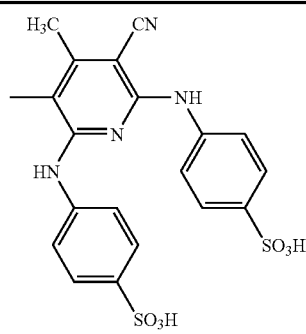 |

-continued
A—N=N—B—N=N—C
| A | B | C |
|---|---|---|
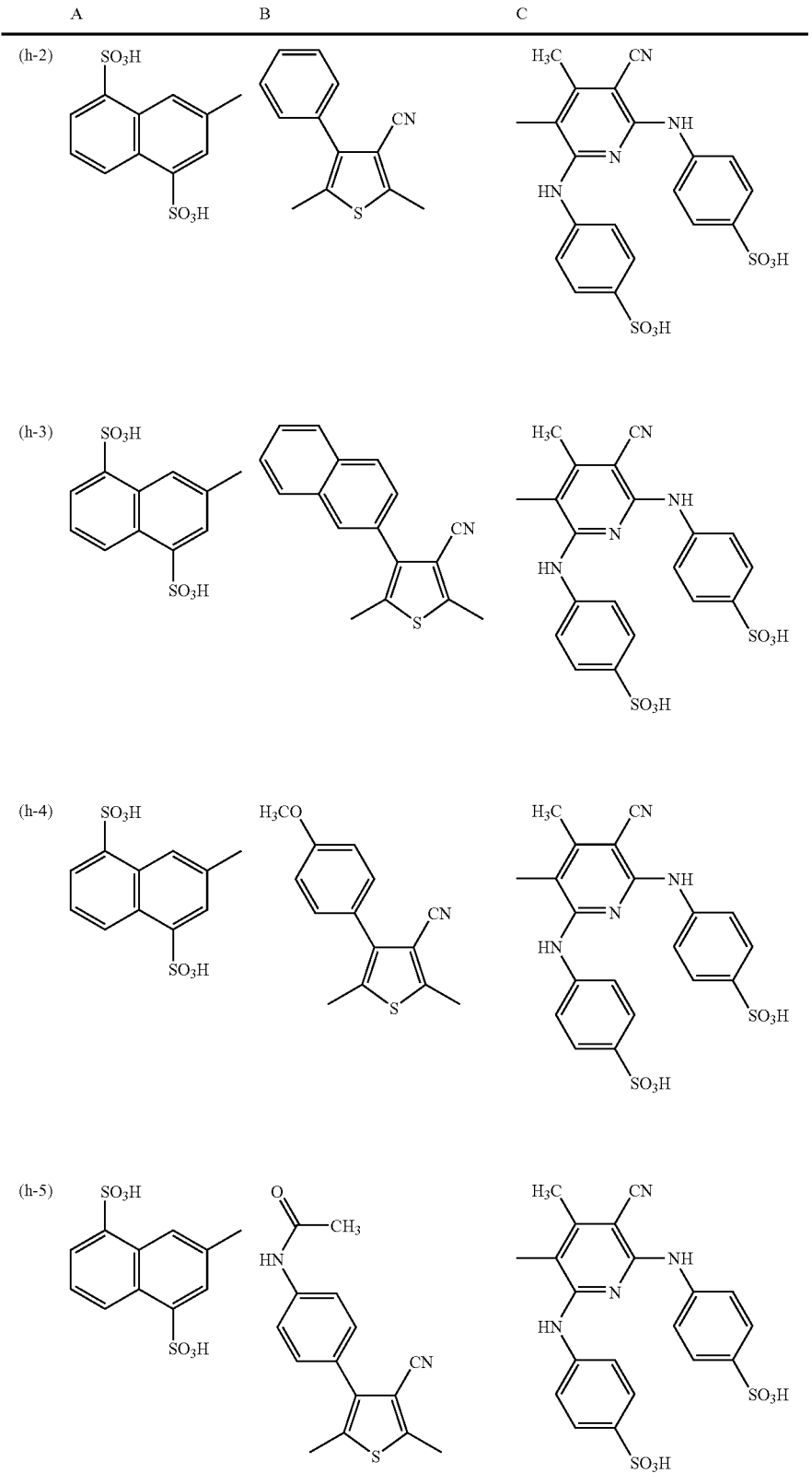

-continued
| | A—N=N—B—N=N—C | | |
|---|---|---|---|
| | A | B | C |
| (h-6) | 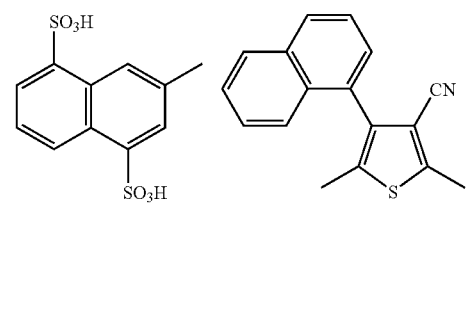 | 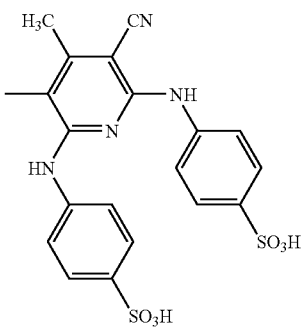 | |
| | A—N=N—B—N=N—C | | |
|---|---|---|---|
| | A | B | C |
| (i-1) | 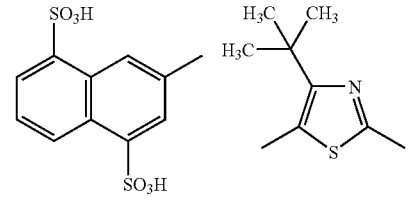 | 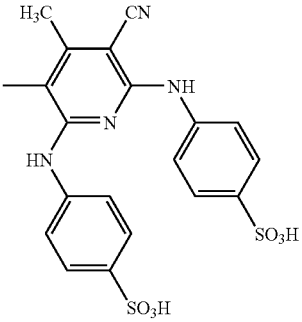 | |
| (i-2) | 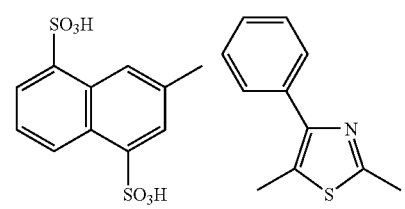 | 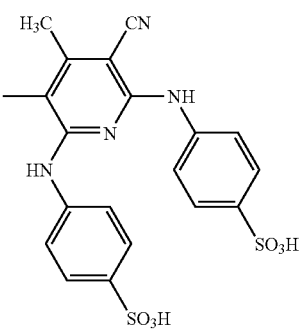 | |
| (i-3) | 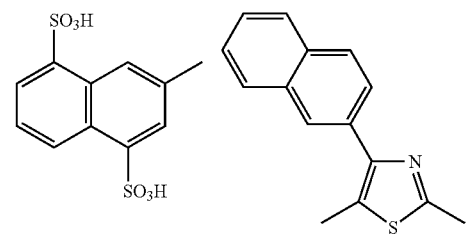 | 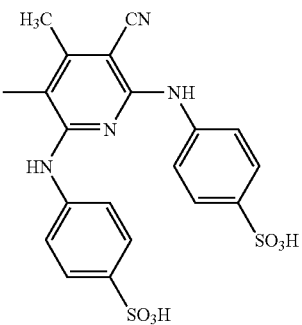 | |

-continued
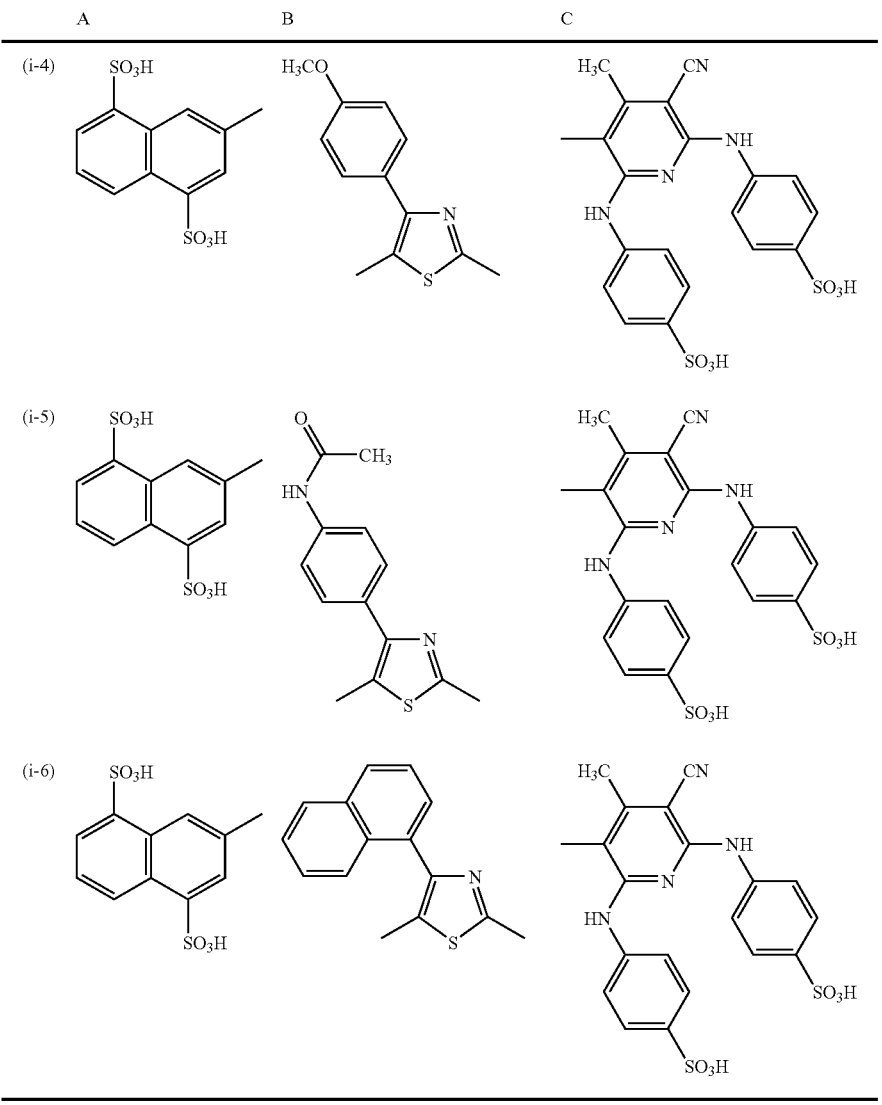
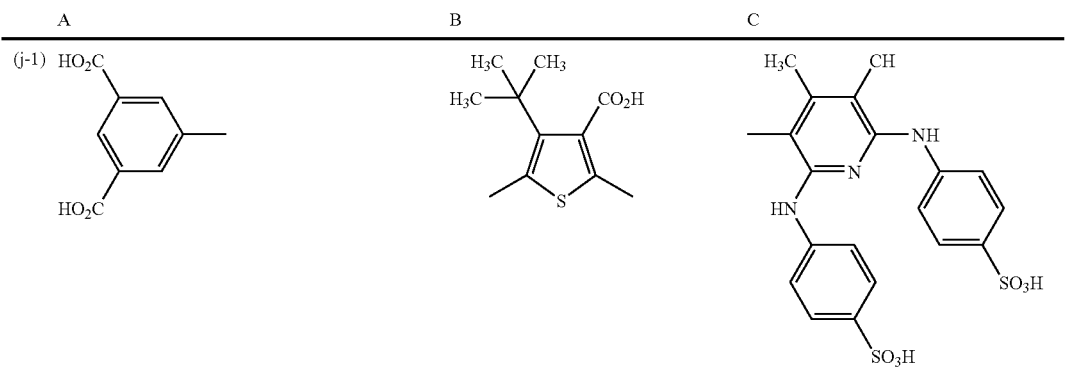

-continued
| | A—N=N—B—N=N—C | |
|---|---|---|
| A | B | C |
| (j-1) 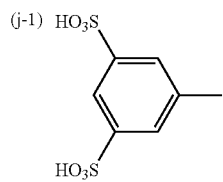 | 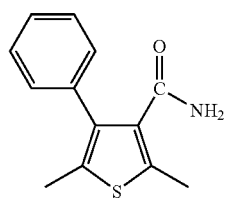 | 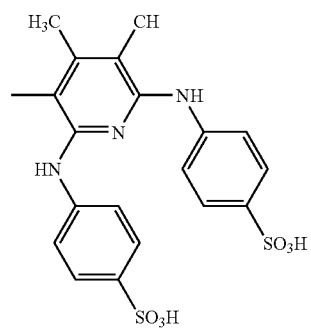 |
| (j-1) 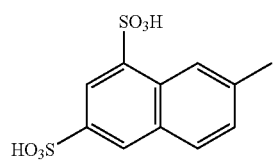 | 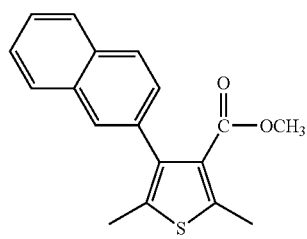 | 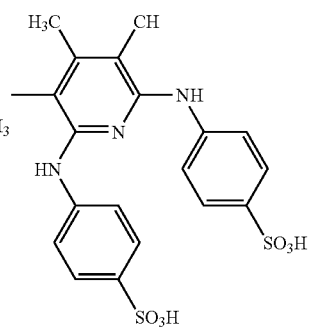 |
| (j-1) 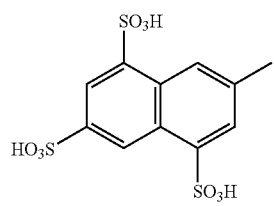 | 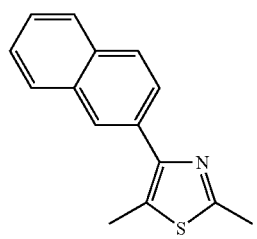 | 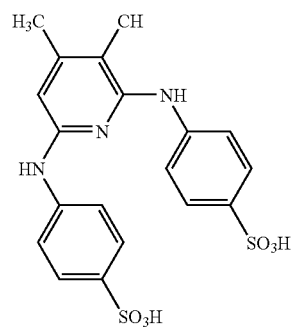 |
| (j-1) 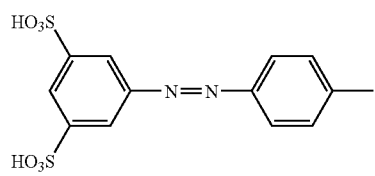 | 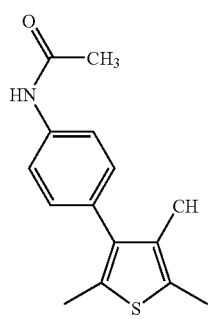 | 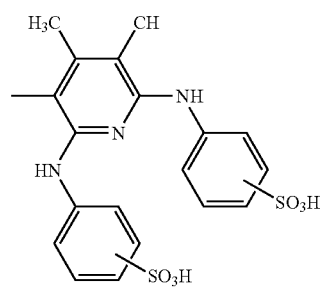 |

-continued
| A—N=N—B—N=N—C | | |
|---|---|---|
| A | B | C |
| (j-1) 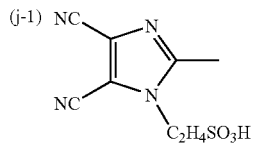 | 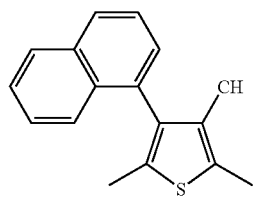 | 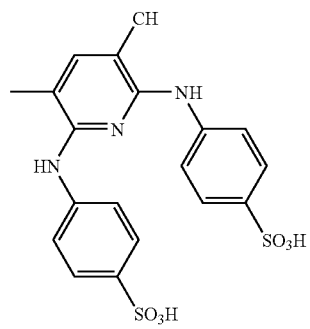 |
| A—N=N—B—N=N—C | | |
|---|---|---|
| A | B | C |
| (k-1) 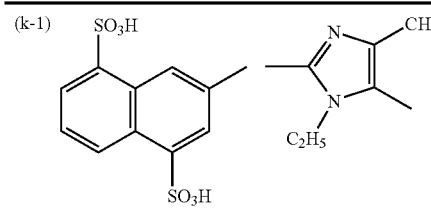 | 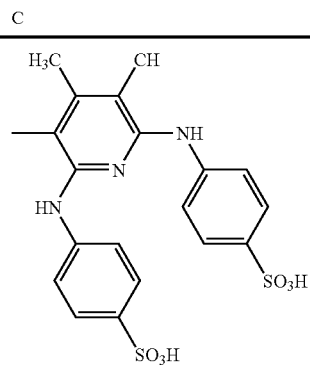 | |
| (k-2) 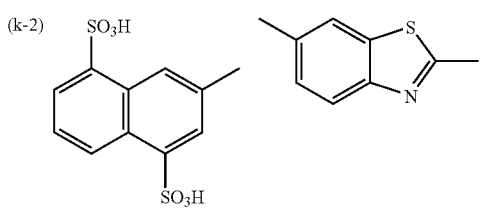 | 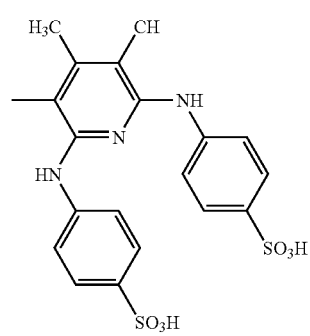 | |
| (k-3) 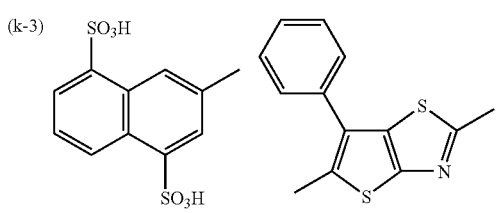 | 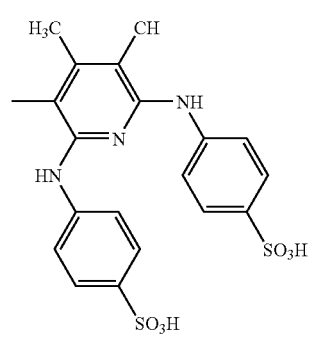 | |

-continued
| | A—N=N—B—N=N—C | |
|---|---|---|
| A | B | C |
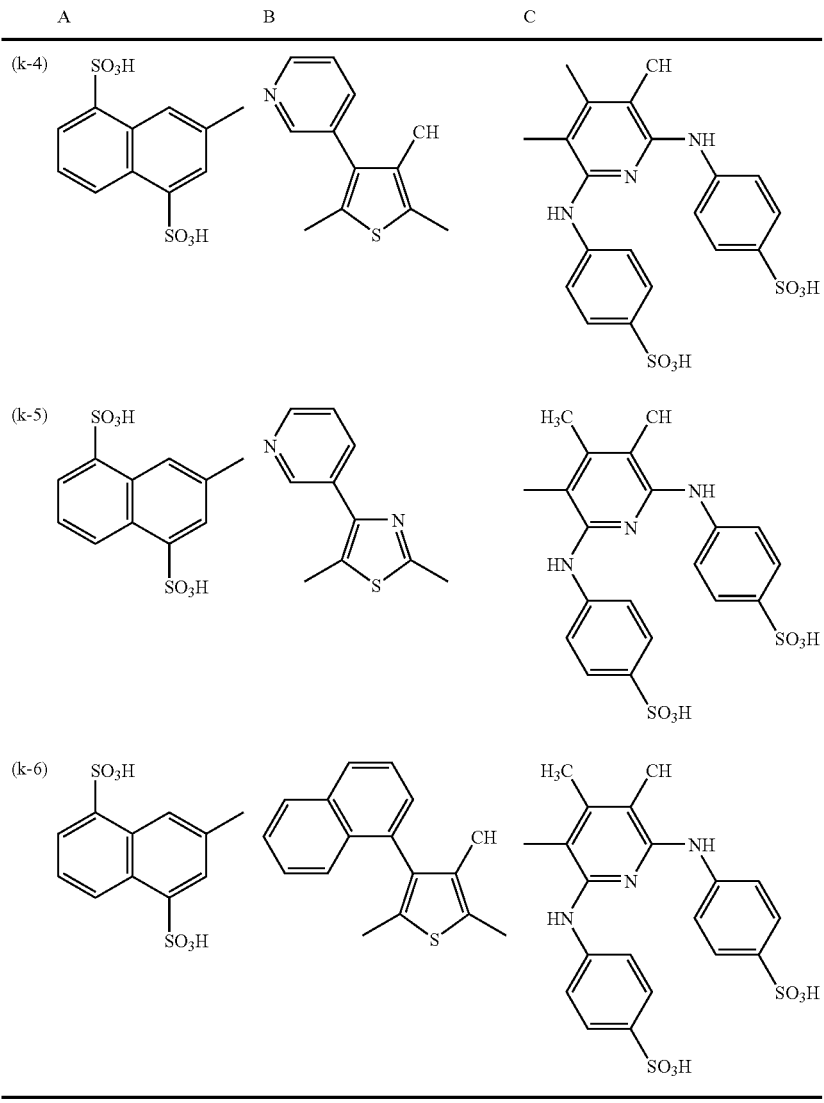
| | A—N=N—B—N=N—C | |
|---|---|---|
| A | B | C |
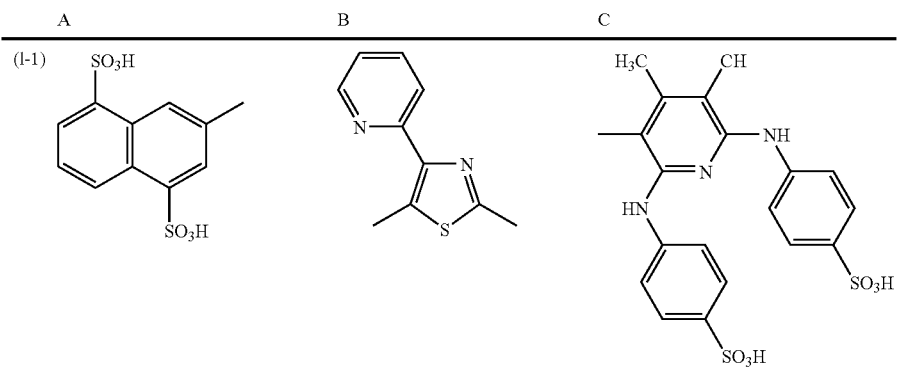

-continued
| | A—N=N—B—N=N—C | | |
|---|---|---|---|
| | A | B | C |
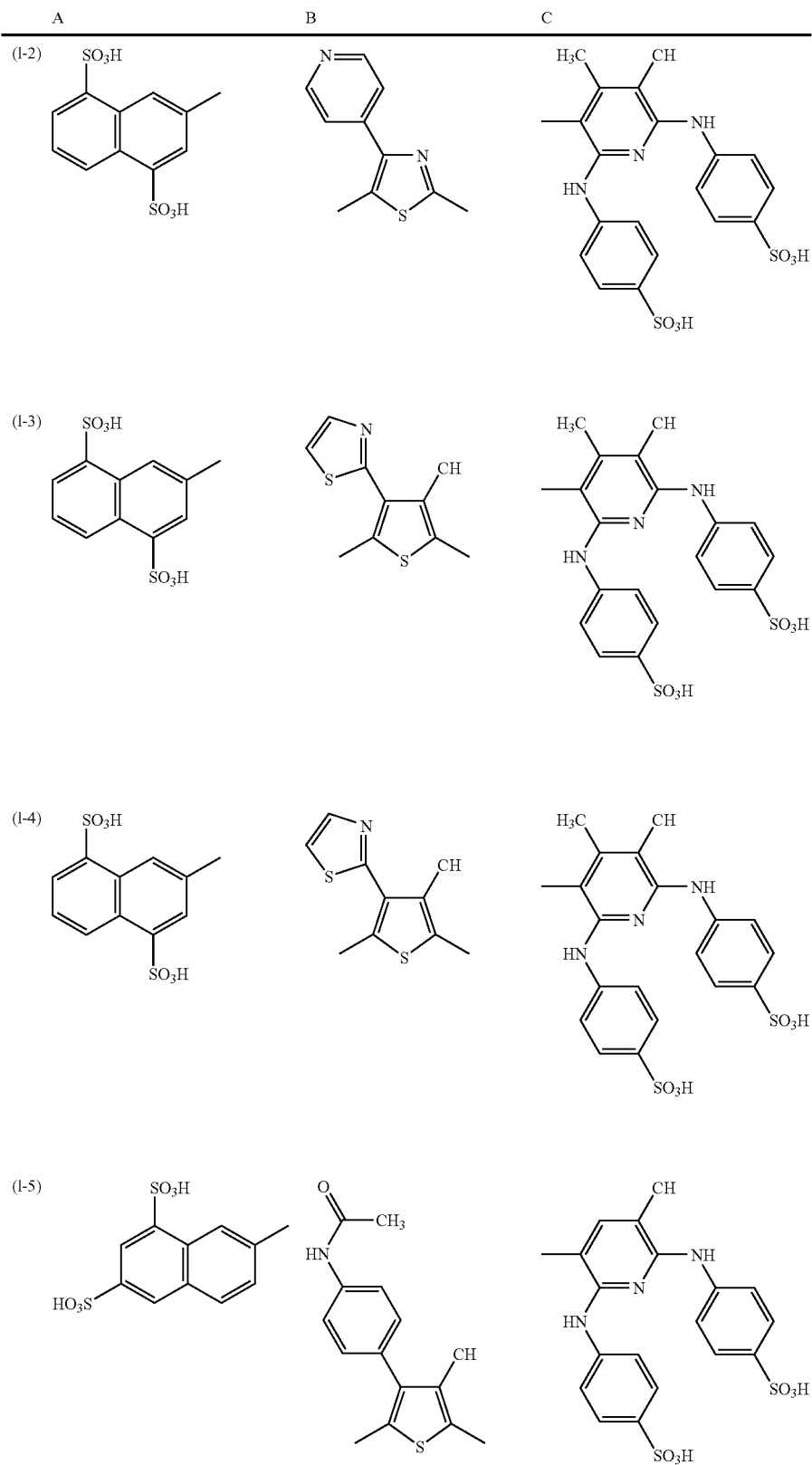

-continued

| | A—N=N—B—N=N—C | |
|---|---|---|
| A | B | C |

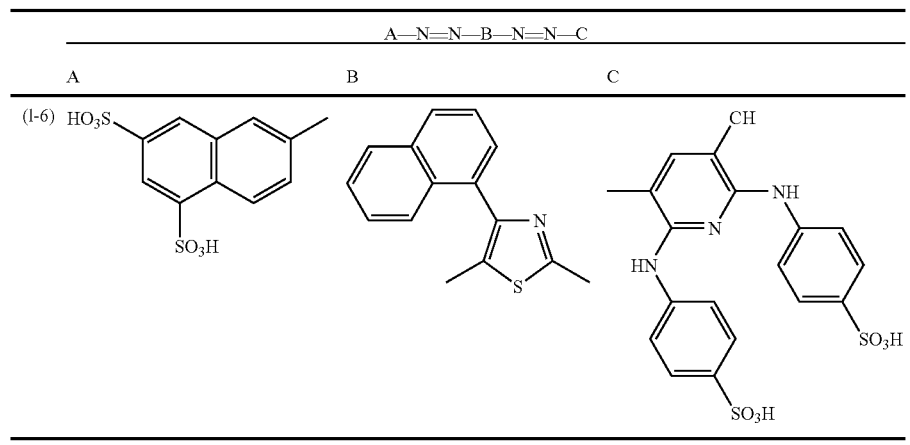

(I-6)

The azo dyes represented by the foregoing general formulae (Bk), (Bk-a), (Bk-b) and (Bk-c) can be synthesized by a coupling reaction between a diazo component and a coupler. These are described in JP-A-2003-306623 and Japanese Patent Application No. 2003-353498.

Furthermore, a more preferred hue may be adjusted by using the foregoing coloring material jointly with other coloring material in a black ink composition of the invention. As the coloring material to be jointly used, an arbitrary coloring material can be used. For example, in yellow dyes, there are enumerated aryl or heteryl azo dyes having, for example, a substituted benzene, a substituted naphthalene, a heterocyclic compound such as pyrazolone and pyridone, or an open chain type active methylene compound as a coupling component (hereinafter referred to as "coupler component"); azomethine dyes having, for example, an open chain active methylene compound as a coupler component; methine dyes such as benzylidene dyes and monomethine oxonol dyes; and quinone based dyes such as naphthoquinone dyes and anthraquinone dyes. As other dye species, there can be enumerated quinophthalone dyes, nitro or nitroso dyes, acridine dyes, and acridinone dyes. The coloring material to be jointly used is especially preferably an zo dye having a λmax of from 350 nm to 500 nm and containing from 2 to 6 azo groups in one molecule thereof.

In magenta dyes, there are enumerated aryl or heteryl azo dyes having, for example, a phenol, a naphthol, an aniline, a heterocyclic compound such as pyridine and pyrazine, or an open chain type active methylene compound as a coupler component; azomethine dyes having, for example, an open chain active methylene compound as a coupler component; and anthrapyridone dyes. Azo dyes and anthrapyridone dyes having a heterocyclic ring in the chromophore are especially preferable.

In cyan dyes, there are enumerated aryl or heteryl azo dyes having, for example, a phenol, a naphthol, or an aniline as a coupler component; azomethine dyes having, for example, a phenol, a naphthol, or a heterocyclic compound such pyrroiotriazole as a coupling component; polymethine dyes such as cyanine dyes, oxonol dyes, and merocyanine dues; carboniun dyes such as diphenylmethane dyes, triphenylmethane dyes, and xanthene dyes; phthalocyanine dyes; anthraquinone dyes; and indigo or thioindigo dyes. Of these, phthalocyanine dyes are especially preferable.

In particular, dyes having an oxidation potential nobler than 1.0 V and associative dyes are preferable in view of a balance of fastness. Specific examples of the preferred dye to be jointly used include dyes as described in Japanese Patent Application No. 2003-360370.

The compound represented by the general formula (M) will be hereunder described. The dye represented by the general formula (M) is preferably a magenta dye. Furthermore, this dye preferably has at least one of the foregoing characteristics (oxidation potential and association properties) and more preferably has all of these characteristics. The oxidation potential of this compound is preferably nobler than 1.0 V (vs SCE), more preferably nobler than 1.1 V (vs SCE), and especially nobler than 1.15 V (vs SCE).

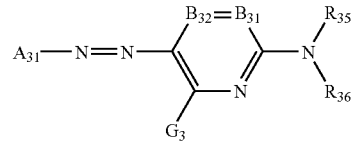

In the general formula (M), $A_{31}$ represents a residue of a 5-membered heterocyclic diazo component $A_{31}$-$NH_2$.

$B_{31}$ and $B_{32}$ each represents =$CR_{31}$— or —$CR_{32}$=; or either one of them represents a nitrogen atom, and the other represents =$CR_{31}$— or —$CR_{32}$=. $R_{35}$ and $R_{36}$ each independently represents a hydrogen atom, an aliphatic group, an aromatic group, a heterocyclic group, an acyl group, an alkoxycarbonyl group, an aryloxycarbonyl group, a heterocyclic oxycarbonyl group, a carbamoyl group, an alkyl- or arylsulfonyl group, a heterocyclic sulfonyl group, or a sulfamoyl group; and each of these groups may be further substituted.

$G_3$, $R_{31}$ and $R_{32}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (inclusive of an arylamino group and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfonyl group, a heterocyclic sulfinyl group, a sulfamoyl group, a sulfo group, or a heterocyclic thio group; and each of these groups may be further substituted.

$R_{31}$ and $R_{35}$, or $R_{35}$ and $R_{36}$ may be taken together to form a 5-membered or 6-membered ring.

The dye of the general formula (M) will be hereunder described in more detail.

In the general formula (M), $A_{31}$ represents a 5-membered heterocyclic group, and examples of the hetero atom of the heterocyclic ring include N, O, and S. $A_{31}$ is preferably a nitrogen-containing 5-membered ring, and the heterocyclic ring may be fused with an aliphatic ring, an aromatic ring or other heterocyclic ring- Examples of the preferred heterocyclic ring for $A_{31}$ include a pyrazole ring, an imidazole ring, a thiazole ring, an isothiazole ring, an oxazole ring, a thiadiazole ring, a triazole ring, a benothiazole ring, a benzoxazole ring, a benzoisothiazole ring, and a benzimidazole ring. Each of the heterocyclic rings may be further substituted. Above all, a pyrazole ring, an imidazole ring, an isothiazole ring, a thiadiazole ring, a benzothiazole ring, and a triazole ring represented by the following general formulae (a) to (g) are preferable.

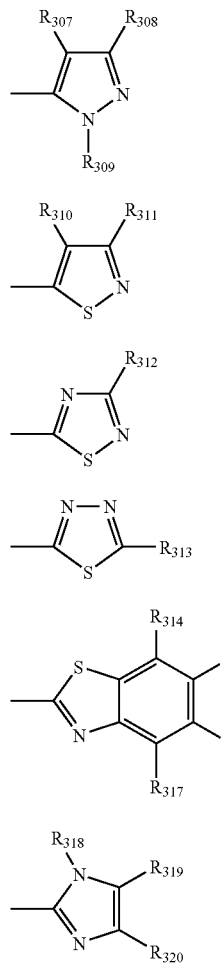

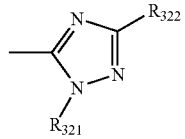

In the general formulae (a) to (g), $R_{307}$ to $R_{322}$ each represents a substituent the same as in $G_3$, $R_{31}$ and $R_{32}$ in the general formula (M).

Of the general formulae (a) to (g), a pyrazole ring, an isothiazole ring and an triazole ring represented by the general formulae (a), (b) and (g) are preferable; and a pyrazole ring represented by the general formula (a) is the most preferable.

In the general formula (M), $B_{31}$ and $B_{32}$ each represents =$CR_{31}$— or —$CR_{32}$=; or either one of them represents a nitrogen atom, and the other represents =$CR_{31}$— or —$CR_{32}$=. It is preferable that each of $B_{31}$ and $B_{32}$ represents =$CR_{31}$— or —$CR_{32}$=.

$R_{35}$ and $R_{36}$ each independently represents a hydrogen atom or a substituent. This substituent represents an aliphatic group, an aromatic group, a heterocyclic group, an acyl group, an alkoxycarbonyl group, an aryloxycarbonyl group, a heterocyclic oxycarbonyl group, a carbamoyl group, an alkyl- or arylsulfonyl group, a heterocyclic sulfonyl group, or a sulfamoyl group; and the hydrogen atom of each of the substituents may be substituted.

$R_{35}$ and $R_{36}$ are each preferably a hydrogen atom, an aliphatic group, an aromatic group, a heterocyclic group, an acyl group, or an alkyl- or arylsulfonyl group; more preferably a hydrogen atom, an aromatic group, a heterocyclic group, an acyl group, or an alkyl- or arylsulfonyl group; and most preferably a hydrogen atom, an aryl group, or a heterocyclic group. The hydrogen atom of each of the substituents may be substituted. However, $R_{35}$ and $R_{36}$ do not represent a hydrogen atom at the same time.

$G_3$, $R_{31}$ and $R_{32}$ each independently represents a hydrogen atom or a substituent. This substituent represents a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group, an acylamino group, a ureido group, a sulfamoylamino group, an alkoxycarbonylamino group, an aryloxycarbonylamino group, an alkylsulfonylamino group, an arylsulfonylamino group, a heterocyclic sulfonylamino group, a nitro group, an alkyithio group, an arylthio group, a heterocyclic thio group, an alkylsulfonyl group, an arylsulfonyl group, a heterocyclic sulfonyl group, an alkylsulfinyl group, an arylsulfinyl group, a heterocyclic sulfinyl group, a sulfamoyl group, or a sulfo group. The hydrogen atom of each of the substituents may be substituted.

$G_3$ is preferably a hydrogen atom, a halogen atom, an aliphatic group, an aromatic group, a hydroxyl group, an alkoxy group, an aryloxy group, an acyloxy group, a heterocyclic oxy group, an amino group, an acylamino group, a ureido group, a sulfamoylamino group, an alkoxycarbonylamino group, an aryloxycarbonylamino group, an alkyl- or arylthio group, or a heterocyclic thio group; more preferably a hydrogen atom, a halogen atom, an alkyl group, a hydroxyl group, an alkoxy group, an aryloxy group, an acyloxy group, an amino group, or an acylamino group; and most preferably a hydrogen atom, an amino group (preferably an anilino group), or an acylamino group. The hydrogen atom of each of the substituents may be substituted.

$R_{31}$ and $R_{32}$ are each preferably a hydrogen atom, an alkyl group, a halogen atom, an alkoxycarbonyl group, a carboxyl group, a carbamoyl group, a hydroxyl group, an alkoxy group, or a cyano group. The hydrogen atom of each of the substituents may be substituted.

$R_{31}$ and $R_{35}$, or $R_{35}$ and $R_{36}$ may be taken together to form a 5-membered or 6-membered ring.

When $A_{31}$ has a substituent, or the substituent of $R_{31}$, $R_{32}$, $R_{35}$, $R_{36}$ or $G_3$ is further substituted, examples of the substituent include the substituents as enumerated above for $G_3$, $R_{31}$ and $R_{32}$.

When the dye of the invention is a water-soluble dye, it is preferable that an ionic hydrophilic group is further present as a substituent at any position on $A_{31}$, $R_{31}$, $R_{32}$, $R_{35}$, $R_{36}$ and $G_3$. The ionic hydrophilic group as the substituent includes a sulfo group, a carboxyl group, a phosphono group, and a quaternary ammonium group. The ionic hydrophilic group is preferably a carboxyl group, a phosphono group, or a sulfo group, and especially preferably a carboxyl group or a sulfo group. The carboxyl group, the phosphono group, and the sulfo group may be each in a salt state. Examples of a counter ion capable of forming a salt include an ammonium ion, an alkali metal ion (for example, a lithium ion, a sodium ion, and a potassium ion), and an organic cation (for example, a tetramethylammonium ion, a tetramethylguanidium ion, and a tetramethylphosphonium ion). The salt may be a mixed salt composed of plural counter ions.

The following substituents are common even among different symbols in the general formula (M) and a general formula (M-A) as described later.

Examples of the halogen atom include a fluorine atom, a chlorine atom, and a bromine atom.

The aliphatic group means an alkyl group, a substituted alkyl group, an alkenyl group, a substituted alkenyl group, an alkynyl group, a substituted alkynyl group, an aralkyl group, or a substituted aralkyl group.

The aliphatic group may be branched or may form a ring. The aliphatic group preferably has from 1 to 20 carbon atoms, and more preferably from 1 to 16 carbon atoms. The aryl moiety of the aralkyl group or the substituted aralkyl group is preferably a phenyl group or a naphthyl group, and especially preferably a phenyl group. Examples of the aliphatic group include a methyl group, an ethyl group, a butyl group, an isopropyl group, a t-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group, and an allyl group.

The aromatic group means an aryl group or a substituted aryl group. The aryl group is preferably a phenyl group or a naphthyl group, and especially preferably a phenyl group. The aromatic group preferably has from 6 to 20 carbon atoms, and more preferably from 6 to 16 carbon atoms.

Examples of the aromatic group include a phenyl group, a p-tolyl group, a p-methoxyphenyl group, an o-chlorophenyl group, and an m-(3-sulfopropylamino)phenyl group.

The heterocyclic group includes a substituted heterocyclic group. In the heterocyclic group, the heterocyclic ring may be fused with an aliphatic ring, an aromatic ring or other heterocyclic ring. As the heterocyclic ring, a 5-membered or 6-membered heterocyclic ring is preferable. Examples of the substituent include an aliphatic group, a halogen atom, an alkyl or arylsulfonyl group, an acyl group, an acylamino group, a sulfamoyl group, a carbamoyl group, and an ionic hydrophilic group. Examples of the heterocyclic group include a 2-pyridyl group, a 2-thienyl group, a 2-thiazolyl group, a 2-benzothiazolyl group, a 2-benzoxazolyl group, and a 2-furyl group.

The carbamoyl group includes a substituted carbamoyl group. Examples of the substituent include an alkyl group. Examples of the carbamoyl group include a methylcarbamoyl group and a dimethylcarbamoyl group.

The alkoxycarbonyl group includes a substituted alkoxycarbonyl group. As the alkoxycarbonyl group, an alkoxycarbonyl group having from 2 to 20 carbon atoms is preferable. Examples of the substituent include an ionic hydrophilic group. Examples of the alkoxycarbonyl group include a methoxycarbonyl group and an ethoxycarbonyl group.

The aryloxycarbonyl group includes a substituted aryloxycarbonyl group. As the aryloxycarbonyl group, an aryloxycarbonyl group having from 7 to 20 carbon atoms is preferable. Examples of the substituent include an ionic hydrophilic group. Examples of the aryloxycarbonyl group include a phenoxycarbonyl group.

The heterocyclic oxycarbonyl group includes a substituted heterocyclic oxycarbonyl group. As the heterocyclic oxycarbonyl group, a heterocyclic oxycarbonyl group having from 2 to 20 carbon atoms is preferable. Examples of the substituent include an ionic hydrophilic group. Examples of the heterocyclic oxycarbonyl group include a 2-pyridyloxycarbonyl group.

The acyl group includes a substituted acyl group. As the acyl group, an acyl group having from 1 to 20 carbon atoms is preferable. Examples of the substituent include an ionic hydrophilic group. Examples of the acyl group include an acetyl group, a benzoyl group, and a nicotinoyl group.

The alkoxy group includes a substituted alkoxy group. As the alkoxy group, an alkoxy group having from 1 to 20 carbon atoms is preferable. Examples of the substituent include an alkoxy group, a hydroxyl group, and an ionic hydrophilic group. Examples of the alkoxy group include a methoxy group, an ethoxy group, an isopropoxy group, a methoxyethoxy group, a hydroxyethoxy group, and a 3-carboxypropoxy group.

The aryloxy group includes a substituted aryloxy group. As the aryloxy group, an aryloxy group having from 6 to 20 carbon atoms is preferable. Examples of the substituent include an alkoxy group and an ionic hydrophilic group. Examples of the aryloxy group include a phenoxy group, a p-methoxyphenoxy group, and an o-methoxyphenoxy group.

The heterocyclic oxy group includes a substituted heterocyclic oxy group. Examples of the heterocyclic ring include the heterocyclic rings as described above for the heterocyclic group. As the heterocyclic oxy group, a heterocyclic oxy group having from 2 to 20 carbon atoms is preferable. Examples of the substituent include an alkyl group, an alkoxy group, and an ionic hydrophilic group. Examples of the heterocyclic oxy group include a 3-pyridyloxy group and a 3-thienyloxy group.

As the silyloxy group, a silyloxy group on which an aliphatic group or an aromatic group each having from 1 to 20 carbon atoms is substituted is preferable. Examples of the silyloxy group include trimethylsilyloxy and diphenylmethylsilyloxy.

The acyloxy group includes a substituted acyloxy group. As the acyloxy group, an acyloxy group having from 1 to 20 carbon atoms is preferable. Examples of the substituent include an ionic hydrophilic group. Examples of the acyloxy group include an acetoxy group and a benzoyloxy group.

The carbamoyloxy group includes a substituted carbamoyloxy group. Examples of the substituent include an alkyl group. Examples of the carbamoyloxy group include an N-methylcarbamoyloxy group.

The alkoxycarbonyloxy group includes a substituted alkoxycarbonyloxy group. As the alkoxycarbonyloxy group, an alkoxycarbonyloxy group having from 2 to 20 carbon atoms is preferable. Examples of the alkoxycarbonyloxy group include a methoxycarbonyloxy group and an isopropoxycarbonyloxy group.

The aryloxycarbonyloxy group includes a substituted aryloxycarbonyloxy group. As the aryloxycarbonyloxy group, an aryloxycarbonyloxy group having from 7 to 20 carbon atoms is preferable. Examples of the aryloxycabonyloxy group include a phenoxycarbonyloxy group.

The amino group includes a substituted amino group. Examples of the substituent include an alkyl group, an aryl group, and a heterocyclic group, and the alkyl group, the aryl group or the heterocyclic group may be further substituted. The alkylamino group includes a substituted alkylamino group. As the alkylamino group, an alkylamino group having from 1 to 20 carbon atoms is preferable. Examples of the substituent include an ionic hydrophilic group. Examples of the alkyl amino group include a methylamino group and a diethylamino group.

The arylamino group includes a substituted arylamino group. As the arylamino group, an arylamino group having from 6 to 20 carbon atoms is preferable. Examples of the substituent include a halogen atom and an ionic hydrophilic group. Examples of the arylamino group include a phenylamino group and a 2-chlorophenylamino group.

The heterocyclic amino group includes a substituted heterocyclic amino group. Examples of the heterocyclic ring include the heterocyclic rings as described above for the heterocyclic group. As the heterocyclic amino group, a heterocyclic amino group having from 2 to 20 carbon atoms is preferable. Examples of the substituent include an alkyl group, a halogen atom, and an ionic hydrophilic group.

The acylamino group includes a substituted acylamino group. As the acylamino group, an acylamino group having from 2 to 20 carbon atoms is preferable. Examples of the substituent include an ionic hydrophilic group. Examples of the acylamino group include an acetylamino group, a propionylamino group, a benzoylamino group, an N-phenylacetylamino group, and a 3,5-disulfobenzoylamino group.

The ureido group includes a substituted ureido group. As the ureido group, a ureido group having from 1 to 20 carbon atoms is preferable. Examples of the substituent include an alkyl group and an aryl group. Examples of the ureido group include a 3-methylureido group, a 3,3-dimethylureido group, and a 3-phenylureido group.

The sulfamoylamino group includes a substituted sulfamoylamino group. Examples of the substituent include an alkyl group. Examples of the sulfamoylamino group include an N,N-dipropylsulfamoylamino group.

The alkoxycarbonylamino group includes a substituted alkoxycarbonylamino group. As the alkoxycarbonylamino group, an alkoxycarbonylamino group having from 2 to 20 carbon atoms is preferable. Examples of the substituent include an ionic hydrophilic group. Examples of the alkoxycarbonylamino group include an ethoxycarbonylamino group.

The aryloxycarbonylamino group includes a substituted aryloxycarbonylamino group. As the aryloxycarbonylamino group, an aryloxycarbonylamino group having from 7 to 20 carbon atoms is preferable. Examples of the substituent include an ionic hydrophilic group. Examples of the aryloxyarbonylamino group include a phenoxycarbonylamino group.

The alkylsulfonylamino group and the arylsulfonylamino group include a substituted alkylsulfonylamino group and a substituted arylsulfonylamino group. As the alkylsulfonylamino group and the arylsulfonylamino group, an alkylsulfonylamino group and an arylsulfonylamino group each having from 1 to 20 carbon atoms are preferable. Examples of the substituent include an ionic hydrophilic group. Examples of the alkylsulfonylamino group and the arylsulfonylamino group include a methylsulfonylamino group, an N-phenylmethylsulfonylamino group, a phenylsulfonylamino group, and a 3-carboxyphenylsulfonylamino group.

The heterocyclic sulfonylamino group includes a substituted heterocyclic sulfonylamino group. Examples of the heterocyclic ring include the heterocyclic rings as described above for the heterocyclic group. As the heterocyclic sulfonylamino group, a heterocyclic sulfonylamino group having from 1 to 12 carbon atoms is preferable. Examples of the substituent include an ionic hydrophilic group. Examples of the heterocyclic sulfonylamino group include a 2-thienylsulfonylamino group and a 3-pyridylsulfonylamino group.

The alkylthio group, the arylthio group and the heterocyclic thio group include a substituted alkylthio group, a substituted arylthio group and a substituted heterocyclic thio group. Examples of the heterocyclic ring include the heterocyclic rings as described above for the heterocyclic group. As the alkylthio group, the arylthio group and the heterocyclic thio group, an alkylthio group, an arylthio group and a heterocyclic thio group each having from 1 to 20 carbon atoms are preferable. Examples of the substituent include an ionic hydrophilic group. Examples of the alkylthio group, the arylthio group and the heterocyclic thio group include a methylthio group, a phenylthio group, and a 2-pyridylthio group.

The alkylsulfonyl group and the arylsulfonyl group include a substituted alkylsulfonyl group and a substituted arylsulfonyl group. Examples of the alkylsulfonyl group and the arylsulfonyl group include a methylsulfonyl group and a phenylsulfonyl group.

The heterocyclic sulfonyl group includes a substituted heterocyclic sulfonyl group. Examples of the heterocyclic ring include the heterocyclic rings as described above for the heterocyclic group. As the heterocyclic sulfonyl group, a heterocyclic sulfonyl group having from 1 to 20 carbon atoms is preferable. Examples of the substituent include an ionic hydrophilic group. Examples of the heterocyclic sulfonyl group include a 2-thienylsulfonyl group and a 3-pyridylsulfonyl group.

The alkylsulfinyl group and the arylsulfinyl group include a substituted alkylsulfinyl group and a substituted arylsulfinyl group. Examples of the alkylsulfinyl group and the arylsulfinyl group include a methylsulfinyl group and a phenylsulfinyl group.

The heterocyclic sulfinyl group includes a substituted heterocyclic sulfinyl group. Examples of the heterocyclic ring include the heterocyclic rings as described above for the heterocyclic group. As the heterocyclic sulfinyl group, a heterocyclic sulfinyl group having from 1 to 20 carbon atoms is preferable. Examples of the substituent include an ionic hydrophilic group. Examples of the heterocyclic sulfinyl group include a 4-pyridylsulfinyl group.

The sulfamoyl group includes a substituted sulfamoyl group. Examples of the substituent include an alkyl group. Examples of the sulfamoyl group include a dimethylsulfamoyl group and a di(2-hydroxyethyl)sulfamoyl group.

Of the dyes represented by the general formula (M), dyes having a structure represented by the following general formula (M-A) are especially preferable.

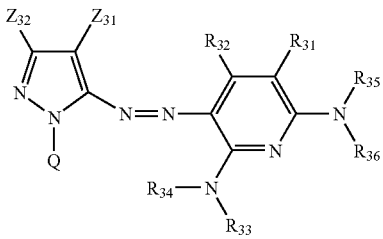

In the formula, $R_{31}$, $R_{32}$, $R_{35}$ and $R_{36}$ are synonymous with those in the general formula (M).

$R_{33}$ and $R_{34}$ each independently represents a hydrogen atom or a substituent. This substituent represents an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Of these, a hydrogen atom, an aromatic group, a heterocyclic group, an acyl group, an alkylsulfonyl group, and an arylsulfonyl group are preferable; and a hydrogen atom, an aromatic group, and a heterocyclic group are especially preferable.

$Z_{31}$ represents an electron withdrawing group having a Hammett's substituent constant σp value of 0.20 or more. $Z_{31}$ preferably represents an electron withdrawing group having a Hammett's substituent constant σp value of 0.30 or more, more preferably an electron withdrawing group having a Hammett's substituent constant σp value of 0.45 or more, and especially preferably an electron withdrawing group having a Hammett's substituent constant σp value of 0.60 or more. It is desired that the Hammett's substituent constant σp value does not exceed 1.0. Specific examples of the preferred substituent include electron withdrawing substituents as described later. Above all, an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, and a halogenated alkyl group having from 1 to 20 carbon atoms are preferable; a cyano group, an alkylsulfonyl group having from 1 to 20 carbon atoms, and an arylsulfonyl group having from 6 to 20 carbon atoms are especially preferable; and a cyano group is the most preferable.

$Z_{32}$ represents a hydrogen atom or a substituent. This substituent represents an aliphatic group, an aromatic group, or a heterocyclic group.

Q represents a hydrogen atom or a substituent. This substituent represents an aliphatic group, an aromatic group, or a heterocyclic group. Above all, Q is preferably a non-metal atomic group necessary for forming a 5-membered to 8-membered ring. The 5-membered to 8-membered ring may be substituted, may be a saturated ring, or may have an unsaturated bond. Above all, an aromatic group and a heterocyclic group are especially preferable. Examples of the preferred non-metal atom include a nitrogen atom, an oxygen atom, a sulfur atom, and a carbon atom. Specific examples of such a ring structure include a benzene ring, a cyclopentane ring, a cyclohexane ring, a cycloheptane ring, a cyclooctane ring, a cyclohexene group, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulforane ring, and a thiane ring.

The hydrogen atom of each of the substituents as described for the general formula (M-A) may be substituted. Examples of this substituent include the substituents as described for the general formula (M) and the groups and ionic hydrophilic groups as enumerated for $G_3$, $R_{31}$ and $R_{32}$.

Here, the Hammett's substituent constant σp value to be used in this specification is described. The Hammett's rule is a rule of thumb advocated by L. P. Hammett in 1935 for the purpose of quantitatively discussing influences of benzene derivatives against the reaction or equilibrium, appropriateness of which is widely admitted at present. The substituent constant as required in the Hammett's rule includes a σp value and a σm value, and these values can be found out in a lot of documents. For example, the details are described in J. A. Dean ed., *Langes's Handbook of Chemistry*, 12th Edition, 1979 (MacGraw-Hill) and *Kagaku no ryoiki Zokan*, No. 122, pp. 96-103, 1979 (Nankodo Co., Ltd.). Incidentally, in the invention, while the respective substituents are limited or explained in terms of a Hammett's substituent constant σp, it is not meant that the invention is limited to only substituents having a value already known by documents as found in the foregoing documents. Needless to say, in the case where a value of a substituent is not known by documents but when measured on the basis of the Hammett's rule, will fall within the foregoing range, the subject substituent is included in the invention. Furthermore, the general formula (M-A) of the invention also includes a compound which is not a benzene derivative, but the σp value is used as an index to show an electron effect of the substituent regardless of the position of a substituent. In the invention, the σp value is used in such meanings.

Specific examples of the electron withdrawing group having a Hammett's substituent constant σp value of 0.60 or more include a cyano group, a nitro group, an alkylsulfonyl group (for example, a methylsulfonyl group), and an arylsulfonyl group (for example, a phenylsulfonyl group).

Examples of the electron withdrawing group having a Hammett's substituent constant σp value of 0.45 or more include, in addition to the foregoing groups, an acyl group (for example, an acetyl group), an alkoxycarbonyl group (for example, a dodecyloxycarbonyl group), an aryloxycarbonyl group (for example, m-chlorophenoxycarbonyl), an alkylsulfinyl group (for example, n-propylsulfinyl), an arylsulfinyl group (for example, phenylsulfinyl), a sulfamoyl group (for example, N-ethylsulfamoyl and N,N-dimethylsulfamoyl), and a halogenated alkyl group (for example, trifluoromethyl).

Examples of the electron withdrawing group having a Hammett's substituent constant σp value of 0.30 or more include, in addition to the foregoing groups, an acyloxy group (for example, acetoxy), a carbamoyl group (for example, N-ethylcarbamoyl and N,N-dibutylcarbamoyl), a halogenated alkoxy group (for example, trifluoromethyloxy), a halogenated aryloxy group (for example, pentafluorophenyloxy), a sulfonyloxy group (for example, a methylsulfonyloxy group), a halogenated alkylthio group (for example, difluoromethylthio), an aryl group substituted with two or more electron withdrawing groups having a σp value of 0.15 or more (for example, 2,4-dinitrophenyl and pentachlorophenyl), and a heterocyclic ring (for example, 2-benzoxazolyl, 2-benzothiazolyl, and 1-phenyl-2-benzimidazolyl).

Specific examples of the electron withdrawing group having a Hammett's substituent constant σp value of 0.20 or more include, in addition to the foregoing groups, a halogen atom.

With respect to an especially preferred combination of substituents as the azo dye represented by the foregoing general formula (M), $R_{35}$ and $R_{36}$ are each preferably a hydrogen atom, an alkyl group, an aryl group, a heterocyclic group, a sulfonyl group, or an acyl group; more preferably a hydrogen atom, an aryl group, a heterocyclic group, or a sulfonyl group; and most preferably a hydrogen atom, an aryl group, or a heterocyclic group. However, $R_{35}$ and $R_{36}$ do not represent a hydrogen atom at the same time.

$G_3$ is preferably a hydrogen atom, a halogen atom, an alkyl group, a hydroxyl group, an amino group, or an acyl amino group; more preferably a hydrogen atom, a halogen atom, an amino group, or an acylamino group; and further preferably a hydrogen atom, an amino group, or an acylamino group.

$A_{31}$ is preferably a pyrazole ring, an imidazole ring, an isothiazole ring, a thiadiazole ring, or a benzothiazole ring; more preferably a pyrazole ring or an isothiazole ring; and most preferably a pyrazole ring.

$B_{31}$ and $B_{32}$ each represents $=CR_{31}-$ or $-CR_{32}=$. $R_{31}$ and $R_{32}$ are each preferably a hydrogen atom, an alkyl group, a halogen atom, a cyano group, a carbamoyl group, a carboxyl group, a hydroxyl group, an alkoxy group, or an alkoxycarbonyl group; and more preferably a hydrogen atom, an alkyl group, a carboxyl group, a cyano group, or a carbamoyl group.

Incidentally, with respect to the preferred combination of substituents of the compound represented by the foregoing general formula (M) (hereinafter sometimes referred to as "compound (M)"), compounds in which at least one of the various substituents is any one of the foregoing preferred groups are preferable; compounds in which many of the various substituents are the foregoing preferred groups are more preferable; and compounds in which all of the substituents are the foregoing preferred groups are the most preferable.

Preferred examples of the compound (M) which is used in the invention include compounds as described in WO 02/83795, WO 02/83662, and Japanese Patent Application Nos. 2002-313087 and 2002-313088. Specific examples of the especially preferred compound (M) will be given below, but it should not be construed that the dye which is used in the invention is limited to the following examples. Furthermore, the ionic hydrophilic group may be in an arbitrary salt state regardless of the following examples. Examples of a counter ion capable of forming a salt include an ammonium ion, an alkali metal ion (for example, a lithium ion, a sodium ion, and a potassium ion), and an organic cation (for example, a tetramethylammonium ion, a tetramethylguanidium ion, and a tetramethylphosphonium ion). Of these counter ions, an alkali metal salt is preferable.

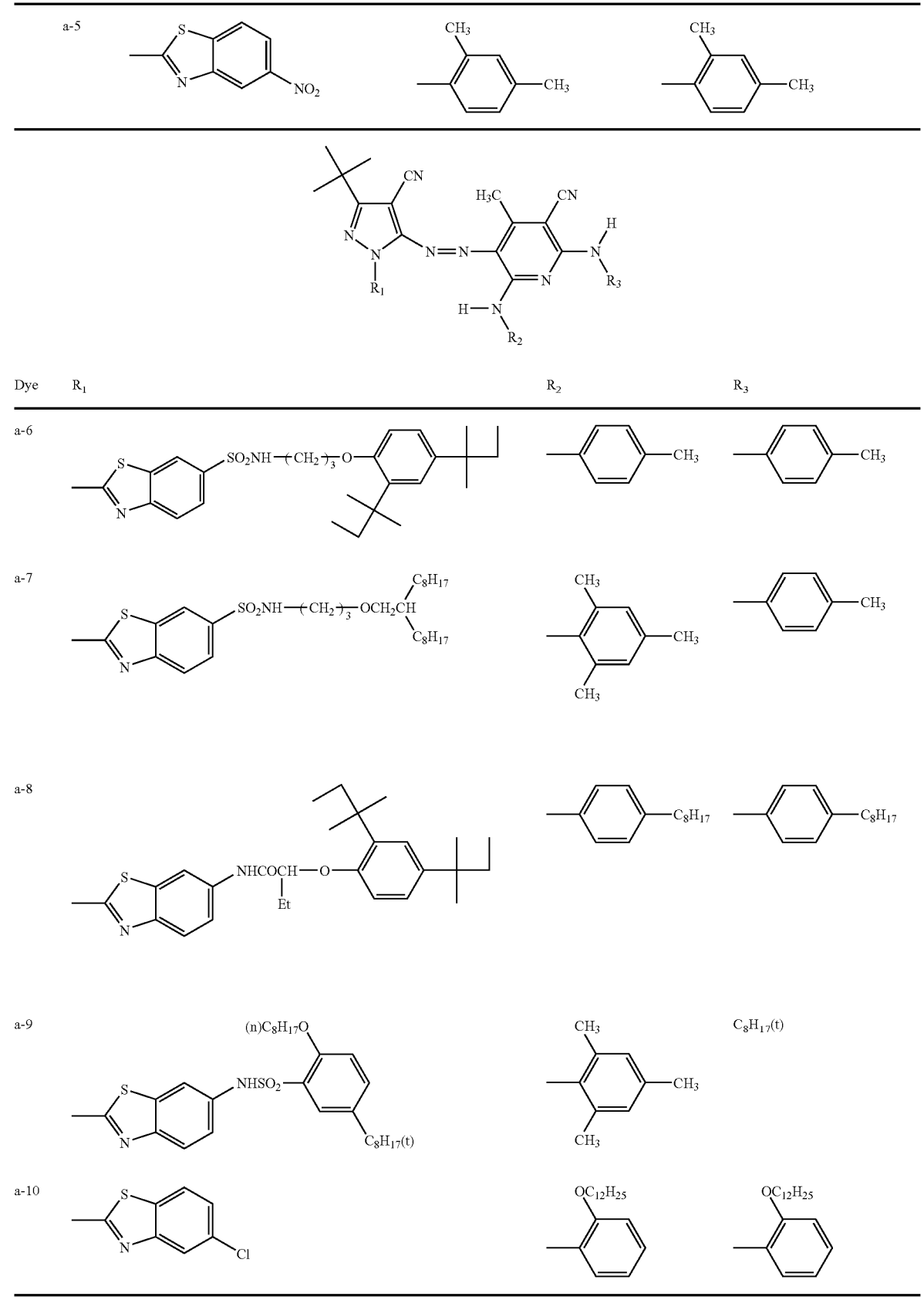

-continued

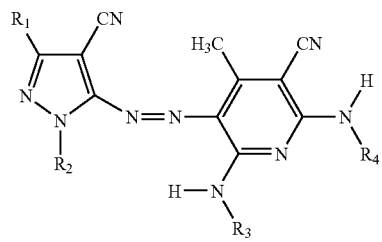

| Dye | R₁ | R₂ | R₃ | R₄ |
|---|---|---|---|---|
| a-11 | tert-butyl | 2-methylbenzothiazol-6-yl-SO₃Na | 4-methylphenyl | 3-carboxyphenyl (COOH) |
| a-12 | tert-butyl | 2-methylbenzothiazol-6-yl-SO₃K | 2-SO₃K-phenyl | 2-SO₃K-phenyl |
| a-13 | phenyl | 2-methylbenzothiazol-6-yl-COOH | 4-SO₃K-phenyl | 3-COOH-phenyl |
| a-14 | 2-chlorophenyl | 2-methylbenzothiazol-SO₃K (4,5-mix) | 4-SO₃K-phenyl | 3-COOH-phenyl |
| a-15 | 4-SO₃K-phenyl | 2-methylbenzothiazol-yl | 2-SO₃K-phenyl | 3-COOH-phenyl |

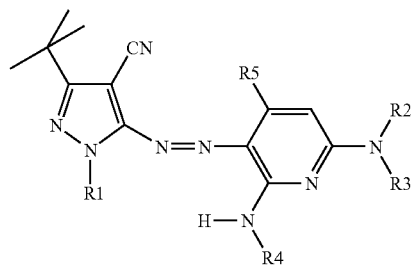

| Dye | R1 | R2 | R3 | R4 | R5 |
|---|---|---|---|---|---|
| a-16 | 2-benzothiazolyl | 2-benzothiazolyl | 2-benzothiazolyl | 2,4,6-trimethylphenyl (mesityl) | —CH₃ |

-continued
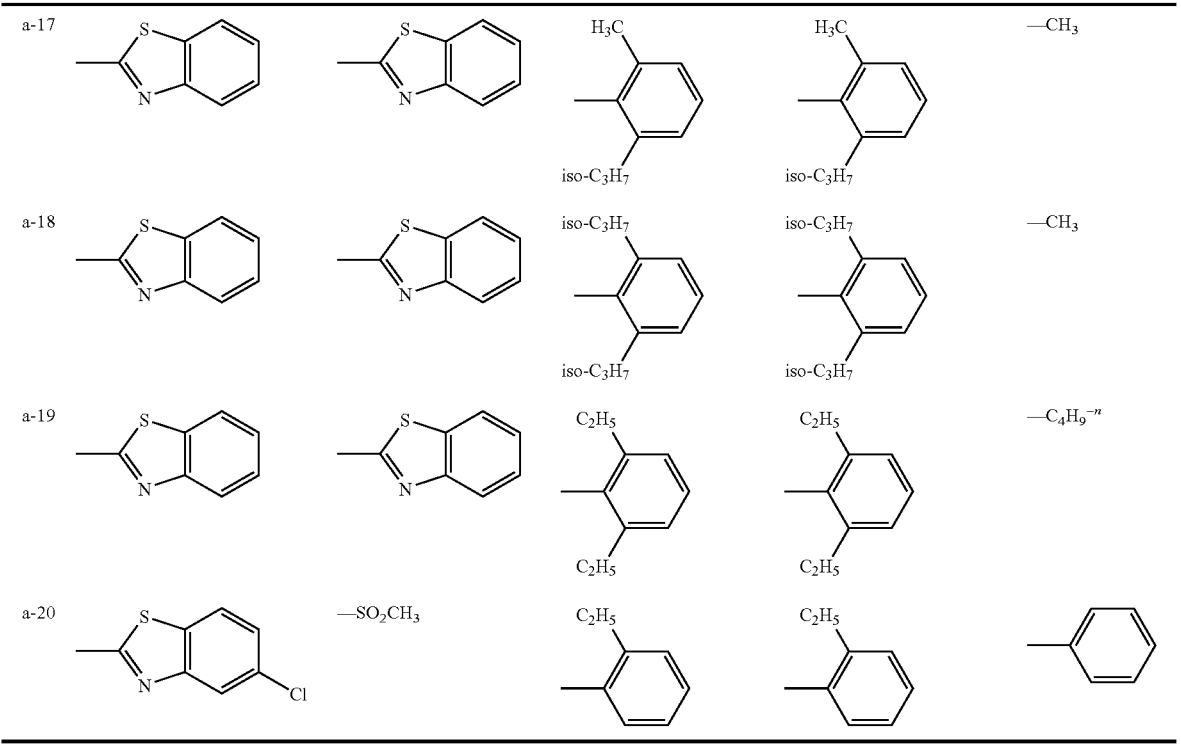
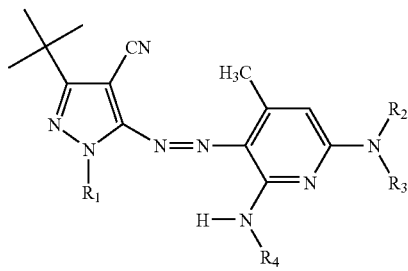
| Dye | R$_1$ | R$_2$ |
|---|---|---|
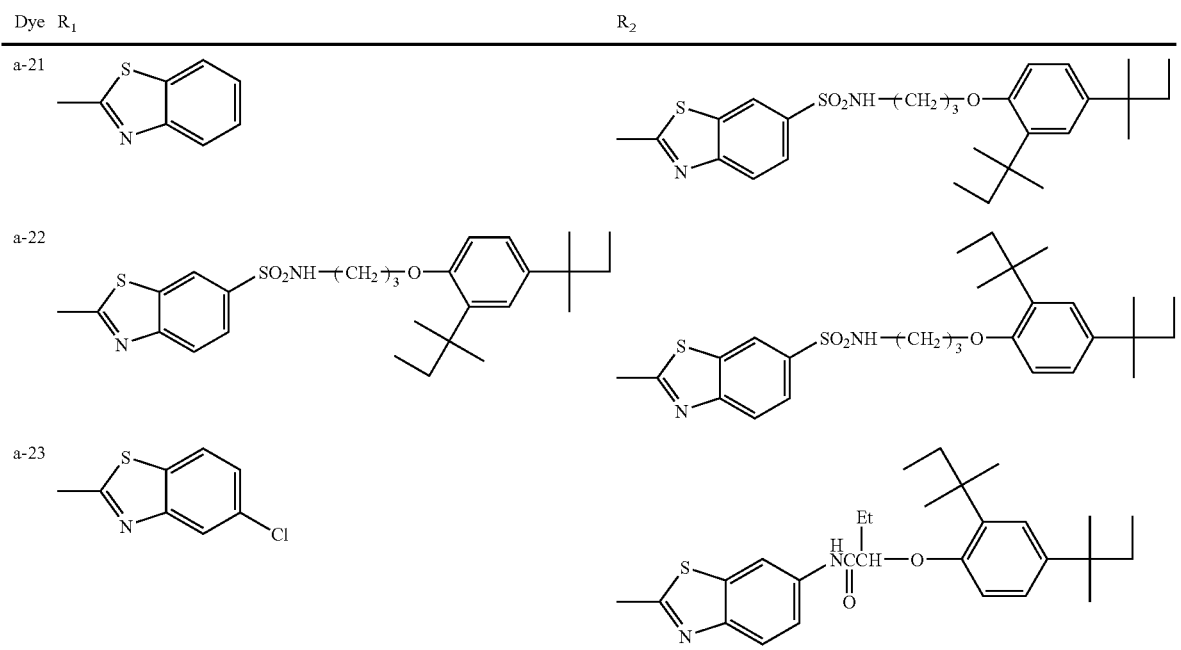

-continued
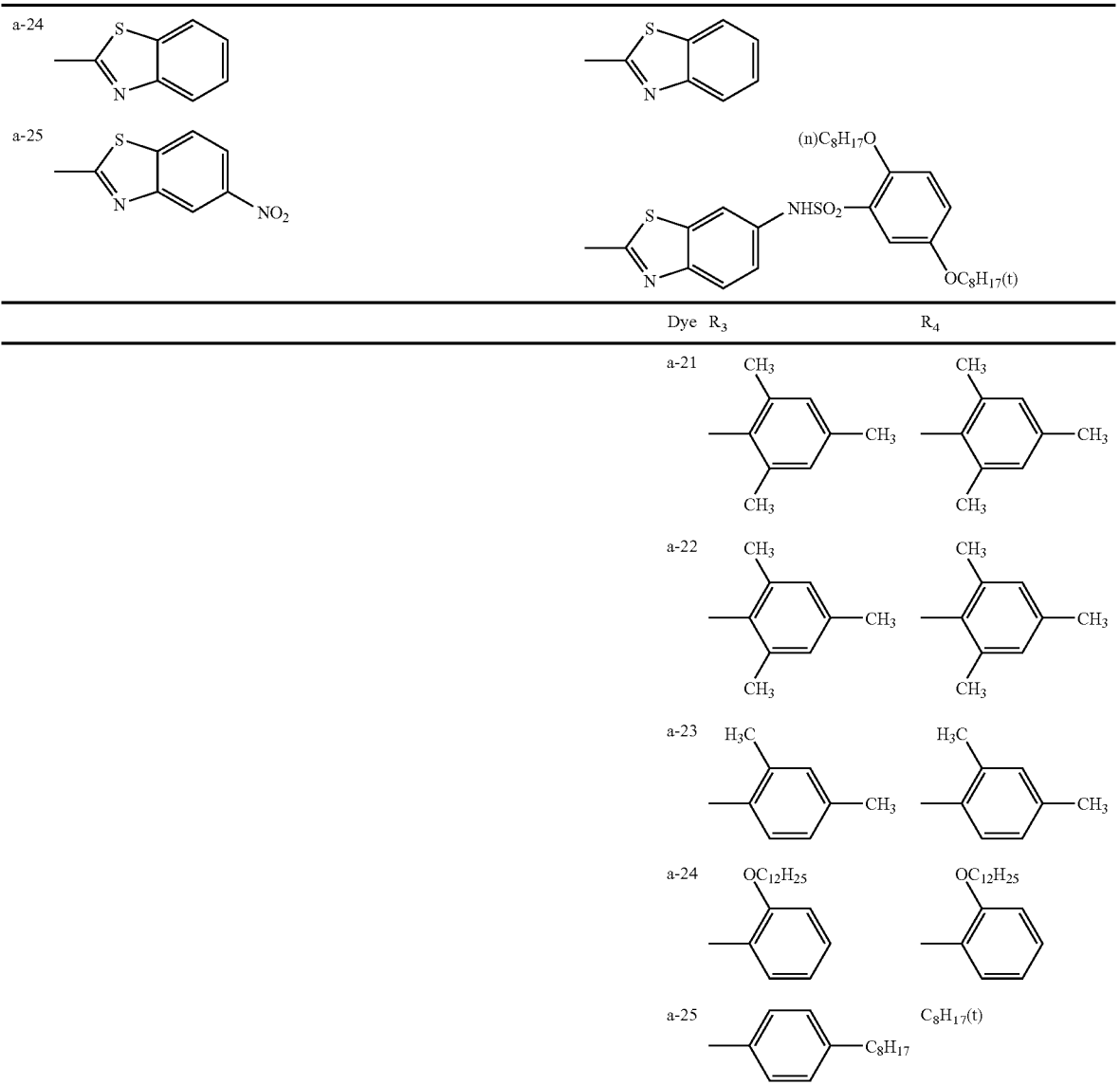
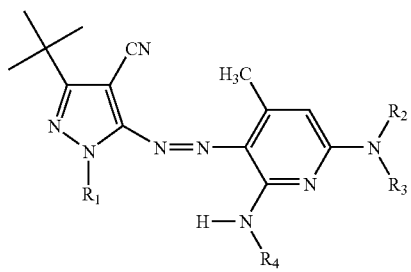
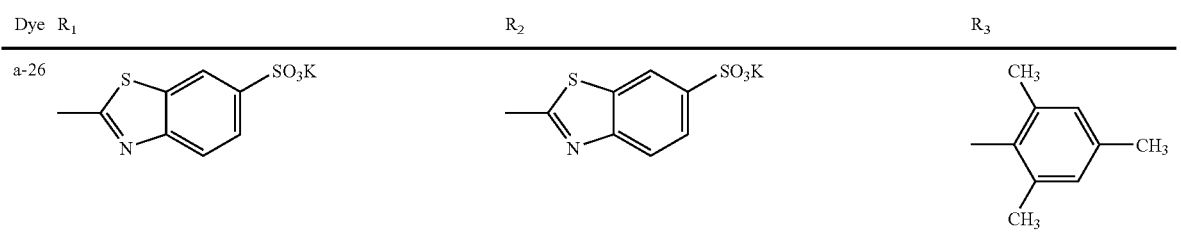

-continued
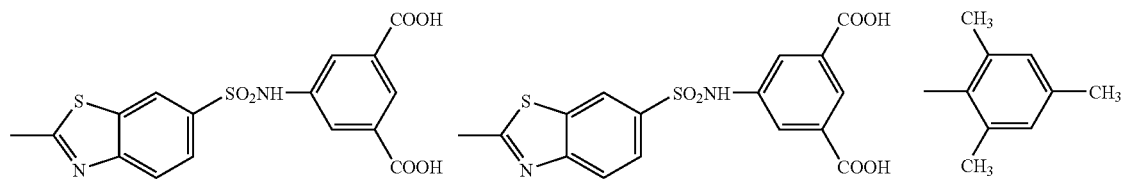
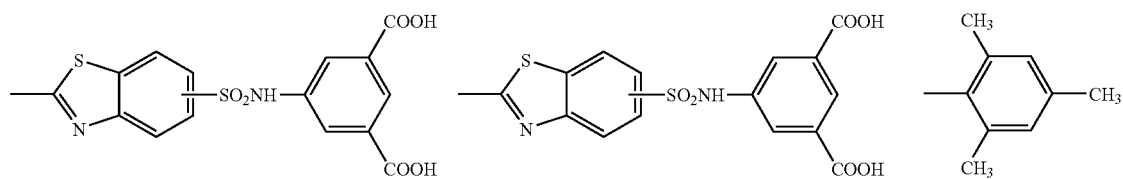
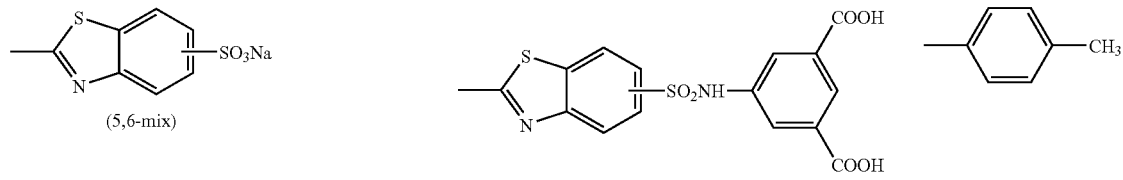
| Dye | R$_4$ |
|---|---|
| a-26 | 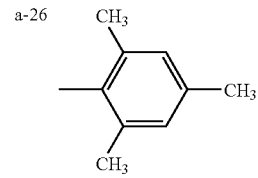 |
| a-27 | 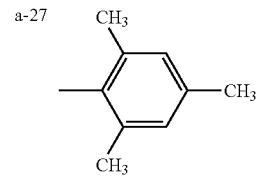 |
| a-28 | 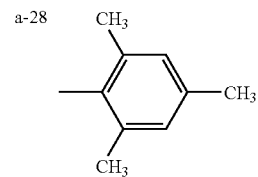 |
| a-29 | 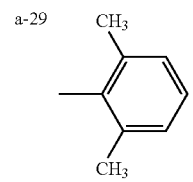 |

-continued

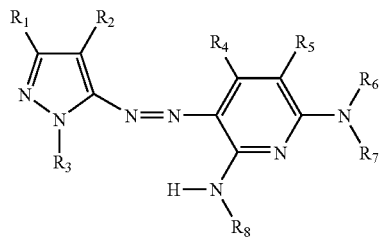

| Dye | R₁ | R₂ | R₃ | R₄ | R₅ | R₆ | R₇ |
|---|---|---|---|---|---|---|---|
| a-30 | 2-methylphenyl (o-tolyl) | CN | 2-pyridyl | H | $CONH_2$ | $SO_2CH_3$ | $OC_8H_{17}$-(2-methylphenyl) |
| a-31 | t-Bu | Br | 2-pyrimidinyl | COOEt | H | 2-benzothiazolyl | $C_8H_{17}(t)$ |
| a-32 | 2-pyridyl | $SO_2CH_3$ | 4,6-bis(NHCH₃)-1,3,5-triazin-2-yl | $CONH_2$ | H | 6-chloro-2-benzothiazolyl | 4-methylphenyl |
| a-33 | t-Bu | CN | 2,4,5-tricyano-phenyl (methyl substituted) | H | H | 5-chloro-2-benzothiazolyl | 2-methylphenyl |

| Dye | R₈ |
|---|---|
| a-30 | 2-methylphenyl |
| a-31 | $COCH_3$ |
| a-32 | $CO$-t-Bu |
| a-33 | $SO_2CH_3$ |

-continued

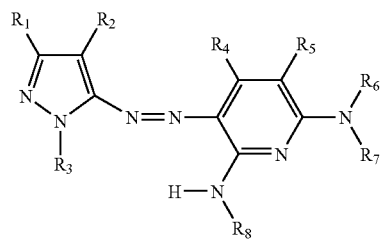

| Dye | $R_1$ | $R_2$ | $R_3$ | $R_4$ | $R_5$ | $R_6$ | $R_7$ | $R_8$ |
|---|---|---|---|---|---|---|---|---|
| a-34 | —C(CH$_3$)$_3$ | Br | 3,5-dichloro-4-methyl-nitrophenyl | H | CONH$_2$ | COCH$_3$ | 2,4,6-trimethylphenyl | 4-C$_8$H$_{17}$-phenyl |
| a-35 | —C(CH$_3$)$_3$ | CN | benzothiazol-2-yl | CH$_3$ | H | benzothiazol-2-yl | 2,6-diethyl-4-methylphenyl | 2,6-diethyl-4-methylphenyl |
| a-36 | —C(CH$_3$)$_3$ | CN | benzothiazol-2-yl | CH$_3$ | CN | H | 2,6-diethyl-4-methylphenyl | 2,6-diethyl-4-methylphenyl |

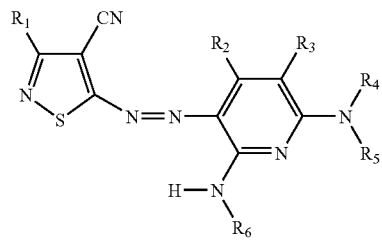

| Dye | $R_1$ | $R_2$ | $R_3$ | $R_4$ | $R_5$ | $R_6$ |
|---|---|---|---|---|---|---|
| b-1 | CH$_3$ | CH$_3$ | CN | H | 4-C$_8$H$_{17}$-phenyl | 4-C$_8$H$_{17}$-phenyl |
| b-2 | CH$_3$ | CH$_3$ | CN | H | 2,4,6-trimethylphenyl | 2,4,6-trimethylphenyl |
| b-3 | CH$_3$ | CH$_3$ | CONH$_2$ | H | 4-C$_8$H$_{17}$-phenyl | 2,4,6-trimethylphenyl |

-continued

| Dye | R1 | R2 | R3 | R4 | R5 | R6 |
|---|---|---|---|---|---|---|
| b-4 | $CH_3$ | $CH_3$ | H | H | 2,3,5-trimethylphenyl | 2,3,5-trimethylphenyl |
| b-5 | $CH_3$ | H | CN | H | 4-($SO_3Na$)phenyl | 4-($SO_3Na$)phenyl |

Structure for b-6 to b-8:

R1-substituted isothiazole with CN, connected via N=N azo linkage to pyridine ring bearing R2, R3, NR4R5, and NH-R6 substituents.

| Dye | R1 | R2 | R3 | R4 | R5 | R6 |
|---|---|---|---|---|---|---|
| b-6 | $CH_3$ | $CH_3$ | H | 2-benzothiazolyl | 2,3,5-trimethylphenyl | 2,3,5-trimethylphenyl |
| b-7 | $CH_3$ | $CH_3$ | H | 2-benzothiazolyl | 2,3,5-trimethylphenyl | 2,3,5-trimethylphenyl |
| b-8 | $CH_3$ | H | H | $SO_2CH_3$ | 3,4-dimethyl-($SO_3Na$)phenyl | 3,4-dimethyl-($SO_3Na$)phenyl |

Structure for c-1 to c-3:

R1-substituted 1,2,4-thiadiazole, connected via N=N azo linkage to pyridine ring bearing R2, R3, NR4R5, and NH-R6 substituents.

| Dye | R1 | R2 | R3 | R4 | R5 |
|---|---|---|---|---|---|
| c-1 | —$SCH_3$ | $CH_3$ | CN | H | $C_8H_{17}(t)$ |
| c-2 | phenyl | H | $CONH_2$ | H | 4-($SO_3K$)phenyl |
| c-3 | —$SCH_2CH_2SO_3K$ | $CH_3$ | H | 2-methyl-6-($SO_3K$)benzothiazolyl | 4-($SO_3K$)phenyl |

-continued
| Dye | | | | | |
|---|---|---|---|---|---|
| c-4 | —CH$_3$ | CH$_3$ | H | 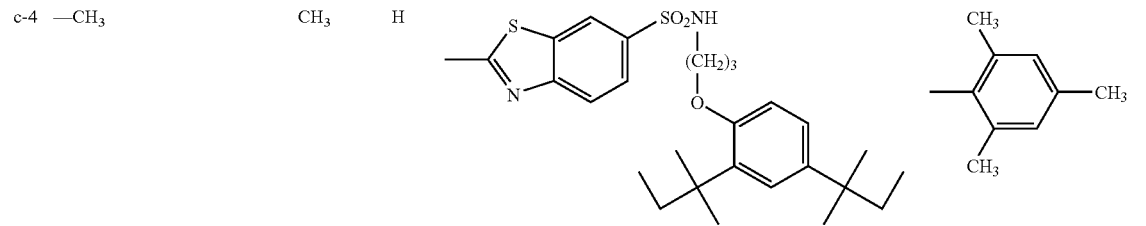 | 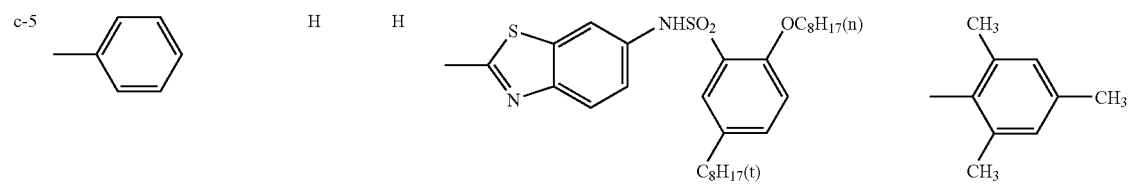 |
| c-5 | 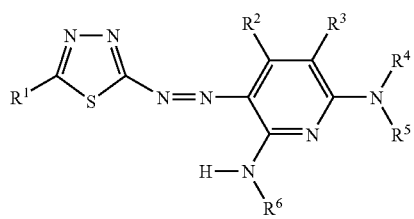 | H | H | | |
| Dye | R$_6$ |
|---|---|
| c-1 | 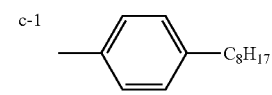 |
| c-2 | 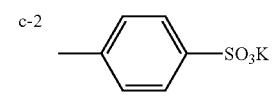 |
| c-3 | 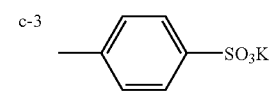 |
| c-4 | 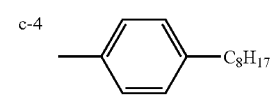 |
| c-5 | C$_8$H$_{17}$(t) |
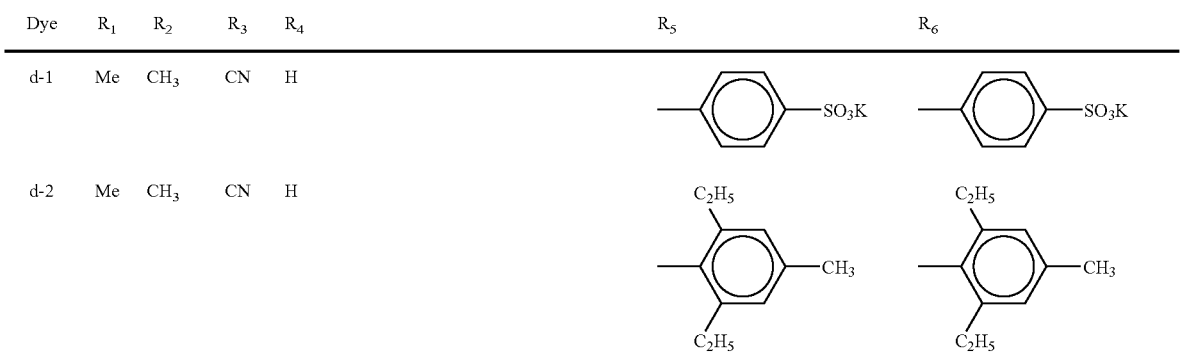
| Dye | R$_1$ | R$_2$ | R$_3$ | R$_4$ | R$_5$ | R$_6$ |
|---|---|---|---|---|---|---|
| d-1 | Me | CH$_3$ | CN | H | ![](p-SO$_3$K phenyl) | ![](p-SO$_3$K phenyl) |
| d-2 | Me | CH$_3$ | CN | H | | |

-continued
| | | | | | | | |
|---|---|---|---|---|---|---|---|
| d-3 | Me | H | H | 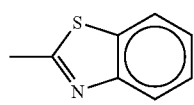 | | 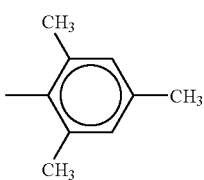 | 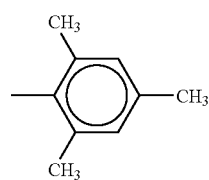 |
| d-4 | Ph | CH$_3$ | CONH$_2$ | H | | 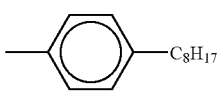 | 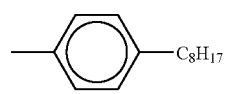 |
| d-5 | Ph | CH$_3$ | H | 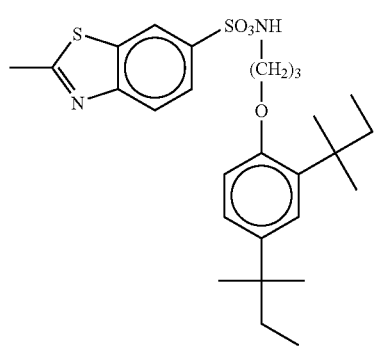 | |  | 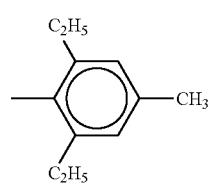 |
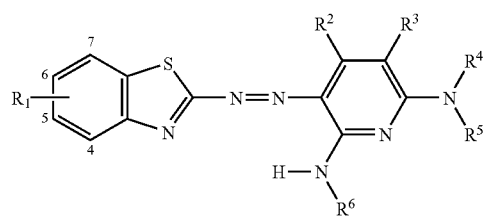
| Dye | R$_1$ | R$_2$ | R$_3$ | R$_4$ | R$_5$ | R$_6$ |
|---|---|---|---|---|---|---|
| e-1 | 5-Cl | CH$_3$ | CONH$_2$ | H | C$_8$H$_{17}$(t) | C$_8$H$_{17}$(t) |
| e-2 | 5,6-diCl | H | H | 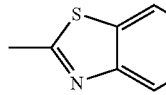 | 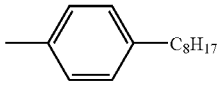 | 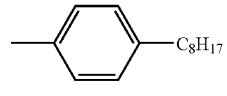 |
| e-3 | 5,6-diCl | CH$_3$ | H | 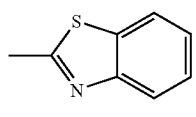 | 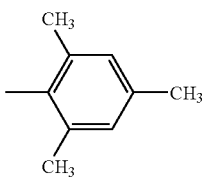 | COCH$_3$ |
| e-4 | 5-CH$_3$ | H | CN | H | 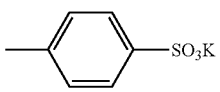 | 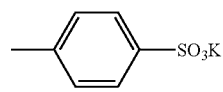 |
| e-5 | 5-NO$_2$ | CH$_3$ | H | SO$_2$CH$_3$ | 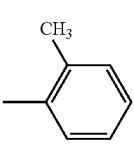 | 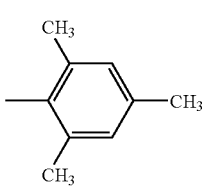 |

-continued

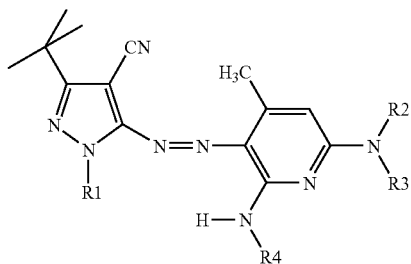

| Dye | R1 | R2 | R3 |
|---|---|---|---|
| f-1 | 2-methylbenzothiazole-6-SO₃K | 2-methylbenzothiazole-6-SO₃K | 2,3,5-trimethyl-6-SO₃K-phenyl |
| f-2 | 2-methylbenzothiazole-6-SO₃Na | 2-methylbenzothiazole-6-SO₃Na | 2,3-dimethyl-4-iso-C₃H₇-6-SO₃Na-phenyl |
| f-3 | 2-methylbenzothiazole-6-SO₃Li | 2-methylbenzothiazole-6-SO₃Li | 2-iso-C₃H₇-3-methyl-4-iso-C₃H₇-6-SO₃Na-phenyl |
| f-4 | 2-methylbenzothiazole-6-SO₃Na | 2-methylbenzothiazole-6-SO₃Na | 2-C₂H₅-3-methyl-4-C₂H₅-6-SO₃Na-phenyl |
| f-5 | 2-methylbenzothiazole-5-CON(CH₂CO₂Na)₂ | 2-methylbenzothiazole-5-CON(CH₂CO₂Na)₂ | 2,3,5-trimethyl-phenyl |
| f-6 | 2-methylbenzothiazole-6-SO₂NHC₂H₄CO₂H | 2-methylbenzothiazole-6-SO₂NHC₂H₄CO₂H | 2,3,5-trimethyl-6-SO₃K-phenyl |

-continued
| | | |
|---|---|---|
| f-7 | 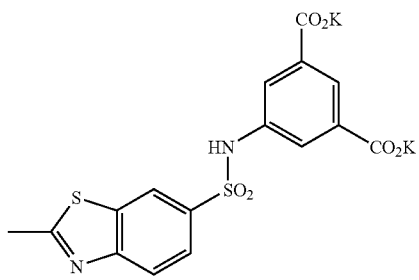 | 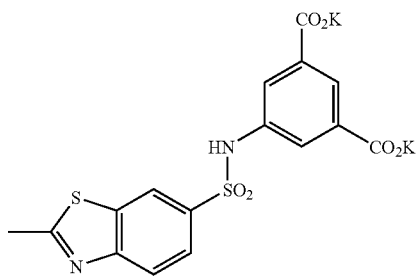 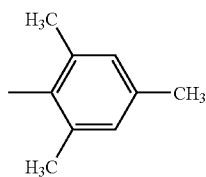 |
| Dye | R4 |
|---|---|
| f-1 | 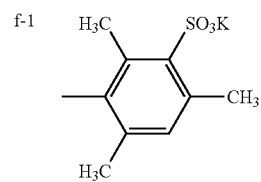 |
| f-2 | 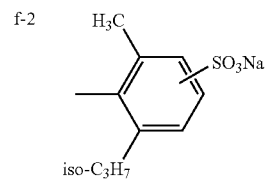 |
| f-3 | 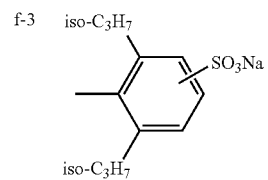 |
| f-4 | 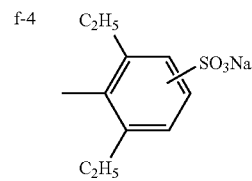 |
| f-5 | 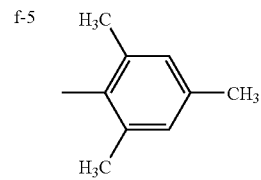 |
| f-6 | 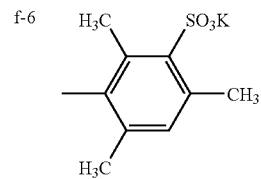 |

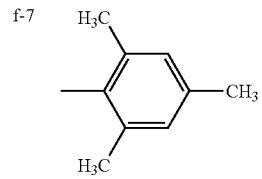

f-7

The content of the heterocyclic azo dye in the ink composition is preferably from 0.2 to 20% by weight, and more preferably 0.5 to 15% by weight.

In the invention, by jointly using acetylene diol and/or an ethylene oxide adduct of acetylene diol such that an average value of the addition molar number of the ethylene oxide adduct is 0 or more and less than 4, even when the concentration of the heterocyclic azo dye is relatively high, there are brought such effects that the drying properties of the image are improved and that deteriorations of image quality such as beading can be controlled.

The aqueous medium which is used in the ink composition of the invention means water or a mixture of water and a solvent such as water miscible organic solvents as the need arises.

The water miscible organic solvent is used for the purposes of preventing drying of the ink, acting as a dissolution assistant of the dye, and improving the penetration of the ink composition into ink image receiving paper.

By preventing drying of the ink composition, drying of the ink composition on the nozzle surface is controlled so that the discharge stability of the ink composition is improved. With respect to the dissolution assistant of the dye, the solubility of the dye in the ink composition is enhanced so that the deposition of the dye in the ink composition is suppressed. Furthermore, by improving the penetration of the ink composition into ink image receiving paper, it is possible to make the ink composition have high-speed printing adaptability.

Specific examples of the water miscible organic solvent include alcohols (for example, methanol, ethanol, propanol, isopropanol, butanol, isobutanol, sec-butanol, t-butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), nitrogen-containing organic solvents (for example, amines such as ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, tetramethylpropylenediamine, formamide, N,N-dimethylformamide, N,N-dimethylacetamide, 2-pyrrolidone, N-methyl-2-pyrrolidone, N-vinyl-2-pyrrolidone, 2-oxazolidone, 1,3-dimethyl-2-imidazolidinone, and acetonitrile), and other polar solvents (for example, dimethyl sulfoxide, sulforane, and acetone). Above all, in view of the matter that the effects of the invention increase, polyhydric alcohols and nitrogen-containing organic solvents are preferable; and glycerin, ethylene glycol, propylene glycol, 1,3-propanediol, 1,2-butanediol, 1,4-butanediol, 1,2-pentanediol, 1,5-pentanediol, 1,2-hexanediol, and pyrrolidone are more preferable. Incidentally, the water miscible organic solvent may be used in combination of two or more kinds thereof. The amount of addition of the water miscible organic solvent is from 5 to 60% by weight, and preferably from 10 to 40% by weight in the ink composition.

It is preferable that the ink composition of the invention further contains, in addition to the foregoing components, at least one of additives selected from the group consisting of an ooze preventing agent, an antifoaming agent, a bronze improver, a chelating agent, a drying preventing agent (wetting agent), a penetration accelerator, an ultraviolet light absorber, an antioxidant, a viscosity adjustor, a dispersant, a rust preventing agent, and a pH adjustor. In the ink composition of the invention, such an additive can be properly selected and used in an appropriate amount. The already described components and these additives include compounds in which a single compound can exhibit one or two or more functions. Accordingly, with respect to a blending proportion of such additives, in the case where the additive component has multiple functions, the subject compound is independently calculated into each of the functional components.

Because of high image durability, the ink composition of the invention can be used for image recording of every kind. As a dye for imaging, the ink composition of the invention can be used and applied for, for example, use for photographic light-sensitive materials, use for heat transfer materials, use for heat-sensitive or pressure-sensitive recording materials, and use for inkjet recording. Above all, the ink composition of the invention is preferably adapted for use as an ink composition for inkjet recording.

A preparation method of ink composition is described in detail in JP-A-5-295312, JP-A-7-97541, and JP-A-7-82515 in addition to the patent documents as described previously. These methods can also be used for the preparation of the ink composition of the invention.

In the ink composition of the invention, other dyes or pigments may be used jointly. In the case of jointly using other dyes, the other dyes are preferably contained in an amount of 0.1 parts by weight or more and not more than 30 parts by weight, more preferably 0.2 parts by weight or more and not more than 20 parts by weight, and further preferably from 0.5 to 15 parts by weight in terms of the total sum of other dyes based on 100 parts by weight of the whole of the dyes.

The ink composition of the invention can be used for not only monochromic image formation but also full-color image formation. In order to form full-color images, two ink compositions of two colors having a different density from each other with respect to each color can also be used. In addition, it is also possible to use an ink composition of an intermediate color tone such as red, green, blue and violet colors.

The respect ink compositions each containing the foregoing heterocyclic azo dye can constitute an ink set for obtaining full-color images. Alternatively, the subject ink compositions can constitute a part of an ink set. That is, in order to constitute an ink set, the ink composition of the invention can be combined with an arbitrary ink composition other than that of the invention.

Furthermore, in order to obtain full-color images and to adjust a color tone, the coloring material such as the foregoing heterocyclic azo dye may be jointly with other coloring materials in the ink composition of the invention As coloring materials which can be used in the ink set in the invention or coloring materials which can be used jointly with the foregoing heterocyclic azo dye, etc., respective arbitrary coloring materials can be used. Examples of the dye which can be used jointly include the dyes as described previously and the following dyes. As yellow dyes, there are enumerated aryl or heteryl azo dyes having, for example, a phenol, a naphthol, an aniline, a pyrazolone, a pyridone, or an open chain type active methylene compound as a coupling component; azomethine dyes having, for example, an open chain active methylene compound as a coupling component; methine dyes such as benzylidene dyes and monomethine oxonol dyes; and quinone based dyes such as naphthoquinone dyes and anthraquinone dyes. As other dye species, there can be enumerated quinophthalone dyes, nitro or nitroso dyes, acridine dyes, and acridinone dyes. These dyes may be a dye which when a part of the chromophore is dissociated, first exhibits yellow. In that case, the counter cation may be an inorganic cation such as an alkali metal and ammonium, may be an organic cation such as pyridinium and a quaternary ammonium salt, or may be a polymer cation having such a cation in the partial structure thereof. As magenta dyes, there can be enumerated aryl or heteryl azo dyes having, for example, a phenol, a naphthol, or an aniline as a coupling component; azomethine dyes having, for example, a pyrazolone or a pyrazolotriazole as a coupling component; methine dyes such as arylidene dyes, styryl dyes, merocyanine dyes, and oxonol dyes; carbonium dyes such as diphenylmethane dyes, triphenylmethane dyes, and xanthene dyes; quinone based dyes such as naphthoquinone dyes, anthraquinone dyes, and anthrapyridone dyes; and fused polycyclic dyes such as dioxazine dyes. These dyes may be a dye which when a part of the chromophore is dissociated, first exhibits magenta. In that case, the counter cation may be an inorganic cation such as an alkali metal and ammonium, may be an organic cation such as pyridinium and a quaternary ammonium salt, or may be a polymer cation having such a cation in the partial structure thereof. As cyanine dyes, there can be enumerated azomethine dyes such as indoaniline dyes and indophenol dyes; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having, for example, a phenol, a naphthol, or an aniline as a coupling component; and indigo or thioindigo dyes. These dyes may be a dye which when a part of the chromophore is dissociated, first exhibits cyan. In that case, the counter cation may be an inorganic cation such as an alkali metal and ammonium, may be an organic cation such as pyridinium and a quaternary ammonium salt, or may be a polymer cation having such a cation in the partial structure thereof. Also, black dyes such as polyazo dyes can be used. Also, water-soluble dyes such as direct dyes, acid dyes, food dyes, basic dyes, and reactive dyes can be used jointly.

Above all, the following dyes are preferable.

C.I. Direct Red 1, 2, 4, 9, 11, 23, 26, 31, 37, 39, 62, 63, 72, 75, 76, 79, 80, 81, 83, 84, 87, 89, 92, 95, 111, 173, 184, 207, 211, 212, 214, 218, 219, 223, 224, 225, 226, 227, 232, 233, 240, 241, 242, 243, 247, 254

C.I. Direct Violet 7, 9, 47, 48, 51, 66, 90, 93, 94, 95, 98, 100, 101

C.I. Direct Yellow 4, 8, 9, 11, 12, 27, 28, 29, 33, 35, 39, 41, 44, 50, 53, 58, 59, 68, 86, 87, 93, 95, 96, 98, 100, 106, 108, 109, 110, 120, 130, 132, 142, 144, 157, 161, 163

C.I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 290, 291

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199

C.I. Acid Red 1, 8, 35, 42, 52, 57, 62, 80, 81, 82, 87, 94, 111, 114, 115, 118, 119, 127, 128, 131, 143, 144, 151, 152, 154, 158, 186, 245, 249, 254, 257, 261, 263, 266, 289, 299, 301, 305, 336, 337, 361, 396, 397

C.I. Acid Violet 5, 34, 43, 47, 48, 90, 103, 126

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227

C.I. Acid Blue 9, 25, 40, 41, 62, 72, 76, 78, 80, 82, 87, 92, 106, 112, 113, 120, 127:1, 129, 138, 143, 175, 181, 185, 205, 207, 220, 221, 230, 232, 247, 249, 258, 260, 264, 271, 277, 278, 279, 280, 288, 290, 326

C.I. Acid Black 7, 24, 29, 48, 52:1, 172

C.I. Reactive Red 3, 6, 13, 17, 19, 21, 22, 23, 24, 29, 35, 37, 40, 41, 43, 45, 49, 55, 63, 106, 107, 112, 113, 114, 126, 127, 128, 129, 130, 131, 137, 160, 161, 174, 180

C.I. Reactive Violet 1, 3, 4, 5, 6, 7, 8, 9, 16, 17, 22, 23, 24, 26, 27, 33, 34

C.I. Reactive Yellow 2, 3, 13, 14, 15, 17, 18, 23, 24, 25, 26, 27, 29, 35, 37, 41, 42

C.I. Reactive Blue 2, 3, 5, 7, 8, 10, 13, 14, 15, 17, 18, 19, 21, 25, 26, 27, 28, 29, 38, 82, 89, 158, 182, 190, 203, 216, 220, 244

C.I. Reactive Black 4, 5, 8, 14, 21, 23, 26, 31, 32, 34

C.I. Basic Red 12, 13, 14, 15, 18, 22, 23, 24, 25, 27, 29, 35, 36, 38, 39, 45, 46

C.I. Basic Violet 1, 2, 3, 7, 10, 15, 16, 20, 21, 25, 27, 28, 35, 37, 39, 40, 48

C.I. Basic Yellow 1, 2, 4, 11, 13, 14, 15, 19, 21, 23, 24, 25, 28, 29, 32, 36, 39, 40

C.I. Basic Blue 1, 3, 5, 7, 9, 22, 26, 41, 45, 46, 47, 54, 57, 60, 62, 65, 66, 69, 71

C.I. Basis Black 8

In addition to the dyes represented by the foregoing formulae, dyes as described in the following patent documents can be suitably used.

JP-A-10-130557, JP-A-9-255906, JP-A-6-234944, JP-A-7-97541, European Patent No. 982371, WO 00/43450, WO 00/43451, WO 00/43452, WO 00/43453, WO 03/106572, WO 03/104332, JP-A-2003-238862, JP-A-2004-83609, JP-A-2002-302619, JP-A-2002-327131, JP-A-2002-265809, WO 04/087815, WO 02/090441, WO 03/027185, WO 04/085541, JP-A-2003-321627, JP-A-2002-332418, JP-A-2002-332419, WO 02/059216, WO 02/059215, WO 04/087814, WO 04/046252, WO04/046265, U.S. Pat. No. 6,652,637B, WO 03/106572, WO 03/104332, JP-T-2002-540281, Japanese Patent Nos. 3558213, 3558212 and 3558211, JP-A-2004-285351, JP-A-2004-323605, and WO 04/104108.

(Inkjet Recording Method)

According to an inkjet recording method of the invention, the foregoing ink for inkjet recording is provided with energy, thereby forming an image on a known image receiving material, namely plain papers, resin-coated papers, papers exclusively used for inkjet, films, papers used in common for electrophotography, cloths, glasses, metals, ceramics, and so on as described in, for example, JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947. As the image receiving material, image receiving materials having an ink receiving layer containing a white inorganic pigment particle on a support are preferable. Incidentally, as the inkjet recording method of the invention, the description in paragraphs [0093] to [0105] of JP-A-2003-306623 can be applied.

In forming an image, for the purposes of giving gloss or waterproof properties and improving weather resistance, a polymer latex compound may be used jointly. The timing for giving a latex compound to the image receiving material may be before or after giving a coloring agent or at the same time. Accordingly, with respect to the place for addition, the latex compound may be added in image receiving paper or in the ink, or it may be used as a liquid material of the polymer matrix alone. Concretely, methods as described in JP-A-2002-166638, JP-A-2002-121440, JP-A-2002-154201, JP-A-2002-144696, JP-A-2002-080759, and Japanese Patent Application Nos. 2000-299465 and 2000-297365 can be suitably employed.

A polymer latex may be added in constitutional layers (including a backcoat layer) of the inkjet recording paper and recording film. The polymer latex is used for the purpose of improving physical properties of film such as dimensional stabilization, curl prevention, bonding prevention, and prevention of film cracks. The polymer latex is described in JP-A-62-245258, JP-A-62-1316648, and JP-A-62-110066. When a polymer latex having a low glass transition temperature (not higher than 40° C.) is added in a mordant-containing layer, it is possible to prevent cracks or curling of the layer from occurring. When a polymer latex having a high glass transition temperature is added in a backcoat layer, it is also possible to prevent curling from occurring.

For the purpose of forming a color image as described previously, the ink composition of the invention may be formed into an ink set containing the same. In the invention, the inkjet recording method is not limited. Examples thereof include known systems such as a charge control system of discharging an ink by utilizing an electrostatic attractive force; a drop-on-demand system utilizing a vibration pressure of piezoelectric element (pressure pulse system); an acoustic inkjet system of discharging an ink by converting electric signals into acoustic beams and utilizing a radiation pressure; and a thermal inkjet system of heating an ink to form air bubbles and utilizing a generated pressure.

The inkjet recording system includes a system of ejecting a lot of inks having a low concentration called as "photo-ink" in a small volume; a system of using plural inks having substantially the same hue and a different density, thereby improving the image quality; and a system of using a colorless transparent ink.

EXAMPLES

The invention will be hereunder described with reference with the following Examples, but it should not be construed that the invention is limited thereto.

(Preparation of Ink Composition)

Respective components having a composition as shown in Table 15 were dissolved with stirring for one hour while heating at 30 to 40° C. Thereafter, the solution was filtered in vacuo through a micro-filter having an average pore size of 0.25 μm to obtain a yellow ink composition Y-101, a magenta ink composition M-101 and a black ink composition Bk-101.

TABLE 15

| Composition of ink composition | | Y-101 | M-101 | Unit: g Bk-101 |
|---|---|---|---|---|
| Dye | Y-1 | 50.0 | — | — |
| | M-1 | — | 32.0 | — |
| | Bk-1 | — | — | 63.0 |
| | Bk-2 | — | — | 16.0 |
| Water miscible organic solvent | Glycerin | 120 | 100 | 100 |
| | Triethylene glycol | 95 | 20 | 20 |
| | Triethylene glycol monobutyl ether | 100 | 100 | 80 |
| | 1,2-Hexanediol | — | 12 | 35 |
| | 2-Pyrrolidone | — | 10 | 35 |
| pH adjustor | Triethanolamine | 2.0 | 2.0 | 2.0 |
| Dye dissolution assistant | Urea | 20 | 24 | 10 |
| Surfactant | ACETYLENOL E00 | 10.0 | 10.0 | 10.0 |
| Antiseptic | PROXEL XLII | 1.0 | 1.0 | 1.0 |
| | Benzotriazole | 0.02 | 0.02 | 0.02 |
| To add ultra-pure water (resistivity value: 18 MΩ·cm or more) to make 1,000 g | | | | |

Y-1

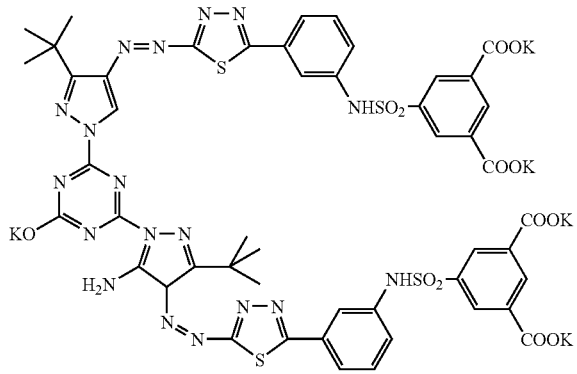

M-1

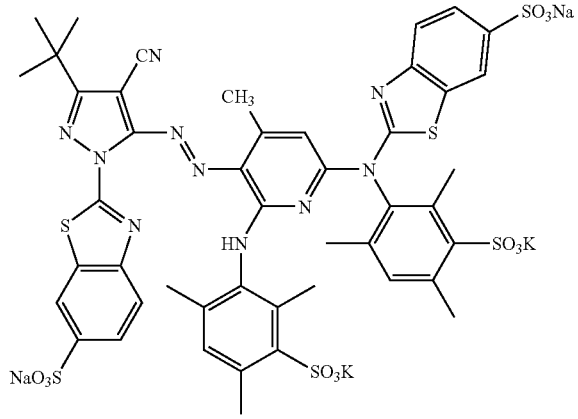

TABLE 15-continued

| Composition of ink composition | Y-101 | M-101 | Bk-101 |
|---|---|---|---|

Unit: g

Bk-1

[Chemical structure of Bk-1 dye showing naphthalene with LiO₃S and SO₃Li substituents, connected via azo linkages to a thiazole ring and pyridine with CN, NH groups, and aryl-SO₃Li groups]

Bk-2

[Chemical structure of Bk-2: (NaO₃S-C₆H₄-N=N-)naphthalene(NaO₃S)(-N=N-C₆H₄-NH-C(=O)-)]

Yellow ink compositions Y-102 to Y-105, magenta ink compositions M-102 to M-105, and black ink compositions BK-102 to BK-105 were obtained in exactly the same manner, except for changing the surfactant to a surfactant as shown in the following Table 16.

TABLE 16

| Ink composition | Surfactant Kind | Amount of addition [g/1 kg of ink composition] |
|---|---|---|
| Y-101 (Invention) | ACETYLENOL E00 | 10.0 |
| M-101 (Invention) | ACETYLENOL E00 | 10.0 |
| BK-101 (Invention) | ACETYLENOL E00 | 10.0 |
| Y-102 (Invention) | ACETYLENOL E00 | 10.0 |
|  | ACETYLENOL E100 | 10.0 |
| M-102 (Invention) | ACETYLENOL E00 | 10.0 |
|  | ACETYLENOL E100 | 10.0 |
| BK-102 (Invention) | ACETYLENOL E00 | 10.0 |
|  | ACETYLENOL E100 | 10.0 |
| Y-103 (Invention) | ACETYLENOL E13T | 10.0 |
| M-103 (Invention) | ACETYLENOL E13T | 10.0 |
| BK-103 (Invention) | ACETYLENOL E13T | 10.0 |
| Y-104 (Comparison) | ACETYLENOL E40 | 10.0 |
| M-104 (Comparison) | ACETYLENOL E40 | 10.0 |
| BK-104 (Comparison) | ACETYLENOL E40 | 10.0 |
| Y-105 (Comparison) | ACETYLENOL E00 | 3.0 |
| M-105 (Comparison) | ACETYLENOL E00 | 3.0 |
| BK-105 (Comparison) | ACETYLENOL E00 | 3.0 |

In the foregoing Table 16, each of ACETYLENOL E00, E13T, E40 and E100 is each an acetylene glycol based surfactant, manufactured by Kawaken Fine Chemicals Co., Ltd., and a chemical structure thereof is represented by the following formula (2).

An average value of the addition molar number of ethylene oxide which is contained in E00, E13, E40 and E100 is 0, 1.3, 4 and 10, respectively; and when 10.0 g of each of E00 and E100 is mixed, an average value of the addition molar number of ethylene oxide is 2.5.

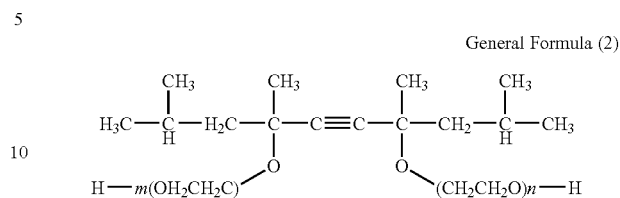

General Formula (2)

(Measurement of Viscosity and Surface Tension)

A viscosity at 25° C. of each of these ink compositions was measured using a vibration type viscometer (VM-100A-L Model, manufactured by Yamaichi Electrics Co., Ltd.). Also, a surface tension was measured in terms of a static surface tension using an automatic surface tension meter (CBVP-A3 Model, manufactured by Kyowa Interface Science Co., Ltd.). The measurement results are shown in Table 17.

(Measurement of Contact Angle)

A contact angle at 25° C. of each of these ink compositions was measured in terms of a dynamic contact angle by using a dynamic contact angle meter (Drop Master 700 Model, manufactured by Kyowa Interface Science Co., Ltd.). Inkjet paper photo glossy paper "GASAI SHIAGE", manufactured by Fuji Photo Film Co., Ltd. was used as a substrate, and a value at 100 ms was employed. The measurement results are shown in Table 17.

(Drying Properties of Ink Composition)

The foregoing ink sets were filled in respective ink cartridges of an inkjet printer PM-G800, manufactured by Seiko Epson Corporation, and solid images of yellow, magenta and black were printed on inkjet paper photo glossy paper "GASAI SHIAGE", manufactured by Fuji Photo Film Co., Ltd. under circumstances at 35° C. and 80% RH. Immediately after printing, plain paper was superposed on the printed surface and rubbed from above by a roller. Drying properties of each of the ink compositions was evaluated on the basis of how each of the ink compositions was transferred onto the plain paper (staining of the plain paper). The results are shown in Table 17.

A: The ink composition is not transferred onto the plain paper (the plain paper is not stained)

B: Transfer of the ink composition onto the plain paper is observed (staining of the plain paper is observed).

C: Transfer of the ink composition onto the plain paper is conspicuous (staining of the plain paper is conspicuous).

(Evaluation of Beading)

The foregoing ink sets were filled in respective ink cartridges of an inkjet printer PM-G800, manufactured by Seiko Epson Corporation, and solid images of yellow, magenta and black were printed on inkjet paper photo glossy paper "GASAI SHIAGE", manufactured by Fuji Photo Film Co., Ltd. under circumstances at 35° C. and 80% RH. After allowing to stand overnight under the same conditions, a spotted pattern in the solid images in each of the resulting image recording materials was visually evaluated according to the following evaluation criteria. The results are shown in Table 17.

A: A spotted pattern is not observed.

B: A spotted pattern is observed.

C: A spotted pattern is conspicuous.

(Evaluation of Image Preservability)

Solid images of yellow, magenta and black were printed on inkjet paper photo glossy paper "GASAI SHIAGE", manufactured by Fuji Photo Film Co., Ltd. under circumstances at 23° C. and 60% RH and after drying overnight under the same conditions, were subjected to the following evaluation. Incidentally, in printing a gray solid image, printing was carried out by using only a black ink.

(1) Light fastness was evaluated in the following manner. That is, after measuring an image density Ci by a reflection densitometer X-Rite 310, the image was irradiated with xenon light (85,000 luxes) for 14 days using an Atlas' weather meter. Thereafter an image density Cf was again measured, from which was then determined a residual rate of dye, (Cf/Ci)×100.

Incidentally, the evaluation was carried out by the residual rate of dye at a reflection density in the range of from 0.9 to 1.1.

(2) Ozone resistance was evaluated in terms of a residual rate of dye by allowing the image to stand for 7 days within a box set up at an ozone gas concentration of 5 ppm and measuring an image density before and after allowing to stand under an ozone gas by using a reflection densitometer (X-Rite 310TR). The ozone gas concentration within the box was measured using an APPLICS' ozone gas monitor (Model: OZG-EM-01).

Incidentally, the evaluation was carried out by the residual rate of dye at a reflection density in the range of from 0.9 to 1.1.

What is claimed is:

1. An ink composition comprising:
a coloring material having an azo group bound to a heterocyclic group;
an aqueous medium; and
at least one of an acetylene diol and an ethylene oxide adduct of the acetylene diol,
wherein an average value of an addition molar number of the at least one of the acetylene diol and the ethylene oxide adduct of the acetylene diol is 0 or more and less than 4, and
the coloring material having an azo group bound to a heterocyclic group contains at least one of a compound represented by general formula (Y), a compound represented by general formula (Bk) and a compound represented by general formula (M):

$(A-N=N-B)_n-L$     General Formula (Y)

in the formula, n is 2; A and B each independently represents an optionally substituted heterocyclic group, one of A and B represents a monovalent heterocyclic group, and the other represents a divalent heterocyclic group, and As may be the same or different, and Bs may be the same or different; and L represents a simple bond or a divalent connecting group;

$A_1-N=N-A_2-N=N-A_3$     General Formula (Bk)

in the formula, $A_1$, $A_2$ and $A_3$ each independently represents an optionally substituted aromatic group or an optionally substituted heterocyclic group, provided that at least one of

TABLE 17

| Ink composition | Viscosity [mPa·s] | Surface tension [mN/m] | Contact angle [°] | Drying properties or absorption properties | Beading | Image preservability | |
|---|---|---|---|---|---|---|---|
| | | | | | | Light fastness | Ozone resistance |
| Y-101 (Invention) | 4.37 | 32.5 | 24.8 | A | A | 55% | 90% |
| M-101 (Invention) | 4.60 | 32.3 | 25.2 | A | A | 66% | 66% |
| BK-101 (Invention) | 4.65 | 32.0 | 24.0 | A | A | 59% | 71% |
| Y-102 (Invention) | 4.41 | 32.4 | 24.5 | A | A | 54% | 89% |
| M-102 (Invention) | 4.58 | 32.6 | 24.7 | A | A | 64% | 65% |
| BK-102 (Invention) | 4.66 | 32.3 | 23.9 | A | A | 61% | 69% |
| Y-103 (Invention) | 4.40 | 32.5 | 25.5 | A | A | 55% | 88% |
| M-103 (Invention) | 4.61 | 32.7 | 26.2 | A | A | 66% | 65% |
| BK-103 (Invention) | 4.64 | 32.5 | 25.3 | A | A | 60% | 70% |
| Y-104 (Comparison) | 4.39 | 34.7 | 28.0 | B | C | 56% | 89% |
| M-104 (Comparison) | 4.59 | 35.0 | 29.1 | B | C | 65% | 66% |
| BK-104 (Comparison) | 4.66 | 35.2 | 27.9 | C | B | 60% | 69% |
| Y-105 (Comparison) | 4.40 | 35.1 | 29.2 | B | C | 55% | 90% |
| M-105 (Comparison) | 4.60 | 35.3 | 30.3 | C | C | 64% | 65% |
| BK-105 (Comparison) | 4.68 | 35.5 | 29.5 | C | C | 59% | 70% |

As is evident from the results of the foregoing Examples, according to the ink composition of the invention, it is possible to adjust the surface tension at a low level so that the value of the contact angle on the surface of image receiving paper becomes small. Thus, it has been understood that images having excellent drying properties and high quality such that they are free from beading are obtained.

Furthermore, it is noted from the results of the image preservability that the ink of the invention does not deteriorate the image fastness.

The present application claims foreign priority based on Japanese Patent Application (JP 2005-278055) filed Sep. 26, 2005, the contents of which is incorporated herein by reference.

$A_1$, $A_2$ and $A_3$ represents a heterocyclic group; $A_1$ and $A_3$ are each a monovalent group, and $A_2$ is a divalent group:

General Formula (M):

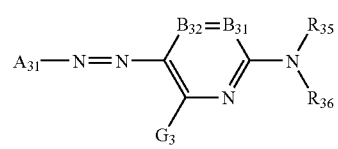

in the formula, $A_{31}$ represents a residue of a 5-membered heterocyclic diazo component $A_{31}$-$NH_2$; $B_{31}$ and $B_{32}$ each each represents =$CR_{31}$- or —$CR_{32}$=, or either one of them represents a nitrogen atom, and the other represents $=CR_{31}-$ or $-CR_{32}=$, $R_{35}$ and $R_{36}$ each independently represents a hydrogen atom, an aliphatic group, an aromatic group, a heterocyclic group, an acyl group, an alkoxycarbonyl group, an aryloxycarbonyl group, a heterocyclic oxycarbonyl group, a carbamoyl group, an alkyl- or arylsulfonyl group, a heterocyclic sulfonyl group, or a sulfamoyl group, and each of these groups may be further substituted: $G_3$, $R_{31}$ and $R_{32}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (inclusive of an arylamino group and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, an alkyl- or arylsulfonyl group, a heterocyclic sulfonyl group, an alkyl- or arylsulfonyl group, a heterocyclic sulfinyl group, a sulfamoyl group, a sulfo group, or a heterocyclic thio group, and each of these groups may be further substituted; $R_{31}$ and $R_{35}$, or $R_{35}$ and $R_{36}$ may be taken together to form a 5-membered or 6-membered ring.

2. The ink composition according to claim 1, wherein a content of the at least one of the acetylene diol and the ethylene oxide adduct of the acetylene diol is from 5 to 50 g/L.

3. The ink composition according to claim 1, wherein an oxidation potential of the coloring material is nobler than 1.0 V against a standard calomel electrode.

4. An ink set comprising an ink composition according to claim 1.

5. A recording method comprising recording an image using an ink composition according to claim 1.

6. A recording method comprising recording an image using an ink set according to claim 4.

7. The recording method according to claim 5, which is an inkjet recording method.

8. The recording method according to claim 6, which is an inkjet recording method.

* * * * *